United States Patent
Mizoguchi et al.

[11] Patent Number: 5,959,669
[45] Date of Patent: Sep. 28, 1999

[54] IMAGE PICKUP APPARATUS HAVING STANDARD-RESOLUTION AND HIGH-RESOLUTION PHOTOGRAPHING MODES

[75] Inventors: Yoshiyuki Mizoguchi; Saburo Nakazato, both of Kanagawa-ken, Japan

[73] Assignee: Canon Kabushiki Kaisha, Tokyo, Japan

[21] Appl. No.: 08/967,253

[22] Filed: Nov. 5, 1997

Related U.S. Application Data

[63] Continuation of application No. 08/358,241, Dec. 19, 1994, abandoned.

[30] Foreign Application Priority Data

Dec. 31, 1993 [JP] Japan ..................... 5-349607

[51] Int. Cl.⁶ ............................... H04N 5/225
[52] U.S. Cl. ............................ 348/362; 348/342
[58] Field of Search .................... 348/207, 333, 348/335, 340, 342, 343, 344, 360; 359/722, 723, 885, 889; H04N 5/225

[56] References Cited

U.S. PATENT DOCUMENTS

| | | | |
|---|---|---|---|
| 4,168,900 | 9/1979 | Adachi | 355/1 |
| 4,502,758 | 3/1985 | Bailey | 359/886 |
| 5,153,730 | 10/1992 | Nagasaki et al. | 348/231 |
| 5,159,469 | 10/1992 | Takagi | 358/454 |
| 5,231,501 | 7/1993 | Sakai | 348/231 |
| 5,475,441 | 12/1995 | Parulski et al. | 348/552 |
| 5,479,206 | 12/1995 | Ueno et al. | 348/211 |

*Primary Examiner*—Tuan Ho
*Attorney, Agent, or Firm*—Robin, Blecker & Daley

[57] ABSTRACT

An image pickup apparatus is provided with a standard-resolution photographing mode for performing photography with a standard resolution and a high-resolution photographing mode for performing photography with a high resolution. In the image pickup apparatus, when the high-resolution photographing mode is selected, an optical low-pass filter is retracted from an optical path and a fixed iris is inserted into the optical path to prevent a degradation in image quality.

6 Claims, 34 Drawing Sheets

31 : CCD SENSOR
34 : FIXED IRIS
35 : TWO-BLADE IRIS
36 : CRYSTAL LPF
37 : IR CUT-FILTER
50 : VIEW FINDER OPTICAL SYSTEM
30 : IMAGE PICKUP OPTICAL SYSTEM

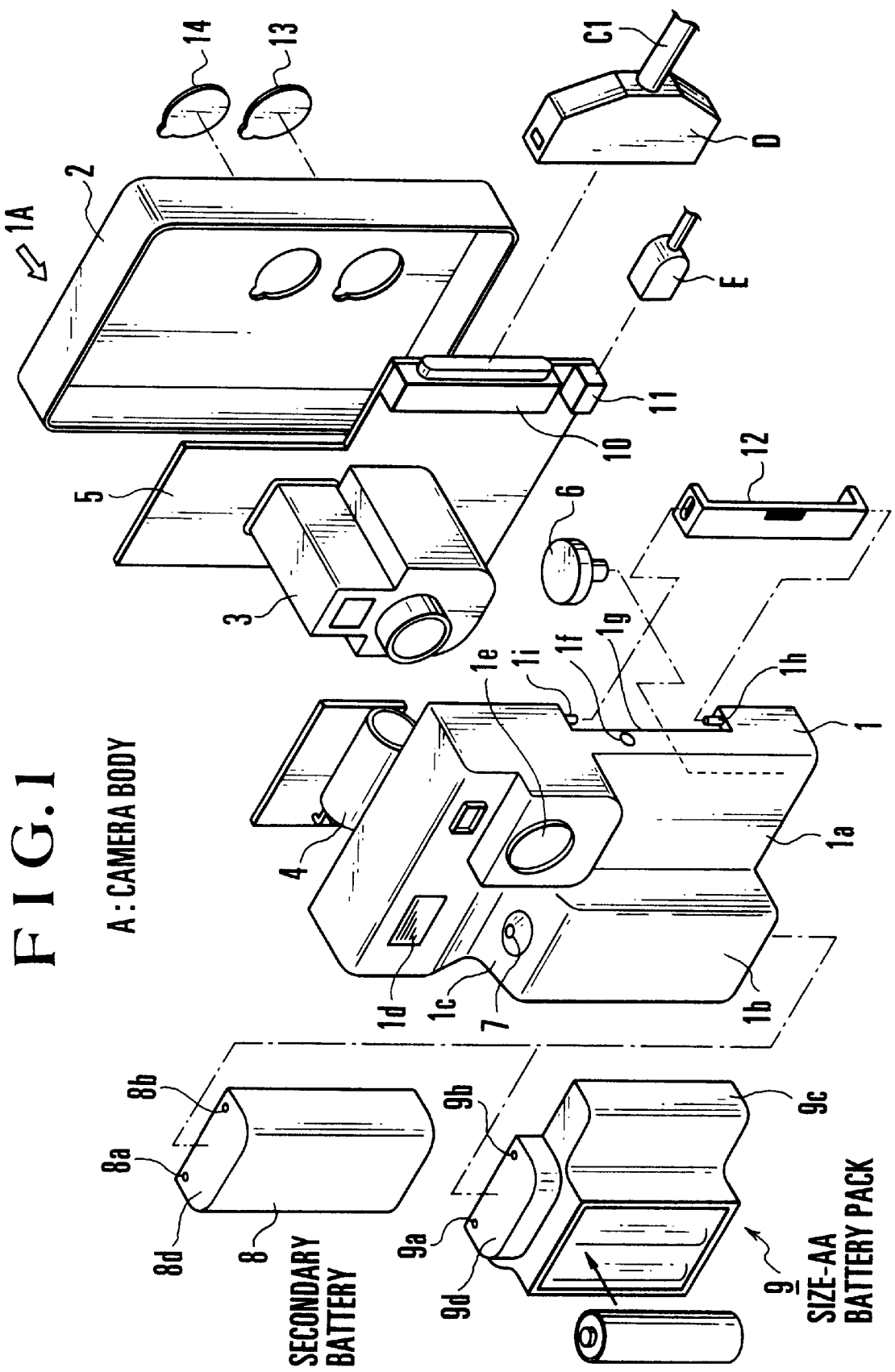

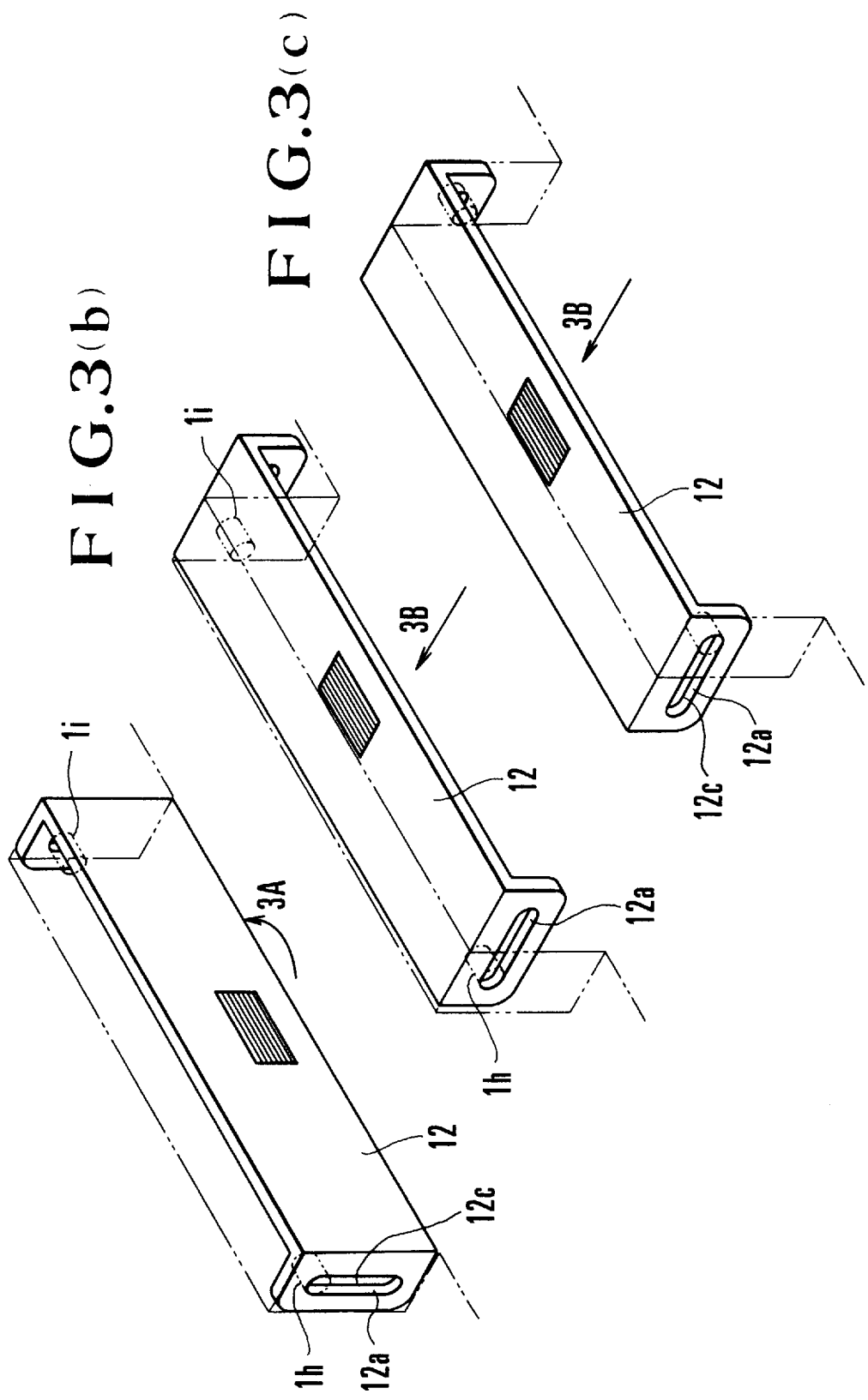

31 : CCD SENSOR
34 : FIXED IRIS
35 : TWO-BLADE IRIS
36 : CRYSTAL LPF
37 : IR CUT-FILTER
50 : VIEW FINDER OPTICAL SYSTEM
30 : IMAGE PICKUP OPTICAL SYSTEM

FIG.11(a) COLOR STANDARD-RESOLUTION PHOTOGRAPHING MODE
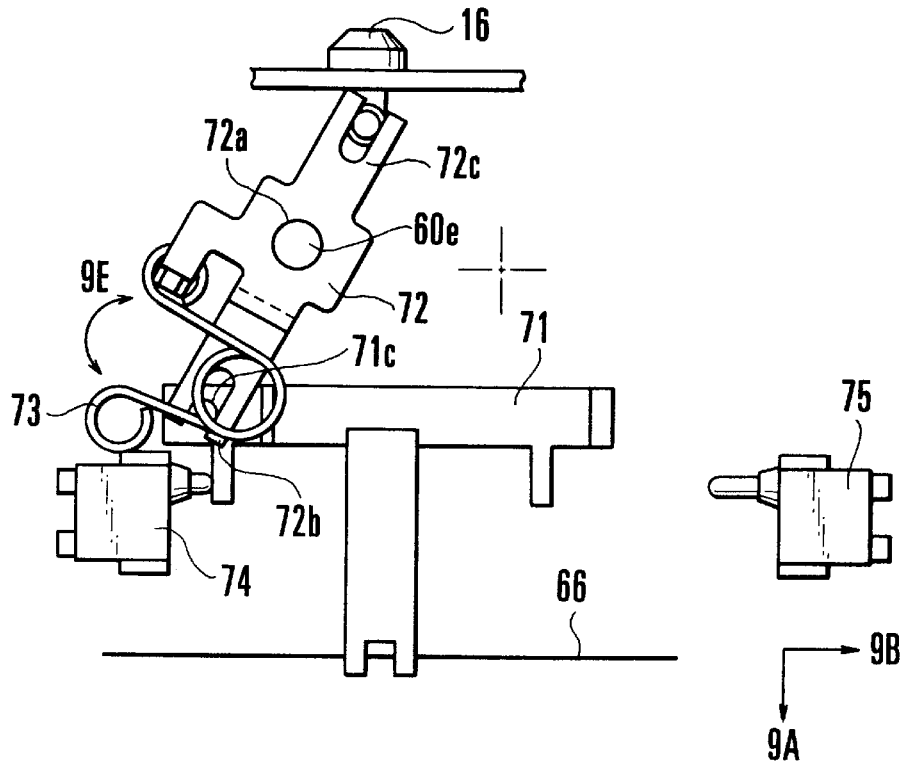
FIG.11(b) BLACK-AND-WHITE HIGH-RESOLUTION PHOTOGRAPHING MODE
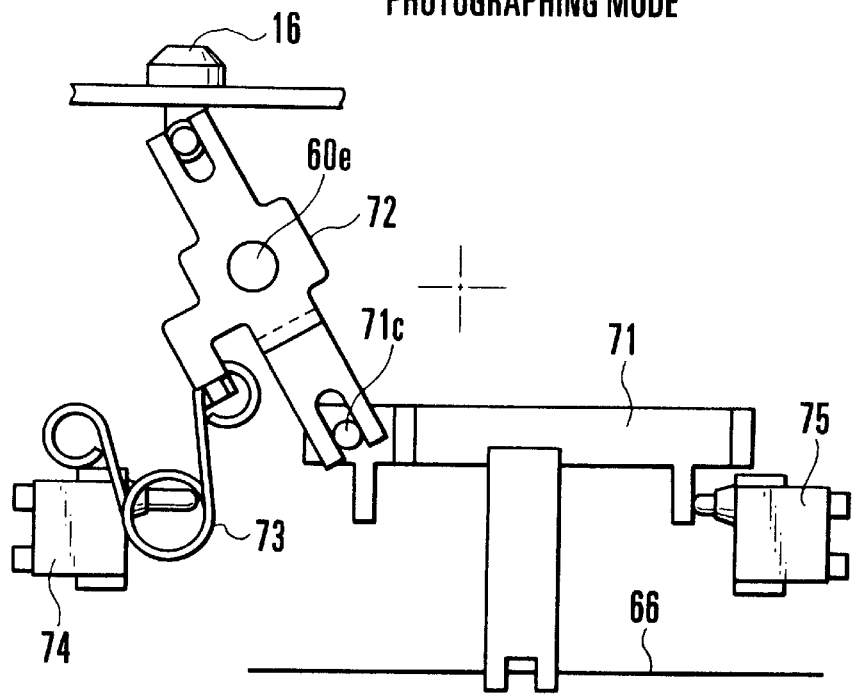

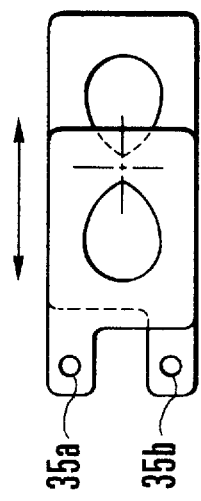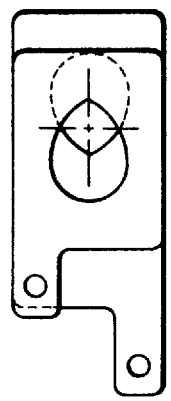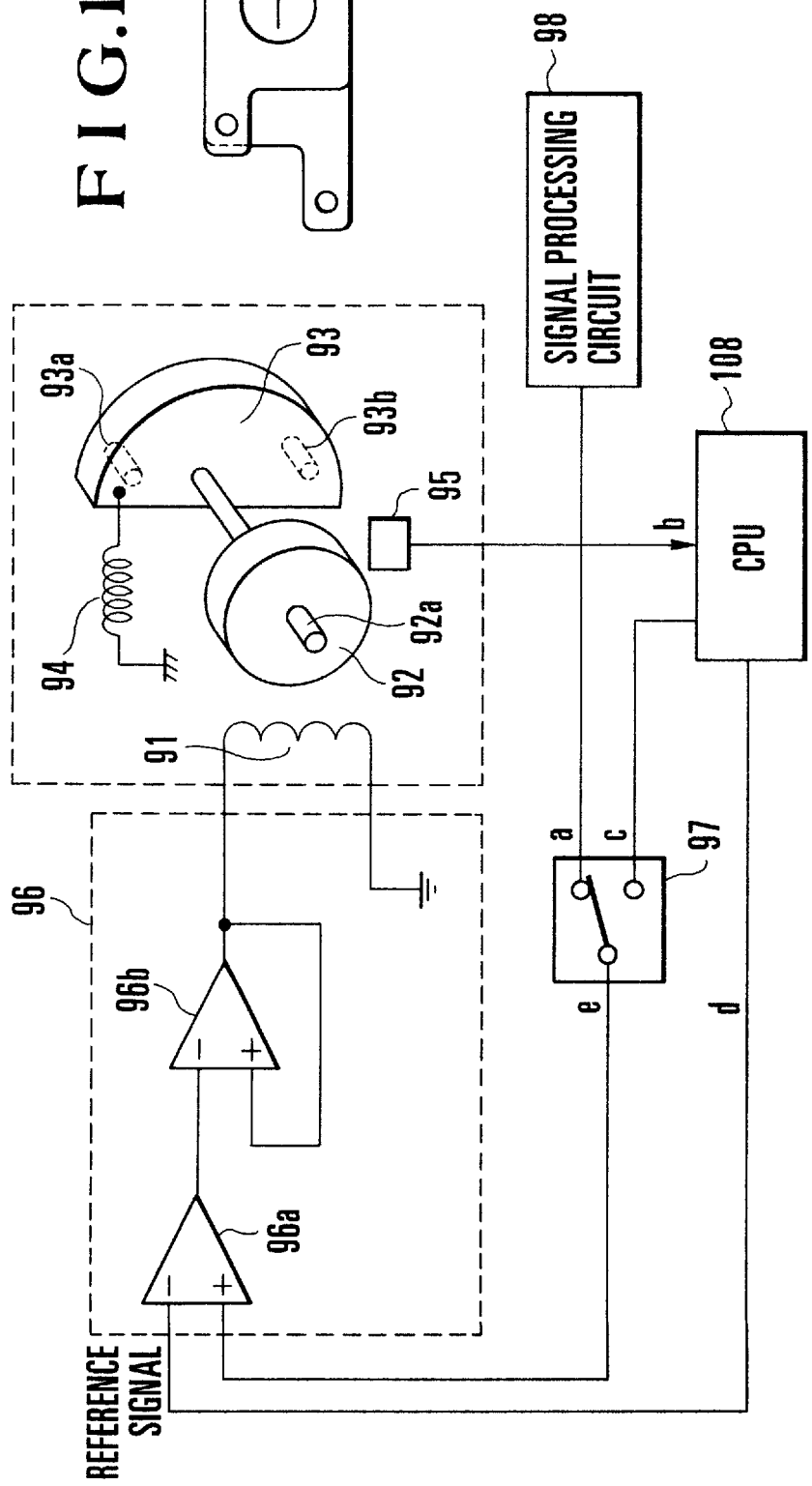

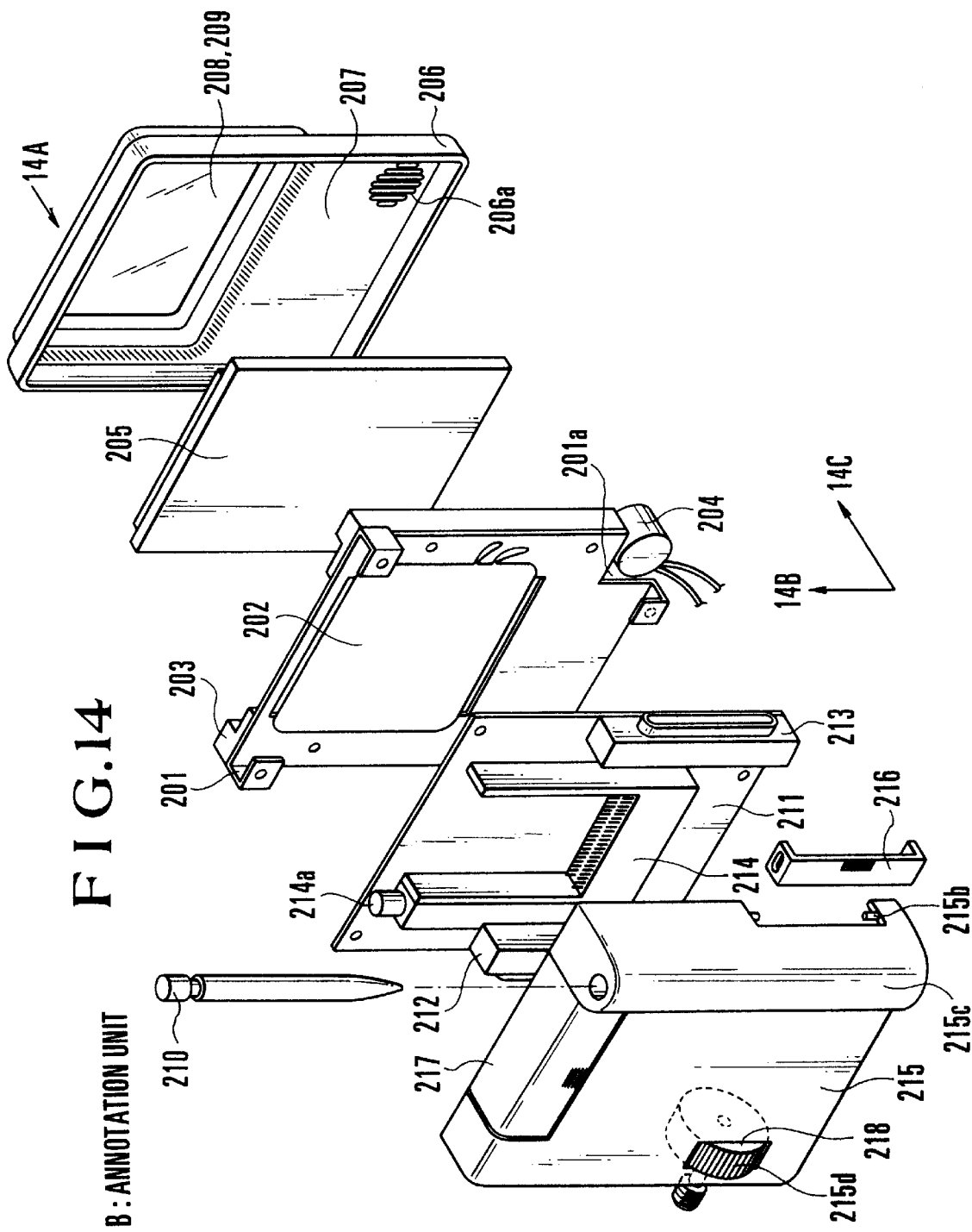

FIG. 34

FROM S107
OF FLOWCHART OF FIG. 25

↓

CALCULATE PRE-EXPOSURE SETTING — S701
FROM AF EXPOSURE SETTING
$T = t(N2)$
$G = s(M2)$
$S = s(K2)$

↓

SET IRIS — S702

↓

RETURN TO S108
OF FLOWCHART OF FIG. 25

FIG. 35

FROM S110
OF FLOWCHART OF FIG. 25

↓

PERFORM EXPOSURE — S801
BY ELECTRONIC SHUTTER
AND INTEGRATE VIDEO SIGNAL

↓

CALCULATE MAIN EXPOSURE SETTING — S802
FROM INTEGRAL VALUE
AND PRE-EXPOSURE SETTING
AND PERFORM SETTING OF:
$S = s(K2)$
$G = g(M3)$
$T' = t(N3)$

↓

RETURN TO S111
OF FLOWCHART OF FIG. 25

IMAGE PICKUP APPARATUS HAVING STANDARD-RESOLUTION AND HIGH-RESOLUTION PHOTOGRAPHING MODES

This is a continuation application under 37 CFR 1.62 of prior application Ser. No. 08/358,241, filed Dec. 19, 1994, now abandoned.

BACKGROUND OF THE INVENTION

1. Field of the Invention

The present invention relates to an image pickup apparatus having a standard-resolution photographing mode and a high-resolution photographing mode.

2. Description of the Related Art

The recent development of video apparatuses, such as electronic still cameras or video cameras, is remarkable, and it is desired that each individual video apparatus have a much larger variety of functions against the background of multimedia concepts.

It has heretofore been known that, in a camera arranged to photograph a subject by utilizing an image pickup element, since pixels are discretely arranged, an aliasing distortion or a color moire occurs in the case of a subject having a high spatial frequency in theory. To prevent the occurrence of the aliasing distortion or the color moire, such a camera has a crystal low-pass filter (hereinafter referred to as the "crystal LPF") disposed in an photographing optical path. The crystal LPF serves to prevent the occurrence of the aliasing distortion and a false color by defocusing a subject image by means of its double refraction and suppressing the high-frequency component contained in the subject image to a frequency below the Nyquist frequency determined by the pixel arrangement of the image pickup element.

If the aforesaid camera is utilized as a peripheral for a multimedia system it will be necessary to perform not only color photography but also high-resolution photography such as photography of a document or the like. It is desired, therefore, to increase the number of functions of the camera for the purpose of realizing the high-resolution photography. For example if an object basically represented in black and white, such as a document, is to be photographed, it will be sufficient to use black-and-white photography which involves no false color. In the case of the black-and-white photography, there may be a case where a higher resolution is preferable to the suppression of a distortion. To cope with this case, it has been proposed to provide a camera having a high-resolution photographing mode in addition to a standard-resolution photographing mode for normal photography. The high-resolution photographing mode is a method which is intended to realize high-resolution photography by removing the crystal LPF from the photographing optical path or by changing the crystal LPF for a crystal LPF capable of transmitting a spatial frequency higher than the aforesaid crystal LPF.

However, even in the case of the high-resolution photographing mode, it is impossible to completely remove the aliasing distortion. For this reason, if photography is to be performed in the high-resolution photographing mode it is necessary to set an aperture-diameter optimum for the pixel pitch of an image pickup element used, thereby cutting high-frequency components by means of a reduced aperture diameter. For example, if use is made of an iris of the type which is commonly used in ordinary video lenses or the like, i.e., an iris made up of two blades each having an ND filter bonded thereto for adjusting the amount of lights it is impossible to mare the shape of an aperture opening completely circular. Under the influence of a diffraction due to the incompletely circular shape of the aperture opening, it will be impossible to set the aforesaid optimum aperture diameter. In the case of a fully open aperture diameter which is used during photography in the standard-resolution photographing mode, an inclination of the image pickup element with respect to an optical axis appears as a partial, peripheral defocus. For this reason, it is necessary to specially limit the size of the fully open aperture diameter.

As is apparent from the above description, in the case of the black-and-white high-resolution photographing mode, merely by removing the crystal LPF from the optical path, it is impossible to solve the above-described various problems due to the iris and it is also impossible to achieve a high-resolution photographing mode which is satisfactory in terms of performanes.

In the field of video signal processing for the above-described image pickup apparatus, such as an electronic camera or a video camera, digital video signal processing has recently been becoming popular so that signal processing capable of coping with an image signal of higher-image quality can be realized or so that the exchange of data between the image pickup apparatus and other apparatus can be facilitated.

Conventionally since the digital video signal processing is all performed in an IC digital process circuit it has been impossible to achieve efficient processing. in additions since alteration or the like of the characteristics of the digital process circuit is impossible it is necessary to design a dedicated digital process circuit for each system circuit, so that it is impossible to realize a system having versatility.

For the above-described reasons, it has been impossible to perform the digital signal processing of the video signal smoothly rapidly and efficiently, and it has also been impossible to externally alter various kinds of processing such as signal processing, adjustment or correction in addition, it is impossible to provide a system having good versatility, and it is difficult to realize a wide variety of signal processing corresponding to multimedia techniques.

SUMMARY OF THE INVENTION

A first object of the present invention which has been made in light of the above-described problems is, therefore, to provide an image pickup apparatus capable of affecting optimum photography in either of a standard-resolution photographing mods and a high-resolution photographing modes.

A second object of the present invention is to provide an image pickup apparatus capable of affecting optimum iris control in either of the standard-resolution photographing mode and the high-resolution photographing mode.

A third object of the present invention is to provide an image pickup apparatus which is capable of performing digital signal processing of a video signal smoothly, rapidly and efficiently, which allows various kinds of processing, such as signal processing, adjustment or correction, to be readily altered or adjusted as required, and which has good versatility corresponding to multimedia techniques.

To achieve the above-described objects, according to one aspect of the present invention, there is provided an image pickup apparatus which comprises photographing-mode setting means for switchably setting a standard-resolution photographing mode for performing photography with a standard resolution and a high-resolution photographing mode for performing photography with a high resolution compared to the standard-resolution photographing mode, and control means for varying the control of the iris means according to whether the standard-resolution photographing mode or the high-resolution photographing mode is set by the photographing-mode setting means.

To achieve the above-described objects, according to another aspect of the present invention, there is provided an image pickup apparatus which comprises photographing-mode setting means for switchably setting a standard-resolution photographing mode for performing photography with a standard resolution and a high-resolution photographing mode for performing photography with a high resolution compared to said standard-resolution photographing mode and control means for varying the aperture diameter of an iris according to whether the standard-resolution photographing mode or the high-resolution photographing mode is set by the photographing-mode setting means.

To achieve the above-described objects, according to another aspect of the present invention, there is provided an image pickup apparatus which comprises photographing-mode setting means for switchably setting a standard-resolution photographing mode for performing photography with a standard resolution and a high-resolution photographing mode for performing photography with a high resolution compared to the standard-resolution photographing mode, a first low-pass filter for performing photography in the standard-resolution photographing mode, a second low-pass filter for performing photography in the high-resolution photographing mode, filter selecting means for performing a filter selecting operation interlocked with a mode selecting operation of the photographing-mode setting means, the filter selecting means being arranged to select the first low-pass filter when the standard-resolution photographing mode is set by the photographing-mode setting means and to select the second low-pass filter when the high-resolution photographing mode is set by the photographing-mode setting means and iris controlling means for performing switching between aperture diameters of the iris in interlocking relation to the filter selecting operation of the filter selecting means to perform switching between the first low-pass filter and the second low-pass filter.

To achieve the above-described objects according to another aspect of the present invention, there is provided an image pickup apparatus which comprises image pickup means storage means for storing a picked-up image signal outputted from the image pickup means and subjected to A/D conversion, digital process means for reading the picked-up image signal stored in the storage means and performing a predetermined video signal processing of the read picked-up image signal, program storing means which stores a predetermined signal processing program for performing predetermined signal processing of the picked-up image signal read from the storage means, and control means for applying the predetermined signal processing to the picked-up image signal read from the storage means, in parallel with the predetermined video signal processing of the digital processing means on the basis of the program stored in said program storing means.

In the above-described image pickup apparatus, it is possible to realize optimum iris characteristics, respectively, according to the standard-resolution photographing mode for performing photography in the standard-resolution photographing mode and the high-resolution photographing mode for performing photography in the high-resolution photographing mode compared to the standard-resolution photographing mode. Switching between the iris characteristics can be automatically performed in interlocking relation to switching between both photographing modes, whereby it is possible to automatically realize an optimum photographic state at all times irrespective of which of the photographing modes is selected.

In addition, the processing of the picked-up image signal is shared by the digital processing means and the control means, and the storage means is efficiently utilized. Accordingly, it is possible to perform the digital signal processing of the picked-up image signal smoothly, rapidly and efficiently, and various kinds of adjustments and corrections are facilitated. In addition, it is possible to provide a digital video signal processing system having versatility improved to a great extent and hence applicable to other systems. In addition it is possible to readily cope with various kinds of photographing modes, photographic environments and specifications merely by varying the program, so that it is possible to perform various kinds of signal processing according to different statuses.

The above and other objects, features and advantages of the present invention will become apparent from the following detailed description of a preferred embodiment of the present invention taken in conjunction with the accompanying drawings.

BRIEF DESCRIPTION OF THE DRAWINGS

FIG. 1 is an exploded, perspective view of a camera body to which an embodiment of an image pickup apparatus according to the present invention is applied;

FIGS. 3(a), 3(b) and 3(c) are views showing the construction of a connector cover of the camera body;

FIGS. 11(a) and 11(b) are views aiding in describing a switching part for the optical low-pass filter (LPF) of the camera body;

FIGS. 13(a) 13(b) and 13(c) are views showing the operational principle of the iris unit of the camera body;

FIG. 14 is an exploded, perspective view showing an annotation unit which is removably connected to the camera body;

FIG. 34 is a flowchart showing the processing of the pre-exposure operation of Step S107 of FIG. 25;

FIG. 35 is a flowchart showing the shutter speed determining processing of Step S110 of FIG. 25.

DETAILED DESCRIPTION OF THE PREFERRED EMBODIMENT

Figure 2A:
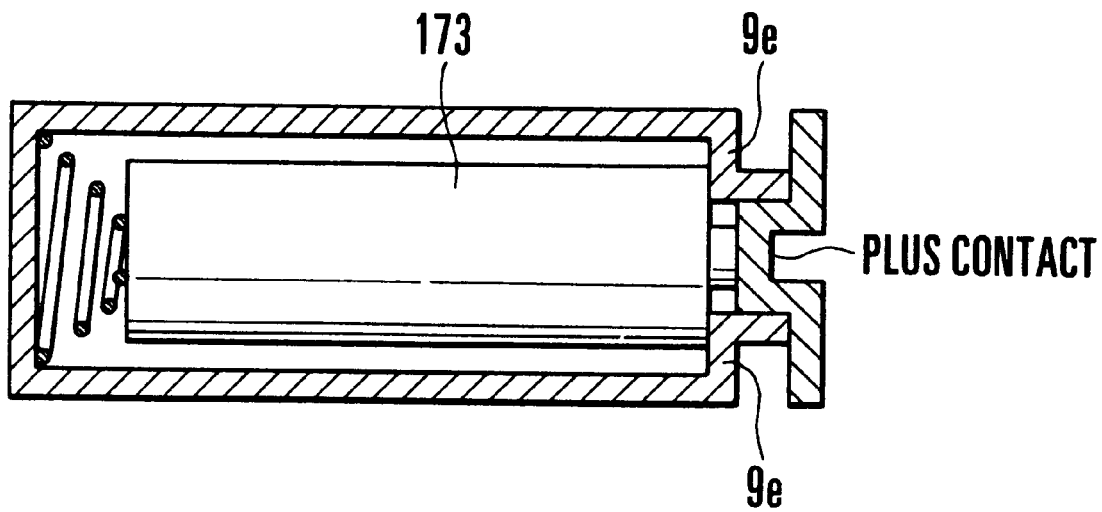
FIGS. 2(a) and 2(b) are views showing the construction of a battery box of the camera body.

One embodiment of the present invention will be described below in detail with reference to the accompanying drawings.

FIG. 1 is an exploded, perspective view showing an electronic camera to which an image pickup apparatus according to the embodiment of the present invention is applied.

First of all, the arrangement of a camera body of the electronic camera will be described below. Referring to FIG. 1, a camera body A has a front cover 1, and a camera optical system 3, a flash unit 6 and a main circuit board unit 5 provided with various electronic circuits are fixed to the front cover 1 by fixing means, such as machine screws. A back cover 2 is secured to the back side of the front cover 1.

A tripod screw 6 which is used for fixing the camera body A to a tripod is secured to a bottom 1a of the front cover 1. A recess portion 1c is formed above a grip portion 1b, and a release button 7 is provided in the recess portion 1c. A flash emission part 1d is disposed above the recess portion 1c, and a mount 1e is formed on the right side of the recess portion 1c as viewed in FIG. 1. The front cover 1 is also provided with a screw hole 1f which allows an accessory, such as an annotation unit which will be described later, to be fixedly connected to the camera body A.

The release button 7 constitutes part of a two-stroke switch SW which has a switch SW1 (not shown) and a switch SW2 (not shown). The switch SW1 is turned on at the first stroke and the switch SW2 is turned on at the second stroke. A photographer can securely grip the electronic camera by placing the index finger (of the right hand) on the release button 7, the middle fingers the third finger and the little finger on the grip portion 1b and the thumb on the back cover 2. The size of the recess portion 1c is selected so that the index finger can be fully accommodated into the recess portion 1c and the recess portion 1c has a layout such that the flash emission part 1d is positioned above the recess portion 1c. Owing to the above-described arrangement, the photographer can grip the electronic camera and press the release button 7 without intercepting flash light emitted from the flash emission part 1d.

The inside of the grip portion 1b serves as a battery box, and a rechargeable, secondary battery 8 or a size-AA battery pack 9 made up of dry batteries, such as six size-AA dry batteries, can be fitted into the inside of the grip portion 1b. The secondary battery 8 is fitted into the grip portion 1b in such a manner that contact portions 8a and 8b are connected to corresponding power source terminals (not shown) of the camera body A. The size-AA battery pack 9 includes a battery pack body 9c and six size-AA dry batteries loaded in the battery pack body 9c. If the size-AA battery pack 9 is loaded in a prescribed manner, the six size-AA dry batteries are connected in series, and the terminal voltage of the six size-AA dry batteries can be provided at contact portions 9a and 9b.

Figure 2B:
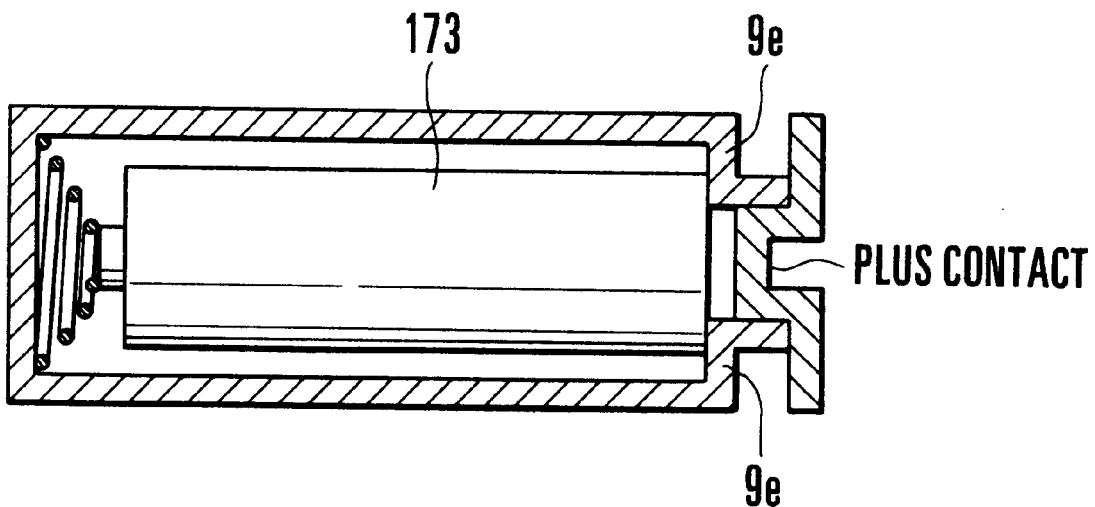

As show in FIG. 2(a), stoppers 9e for supporting the shoulder of the plus-terminal side of a battery 173 are formed in the battery-loading portion of the battery pack body 9c on a side where the plus terminal of the battery 173 is to be located. The stoppers 9e constitute a mechanism for preventing reverse loading of the battery 173. As shown in FIG. 2(b), if the battery 173 is loaded in a state opposite to a prescribed one, no connection is provided at the plus terminal of the battery 173, whereby voltage is prevented. from being provided at the contact portions 9a and 9b of the size-AA battery pack 9.

The shape of a peripheral portion 9d which surrounds the contact portions 9a and 9b of the size-AA battery pack 9 is selected to be identical to the shape of a peripheral portion 8d which surrounds the contact portions 8a and 8b of the secondary battery 8. Accordingly, if the size-AA battery pack 9 is loaded into the camera body A, the power source voltage of the size-AA battery pack 9 can be supplied to the electronic camera through the contact portions 9a and 9b. A kind-of-battery detecting switch (not shown) is provided for detecting whether the secondary battery 8 or the size-AA battery pack 9 is loaded.

As shown in FIG. 1, the mount 1e is formed integrally with the front cover 1, and the camera optical system 3 is secured to the front cover 1 in such a manner that the optical axis of the image pickup optical system of the camera optical system 3 and the optical axis of the mount 1e coincide with each other. The mount 1e is a known bayonet type of mount on which to mount various elements which will be described later, such as a converter lens or an attachment for allowing a filter to be mounted on the mount 1e. A converter lens detecting switch (not shown) is provided for detecting whether the converter lens is mounted.

The main circuit board unit 5 is a circuit board on which various electrical circuits are formed. As shown in FIG. 1, the main circuit board unit 5 is provided with an I/F (interface) connector (female) 10 and a DC jack 11 on a side opposite to the grip portion 1b (on the right side of the main circuit board unit 5 as viewed in FIG. 1). The I/F connector (female) 10 is provided for enabling communication with an external apparatus, such as a computer, through an I/F cable C1 or the like. A cutout 1g is formed in the right-side portion of the front cover 1 so that the face of the main circuit board unit 5 on which the I/F connector (female) 10 is mounted can be brought into tight contact with the edge portion of the back side of the front cover 1.

If the I/F connector (female) 10 remains exposed to the outside with the I/F cable C1 removed, dust or the like may adhere to the terminal of the I/F connector (female) 10, causing a contact failures For this reason, if the I/F cable C1 is not connected, a connector cover 12 can be used to cover the I/F connector (female) 10.

Figure 4A:
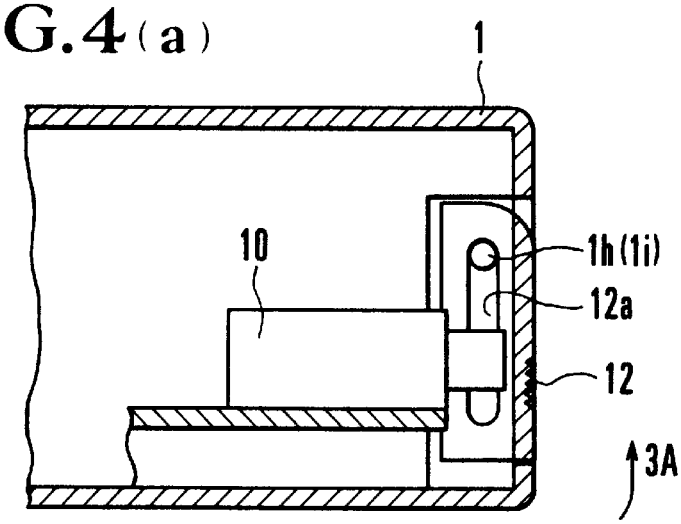
FIGS. 4(a), 4(b) and 4(c) are views showing the construction of the connector cover of the camera body.
Figure 4B:
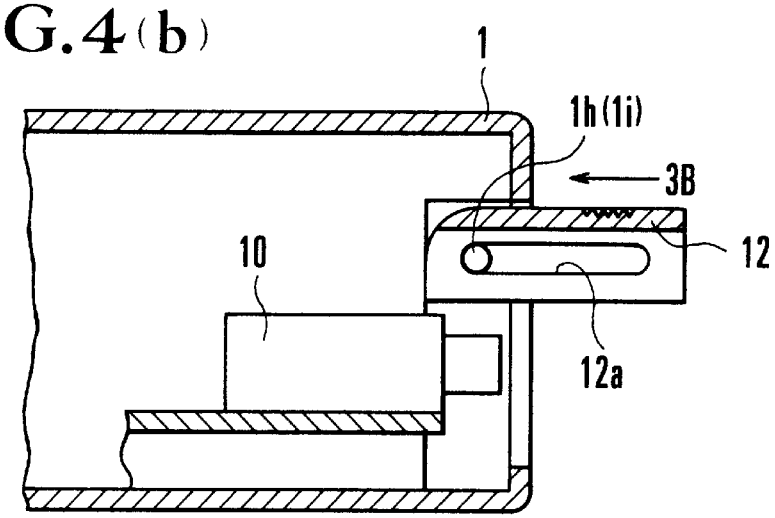
Figure 4C:
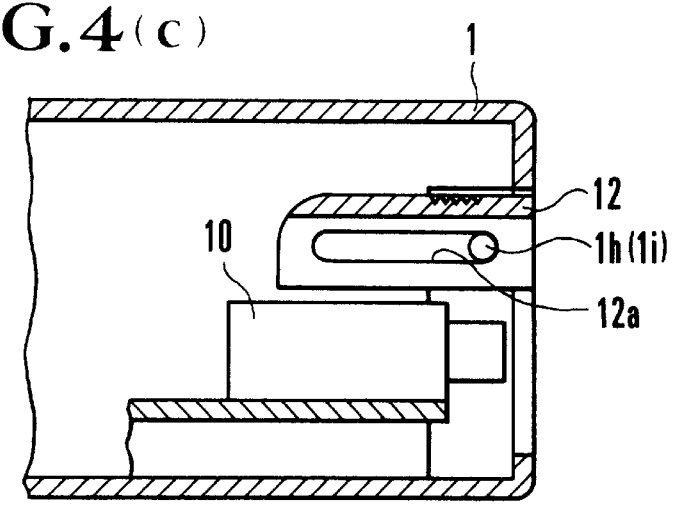

FIGS. 3(a) to 3(c) and 4(a) to 4(c) shows the structure and the operation of the connector cover 12. FIGS. 3(a) and 4(a) show the state in which the connector cover 12 is closed, FIGS, 3(b) and 4(b) show the state in which the connector cover 12 is opened in the direction indicated by an arrow 3A, and FIGS. 3(c) and 4(c) show the state in which the connector cover 12 is accommodated into the camera body A.

As shown in FIGS. 3(a) to 3(c) and 4(a) to 4(c), the connector cover 12 has a guide slot 12a and a guide slot 12b (not shown), and pins 1h and 1i provided in the cutout 1g of the front cover 1 are fitted into the respective guide slots 12a and 12b. If the connector cover 12 is made to rotate in the direction of the arrow 3A with the pin 1h located in a portion 12c of the guide slot 12a (FIGS. 3(a) and 4(a)) and is then forced in the direction of an arrow 3B (FIGS. 3(b) and 4(b)), the connector cover 12 can be accommodated into the camera body A (FIGS. 3(c) and 4(c)). Referring back to FIG. 1, a removable cover 13 for covering a clock backup battery is screw-mounted on the back cover 2. By removing the removable cover 13 from the back cover 2, it is possible to replace the clock backup battery loaded on the main circuit board unit 5. A removable cover 14 for covering a built-in RAM backup battery is also screw-mounted on the back cover 2. By removing the removable cover 14 from the back cover 2, it is possible to replace the built-in RAM backup battery loaded on the main circuit board unit 50

Figure 5:
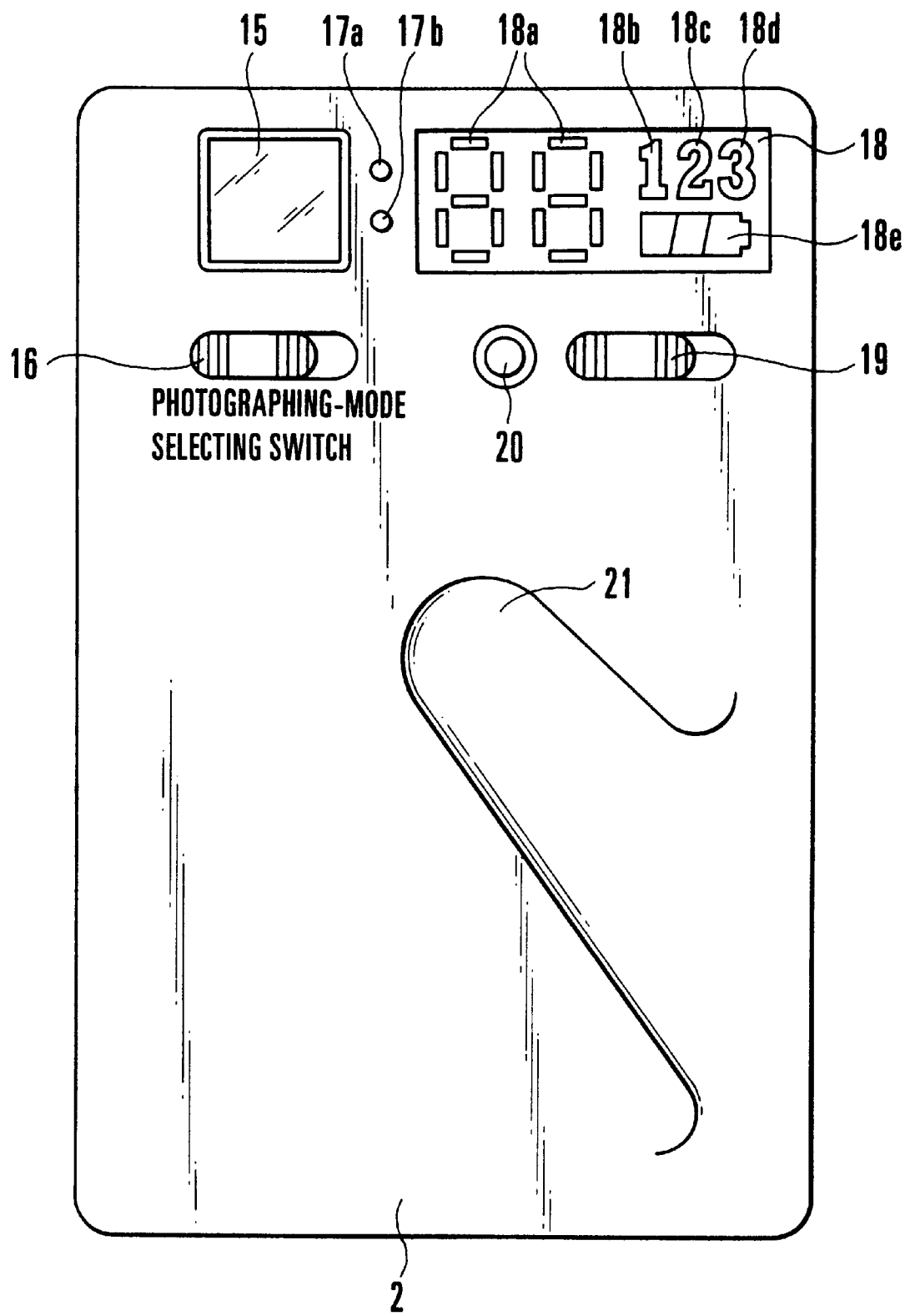
FIG. 5 is a rear side view of the camera body.

FIG. 5 is a schematic view showing the state of the back cover 2 as viewed in the direction of an arrow 1A of FIG. 1. The back cover 2 includes a viewfinder eyepiece portion 15, a photographing-mode selecting switch 16 for selecting either one of a color standard-resolution photographing mode and a black-and-white high-resolution photographing mode, a red LED 17a and a green LED 17b. The red and green LEDs 17a and 17b are used for issuing a warning or the like associated with photography and are disposed so that the photographer can view the red and green LEDs 17a and 17b while looking into the viewfinder eyepiece portion 15.

The back cover 2 also includes a display LCD part 18 made up of 2-digit 7-segments 18a, LCDs 18b, 18c and 18d for respectively displaying the numerical characters "1", "2" and "3" indicative of the kinds of operating modes, and a display part 18e for indicating the remaining amount of battery power. The back cover 2 also includes a slide switch 19 for switching on or off the power source of the electronic camera, and a button switch 20 for switching the operating modes of the electronic camera. Each time the button switch 20 is manipulated, the operating modes are switched cyclically in the order of "1"→"2"→"3"→"1", so that the LCDs 18b, 18c and 18d for displaying the kinds of operating modes are correspondingly switched in the order of "1"→"2"→"3"→"1". Incidentally, a thumb receiving portion 21 is provided on the back cover 2.

Figure 6:
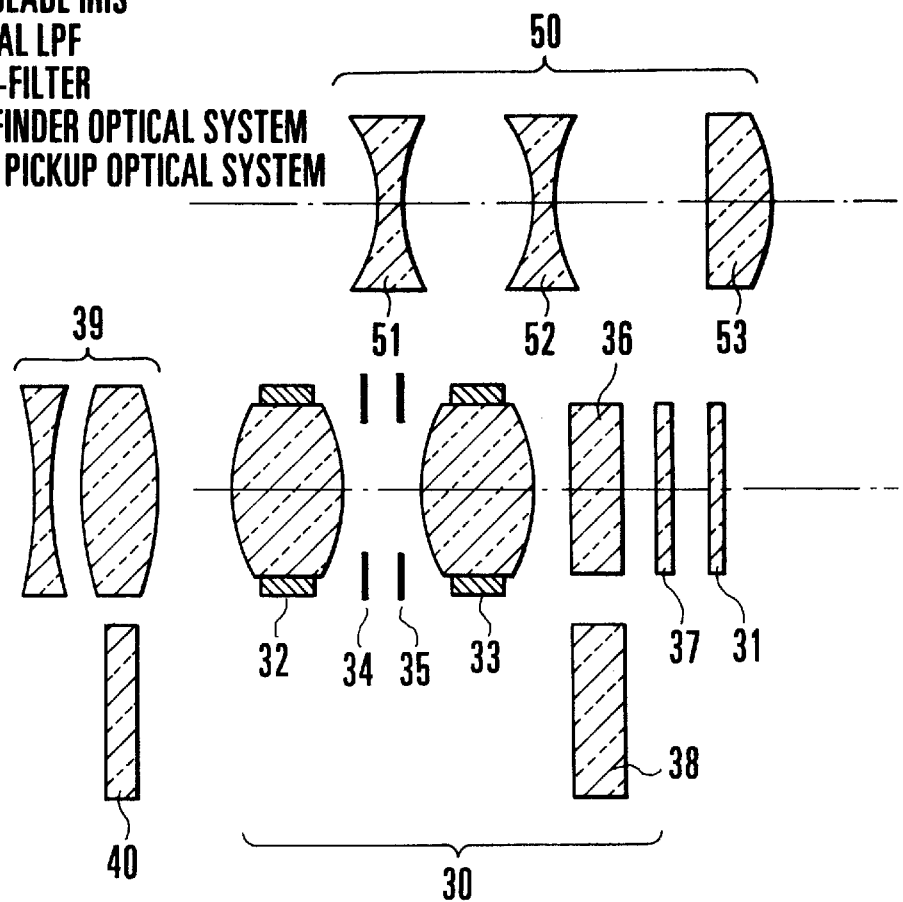
FIG. 6 is a view showing the image pickup optical system of the camera body.

The camera optical system 3 will be described below in detail with reference to FIG. 6. The camera optical system 3 is made up of two major portions, an image pickup optical system 30 and a viewfinder optical system 50.

The image pickup optical system 30 serves to focus light from a subject (not shown) onto an image pickup element 31, such as a CCD, (hereinafter referred to as the CCD 31) which is disposed at the back of the image pickup optical system 30. The image pickup optical system 30 includes a photographing lens group made up of two lens groups, i.e., a front lens group 32 and a rear lens group 33, a two-blade iris 35 located between the front lens group 32 and the rear lens group 33, and correcting plates, such as a crystal LPF 36 and an IR cut-filter [37], disposed at the back of the rear lens group 33. The image pickup optical system 30 also includes a fixed iris 34 which is inserted into an optical path in the case of the high-resolution photographing mode or retracted from the optical path in the case of the standard-resolution photographing mode The fixed iris 34 will be described later in detail.

A front converter lens 39, such as a wide-angle converter lens, or various filters, such as a polarizing filter 40, can be attached on the subject side of the image pickup optical system 30. As described above, the-camera body A is provided with the detecting switch for detecting the kind of converter lens or filter attached, and is arranged to vary its photographic state according to the detected kind. For example if the wide-angle converter lens is attached, a focusing lens is fixed at its infinity distance position in a panfocus states and an autofocus (AF) operation is stopped so that a power saving can be affected.

The crystal LPF 36 serves to prevent occurrence of an aliasing distortion and a false color by defocusing a subject image by means of its double refraction and suppressing the high-frequency component contained in the subject image to a frequency below the Nyquist frequency determined by the pixel arrangement of the image pickup element (the CCD 31).

If an object basically represented in black and white such as a document, is to be photographed, it will be sufficient to use black-and-white photography which involves no false color. In additions in such black-and-white photograph there may be a case where a higher resolution is preferable to the suppression of a distortion. To cope with this case, the image pickup optical system 30 has the function of retracting the crystal LPF 36 from the image pickup optical path. However, if the crystal LPF 36 is simply retracted from the optical path, the equivalent, optical path length of the image pickup optical system 30 will vary. For this reason, after the crystal LPF 36 has been retracted, an optical-path-length correcting plate 38 is inserted into the image pickup optical path so that a focusing position and aberrations, such as a spherical aberration or a curvature of field, can be corrected.

Correcting plates commonly used in cameras have a construction in which an IR cut-filter is sandwiched between crystal LPFS. In the present embodiment, since the crystal LPF 36 is retractably inserted into the image pickup optical path, an IR cut-filter 37 and the crystal LPF 36 are separately arranged and the IR cut-filter 37 is independently disposed in the image pickup optical path irrespective of the insertion or retraction of the crystal LPF 36.

In addition, if the two-blade iris 35 is a two-blade iris of the type which is commonly used in ordinary video lenses or the like and made up of two blades each having an ND filter bonded thereto for adjusting the amount of light, an aliasing distortion may occur or no sufficient focusing performance (resolutions may be obtained during photography in the high-resolution photographing mode owing to the influence of a diffraction due to the shape of an aperture opening. For this reason, in the present embodiment, if the crystal LPF 36 is retracted,the two-blade iris 35 is fully opened and the fixed iris 34 having a circular opening with an optimum diameter which is least susceptible to the influence of a diffraction due to the shape of the aperture opening is inserted in the image pickup optical path.

In addition, since the resolution is made high in the high-resolution photographing modes the accuracy of movement of the focusing lens in the high-resolution photographing mode is required to be higher than in the standard-resolution photographing mode. Although highly precise components, such as a high-precision motor and a high-precision speed reducing mechanism, are needed for the above-described reason, such highly precise components are generally costly and are not easy to assemble. Accordingly, in the present embodiment, the aperture diameter of the fixed iris 34 which is inserted during the high-resolution photographing mode is made smaller than the fully open aperture diameter of the two-blade iris 35 to provide a sufficient depth of field in an image planes so that it is possible to cope with the movement of the focusing lens in the high-resolution photographing mode with an accuracy equivalent to the accuracy of the focusing lens in the standard-resolution photographing mode.

The viewfinder optical system 50 for observing a field of photography will be described below. The viewfinder optical system 50 is an external viewfinder as shown in FIG. 6. in the case of the viewfinder optical system 50 of the type which is disposed outside the image pickup optical system 30, a parallax occurs in principle. Particularly during close-up photography, the parallax will frequently Occur. To cope with the parallax, in the present embodiment, the viewfinder optical system 50 is disposed at a location immediately above and as close as possible to the image pickup optical system 30 so that a minimum amount of parallax is allowed to occur only vertically.

Figure 7:
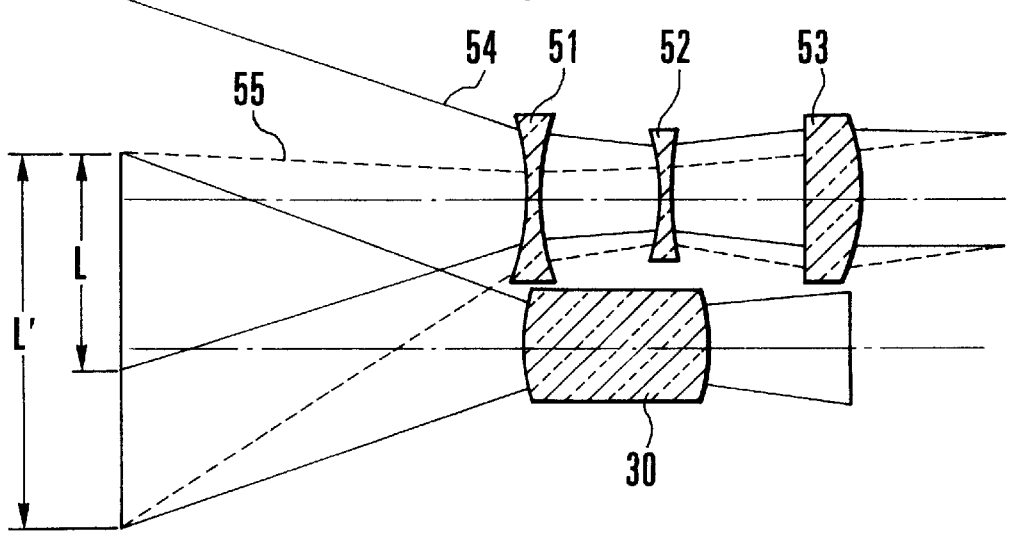
FIG. 7 is a view showing the image pickup optical system of the camera body.

More specifically, if a light ray 54 coming from a normal photography distance is taken into account to determine the respective effective light-ray diameters of a plurality of lenses 51, 52 and 53, the field of view of the viewfinder optical system 50 becomes limited to an extent L' which is unable to cover a field of view L of the image pickup optical system 30. For this reason, in the present embodiment, a light ray 55 which comes from a close-up photography distance as shown by a dashed line is also taken into account, and the lenses 51, 52 and 53 of the viewfinder optical system 50 are selected to have different shapes so that their respective effective portions can be made asymmetrical with respect to the optical axis of the viewfinder optical system 50 to extend toward a side which faces the image pickup optical system 30 (toward the lower side as viewed in FIG. 7). The above-described arrangement makes it possible to completely cover the close-up photography area L of the image pickup optical system 30 within the field of view of the viewfinder optical system 50 at the close-up photography distance.

Figure 8:
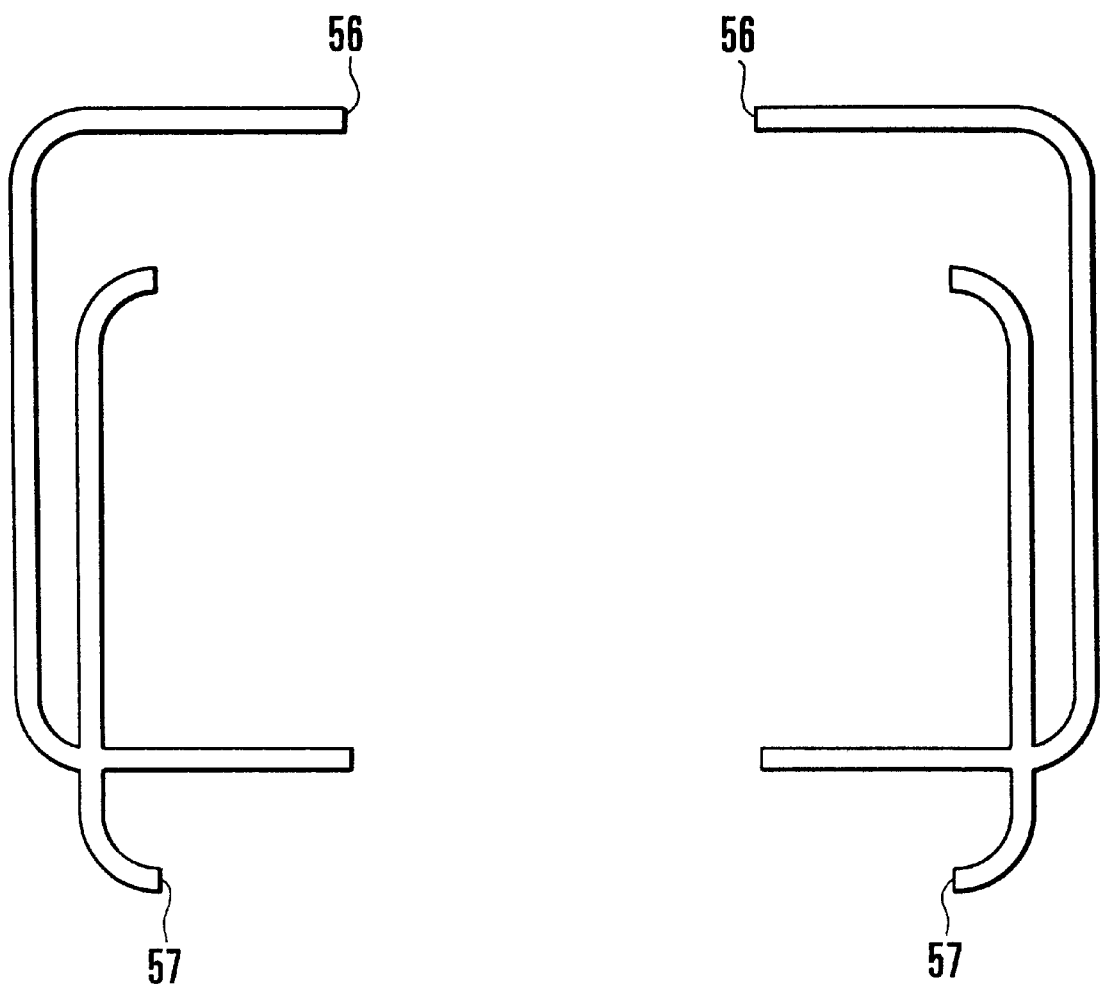
FIG. 8 is a view showing a display provided in the viewfinder of the camera body.

In the above-described arrangement, as shown in FIG. 8, it is only necessary to dispose a field-of-view frame 57 indicative of the close- up photography area L in the state of being shifted from a field-of-view frame 56 indicative of a normal photography area in only one vertical direction.

Accordingly, during close-up photography, the photography can readily and naturally perform a secure framing operation.

In addition, the viewfinder optical system 50 is disposed so that the distance between the optical axis of the image pickup optical system 30 and the optical axis of the viewfinder optical system 50 can be set to the distance required to prevent vignetting of passing light rays from occurring when a converter lens is disposed in front of the image pickup optical system 30 and the viewfinder optical system 50.

The arrangement of a lens barrel system which realizes the optical arrangement of the camera optical system 3 will be described below with reference to FIGS. 9 and 10.

Figure 9:
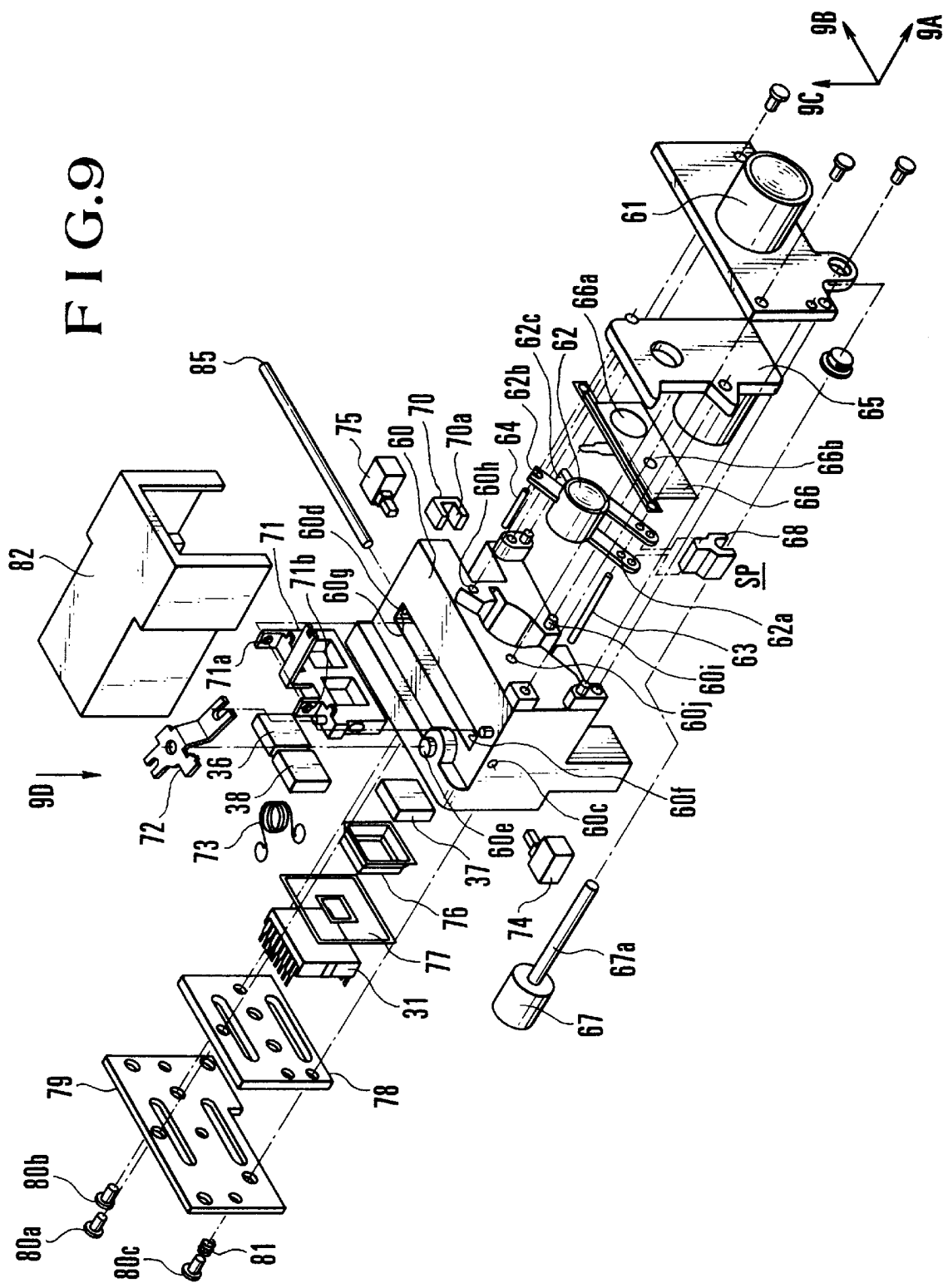
FIG. 9 is an exploded, perspective view showing of the lens barrel portion of the camera body.
Figure 10:
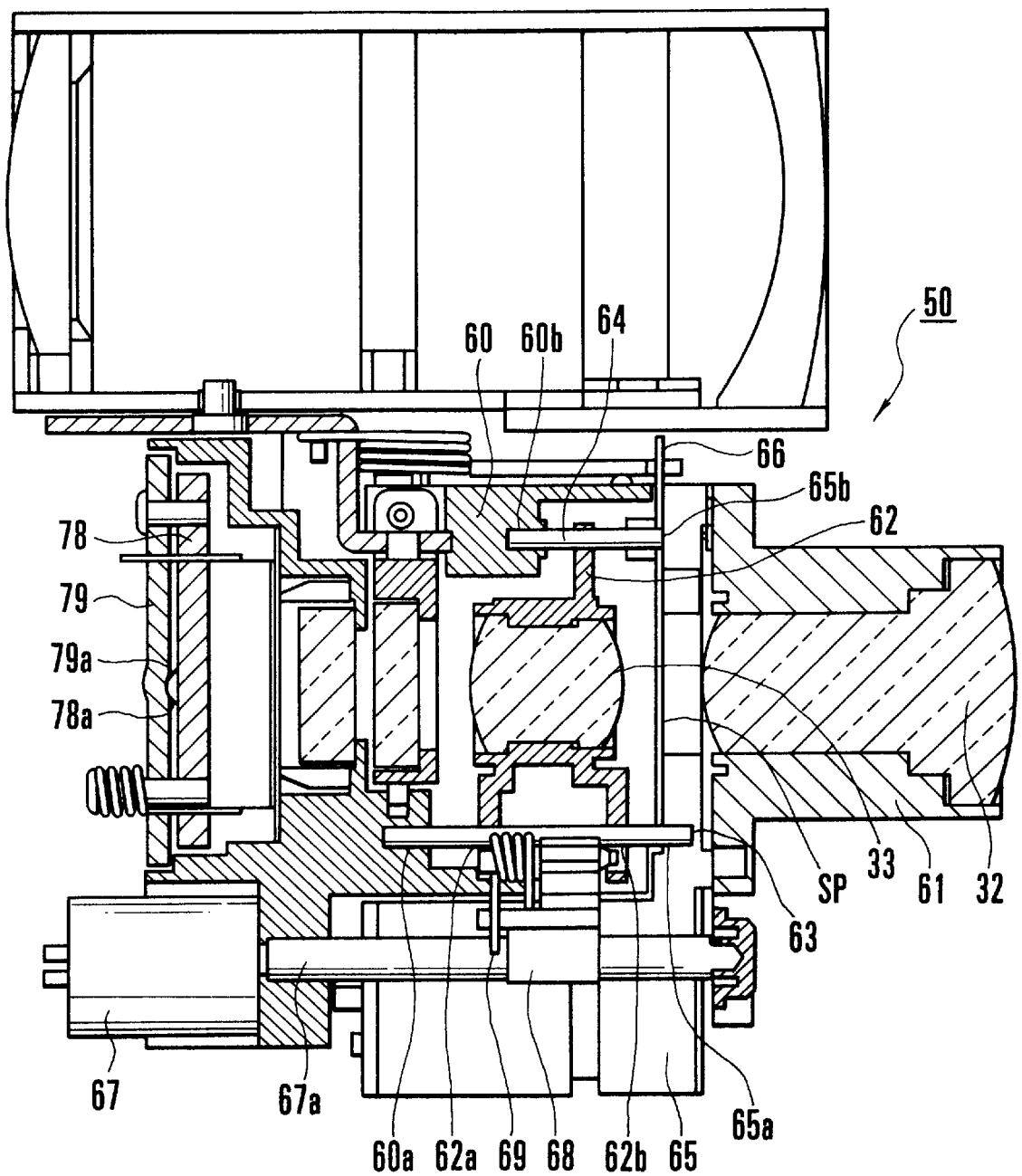
FIG. 10 is a cross-sectional view of the lens barrel portion of the camera body.

Referring to FIGS. 9 and 10, a front lens group tube 61 and a rear lens group tube 62 are respectively provided for integrally holding the front lens group 32 and the rear lens group 33 by a known method, such as caulking, in accordance with a predetermined optical arrangement. The front lens group tube 61 is fixed to a base plate 60 by a machine screw, while the rear lens group tube 62 is axially movably supported by guide shafts 63 and 64 provided on the base plate 60 which are respectively fitted into guide openings 62*a* and 62*b* formed in the rear lens group tube 62.

An iris unit 65 is positioned with respect to the base plate 60 by pins 60*h* and 60*i*. Wlhen the front lens group tube 61 is fixed to the bass plate 60, the iris unit 65 is simultaneously clamped between the pins 60*h* and 60*i* and fixed in the direction of the optical axis of the camera optical system 3 (in the direction of an arrow 9A). In addition, at this time, the guide shafts 63 and 64 are positioned and fixed by positioning holes 60*a* and 60*b* provided in the base plate 60 as well as positioning holes 65*a* and 65*b* provided in the iris unit 65 (with a small tolerance remaining in the direction of the optical axis).

A fixed iris plate 66 is positioned in a space SP between the iris unit 65 and the base plate 60, and is held and guided for movement in the direction of an arrow 9B by the pin 60*h* of the iris unit 65 and a pin 60*j* provided on the base plate 60. The fixed iris plate 66 has two large and small fixed apertures 66*a* and 66*b*. The large fixed aperture 66*a* is a fixed aperture to be used for the color standard-resolution photographing mode, and, in the case of the color standard-resolution photographing mode, an aperture diameter set by the iris unit 65 date determines a substantial aperture diameter of the image pickup optical system 30. The small fixed aperture 66*b* is a fixed aperture to be used for the black-and-white high-resolution photographing mode with the crystal LPF 36 retracted. In the case of the black-and-white high-resolution photographing mode, since the aperture diameter of the iris unit 65 is set to a fully open aperture diameter, the aperture diameter of the small fixed aperture 66*b* determines a substantial aperture diameter of the image pickup optical System 30.

A focusing stepping motor 67 is provided for driving the rear lens group tube 62 in the direction of the optical axis, and serves to adjust the focus of the image pickup optical system 30. A worm 67*a* is provided on the output shaft of the stepping motor 67, and a member 68 is mashed with the groove of the worm 67*a* by being urged by a torsion spring 69. The member 68 is fixed to the rear lens group tube 62 by a shaft integrally provided on the member 68. Accordingly, the rotary motion of the stepping motor 67 is translated into a rectilinear motion in the direction of the optical axis according to the lead of the worm 67*a* by the cooperative action of the worm 67*a* and the member 68. The torsion spring 69 not only urges the worm 67a but also has the function of preventing occurrence of a play, a backlash or the like in the rectilinear direction. Since this function is a known art, detailed description thereof is omitted.

A photointerruptor 70 is arranged to vary its output when a portion 62c of the rear lens group tube 62 traverses a detection portion 70a of the photointerruptor 70. Accordingly, an absolute position (reference position) of the rear lens group tube 62 in the moving stroke thereof can be determined by driving the rear lens group tube 62 to a position where the output of the photointerruptor 70 varies. After the absolute position has been determined, it is possible to calculate the position of the rear lens group tube 62 by counting the number of driving pulses of the stepping motor 67.

In actual assembly, after the rear lens group tube 62 has been assembled, the rear lens group tube 62 is scanned within a movable range while a subject at infinity is being photographed, thereby finding a position where the high-frequency component of a video signal reaches a maximum The number of driving pulses of the stepping motor 67 which are generated during the movement of the rear lens group tube 62 from the reference position is stored as a focus adjustment value relative to the subject at infinity.

Similarly, the rear lens group tube 62 is scanned within a movable range while a subject at a closest distance is being photographed, thereby finding a position where the high-frequency component of a video signal reaches a maximum. The number of driving pulses of the stepping motor 67 which are generated during the movement of the rear lens group tube 62 from the reference position is stored as a focus adjustment value relative to the subject at the closest distance incidentally the number of driving pulses of the stepping motor 67 which is relative to the subject at the closest distance may be calculated from the difference between a lens design value indicative of the number of pulses relative to the subject at infinity and a lens design value indicative of the number of pulses relative to the subject at the closest distance, and the thus-obtained number of driving pulses may be stored as a focus adjustment value relative to the subject at the closest distance.

The crystal LPF 36 and the optical-path-length correcting plate 38 are fixed to a filter holding frame 71 by adhesion. The filter holding frame 71 is held for sliding movement in the base plate 60 in the direction of the arrow 9B by a guide shaft 85 which is positioned by holes 60c and 60d of the bass plate 60 and fitted through guide holes 71a and 71b of the filter holding frame 71.

A mechanism for sliding the filter holding frame 71 will be described below with reference to FIGS. 11(a) and 11(b).

FIGS. 11(a) and 11(b) are views taken in the direction of an arrow 9D of FIG. 9, and the arrows 9A and 93 shown in FIGS. 11(a) and 11(b) indicate directions identical to those indicated by the arrows 9A and 9B shown in FIG. 9. The arrangement shown in FIGS. 11(a) and 11(b) includes the filter holding frame 71, the fixed iris plate 66, a filter selecting lever 72, a toggle spring 73, the photographing-mode selecting switch 16 and state-of-selection detecting switches 74 and 75.

The filter selecting lever 72 is secured rotatably about a pin 60e of the base plate 60 by a hole 72a being fitted onto the pin 60e. A cutout portion 72b is engaged with a pin 71c of the filter holding frame 71, while a cutout portion 72c is engaged with the photographing-mode selecting switch 16. If the photographer selects the color standard-resolution photographing mode by manipulating the photographing-mode selecting switch 16, the mechanism is set to the state shown in FIG. 11(a) and the crystal LPF 36 and the large fixed aperture 66a are inserted into the image pickup optical path.

During the state shown in FIG. 11(a), the toggle spring 73 gives forces in both directions in which its arm are made to open (in both directions indicated by an arrow 9E in FIG. 11(a)) whereby the filter holding frame 71 is forced against a wall 60f of the base plate 60 in a firmly positioned state. In additions the state-of-selection detecting switch 74 is turned on by being forced by the filter holding frame 71, whereby the color standard-resolution photographing mode is detected.

If the photographer selects the black-and-white high-resolution photographing mode by manipulating the photographing-mode selecting switch 16, the mechanism is switched to the state shown in FIG. 11(b). The filter holding frame 71 and the fixed iris plate 66 connected thereto are moved in the direction of the arrow 9B shown in FIGS. 11(a) and 11(b) and the optical-path-length correcting plate 38 and the small fixed aperture 66b are inserted into the image pickup optical path. During the state shown in FIG. 11(b) the toggle spring 73 gives forces in both directions in which the arms are made to open (in both directions indicated by the arrow 9E in FIG. 11(a)), whereby the filter holding frame 71 is forced against a wall 60g of the base plate 60 in a firmly positioned state. In addition, the state-of-selection detecting switch 75 is turned on by being forced by the filter holding frame 71, whereby the black-and-whits high-resolution photographing mode is detected.

Referring back to FIG. 9, the IR cut-filter 37 is fixedly pressed against the base plate 60 by a rubber bushing 76 being compressed by the CCD 31. A light blocking film 77 for preventing unnecessary light from entering the CCD 31 is provided between the CCD 31 and the rubber bushing 76.

In the case of the present electronic camera or a similar camera having the function of performing photography in the high-resolution photographing mode, component precision is strictly controlled in the incorporation of the CCD 31 into the image pickup optical system 30, but if the CCD 31 is simply connected to the image pickup optical system 30 without adjusting the CCD 31 with respect to the optical axis, the phenomenon in which the position of focus on one end of a picture differs from that of focus on the other end of the picture, i.e., a partial, peripheral defocus, occurs. For this reason, in the present electronic camera, to realize high resolution over the entire picture, inclination adjustment is mechanically performed during the processing of securing the CCD 31 to the base plate 60. An arrangement for realizing such inclination adjustment will be described below.

The CCD 31 is bonded to a CCD mounting plate 78, and an adjusting plate 79 is fixed to the base plate 60 by machine screws (not shown). Adjusting screws are indicated by 80a, 80b and 80c, respectively. The adjusting screw 80c is fixed to the CCD mounting plate 78 via a coil spring 81 and the adjusting plate 79. As shown in FIG. 10, a spherical, half-blanked projection 78a is formed on the CCD mounting plate 78, and the half-blanked projection 78a is forced into a spherical, half-blanked projection 79a formed on the adjusting plate 79, by the pulling force of the coil spring 81.

Figure 12B:
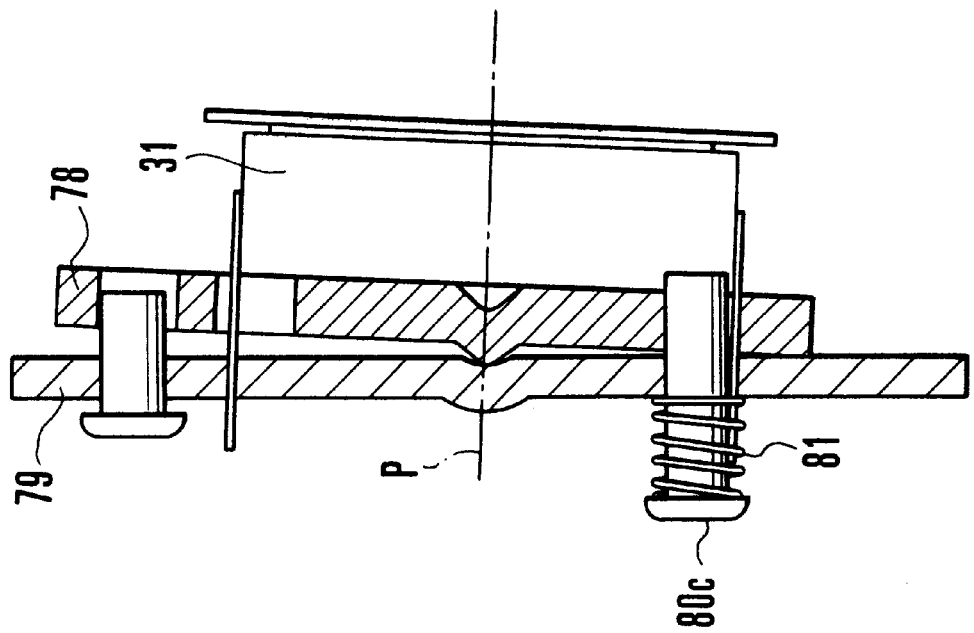
FIGS. 12(a) and 12(b) are views showing an adjustment part for the CCD of the camera body.
Figure 12A:
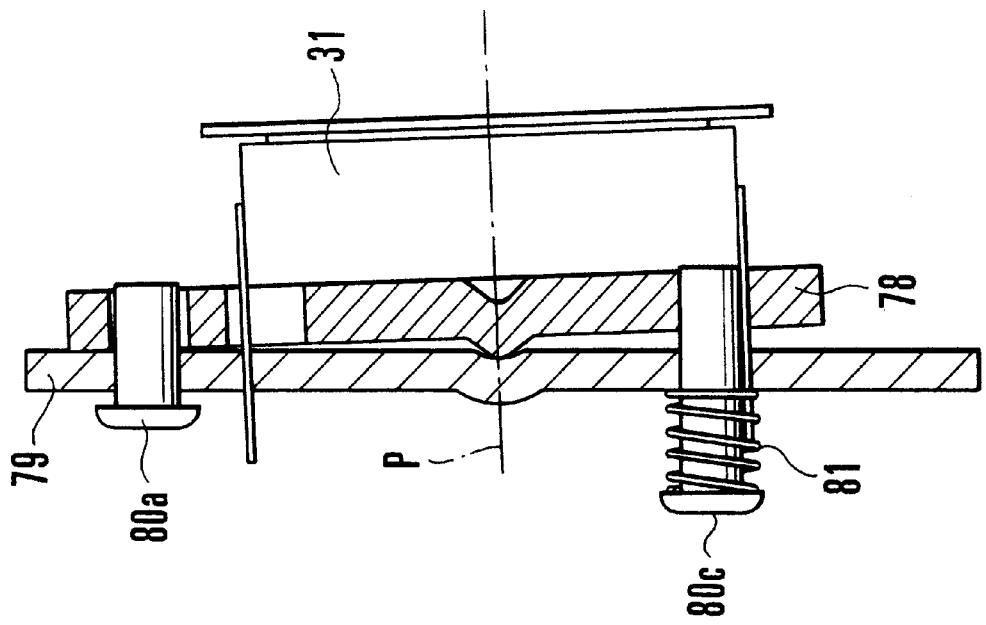

During this state, if the adjusting screws 80b and 80c are not tightened, the CCD monunting plate 78 is placed into the state shown in FIG. 12(a). As the adjusting screw 80c is tightened during the state shown in FIG. 12(A), the CCD mounting plate 78 turns about a support portion P while charging the coil spring 81, passes through the state shown in FIG. 10 and reaches the state shown in FIG. 12(b).

Accordingly, by adjusting the amounts in which the respective adjusting screws 80b and 80c are tightened, it is possible to appropriately adjust the angle of the CCD 31 with respect to the base plate 60. In this case, since the adjusting screws 80b and 80c are disposed so as to make 90 degrees with each other in either of the directions of the arrows 9B and 9C at the support portion P, the inclination of the CCD 31 can be independently adjusted in each of the directions of the arrows 9B and 9C. The distance between the support portion P and each of the adjusting screws 80b and 80c is not less than three times a half of the effective pixel area of the CCD 31, so that the amount of movement on the CCD 31 is not less than ⅓ of the amount of adjustment by the adjusting screws 80b and 80c. Therefore, fine adjustment is possible.

Referring back to FIG. 9, a viewfinder unit 82 holds the individual lenses of the viewfinder optical system 50 at predetermined intervals The viewfinder unit 82 is disposed immediately above the image pickup optical system 30 as described previously.

The structure and the operational principle of the iris unit 65 used in the present electronic camera will be described below with reference to FIGS. 13(a), 13(b) and 13(c).

As shown in FIG. 13(c) there is provided a driving coil 91, and a rotor 92 is arranged integrally with a permanent magnet. The rotor 92 is rotatable about a shaft 92a supported by a bearing (not shown). An aperture-blade driving plate 93 is rotatable integrally with the rotor 92 and is provided with pins 93a and 93b. A spring 94 is provided for urging the aperture-blade driving plate 93 in the clockwise direction as viewed in FIG. 13(c).

If no current is flowing in the driving coil 91, the aperture-blade driving plate 93 is urged in counterclockwise direction as viewed in FIG. 13(c) and is positioned by a stopper (not shown). If current is made to flow in the driving coil 91, an electromagnetic force is generated by an interaction between the current and the permanent magnet of the rotor 92 to cause the rotor 92 to rotate in the clockwise direction as viewed in FIG. 13(c). With the rotation of the rotor 92, the urging force applied to the aperture-blade driving plate 93 by the spring 94 increases, and the rotation of the rotor 92 stops at a position where the electromagnetic force and the urging force come into equilibrium.

Two iris blades 35a and 35b of the two-blade iris 35 are respectively engaged with the pins 93a and 93b. The iris blades 35a and 35b are held by a mechanism (not shown) so that the iris blades 35a and 35b can move in parallel with each other in the opposite directions indicated by the arrow shown in FIG. 13(c) with the rotation of the aperture-blade driving plate 93, whereby the two-blade iris 35 can varies its aperture diameter (refer to FIGS. 13(a) and 13(b)). During this times, a Hall element 95 detects the amount of rotation of the permanent magnet provided integrally with the rotor 92, in the form of a voltage.

This voltage (signal "b") is read into a CPU 108, in which it is converted into an aperture diameter (signal "c") on the basis of a voltage-aperture diameter table which is prepared in advance by performing actual measurement and storing the measurement result into a ROM (not shown) or the like. A switch 97 serves to select, as a signal (feedback signal "e") for input to an iris driving circuit 96 which will be described later, either one of a signal (signal "a") indicative of the brightness of a photographed picture which is outputted from a signal processing circuit 98 and a signal (signal "c") indicative of an aperture diameter which is outputted from the CPU 108.

The iris unit 65 of the present electronic camera is capable of being driven in both a still image photographing mode and a moving image photographing mode. Control methods for both modes will be described below.

The control method for the still image photographing mode will first be described below. In the still image photographing mode, an aperture diameter and a shutter speed which are optimum for photography are determined from the brightness of a subject in accordance with a built-in program For this reason, the switch 97 supplies a signal (signal "c") indicative of the aperture diameter into which the voltage detected by the Hall element 95 (signal "b") is converted by the CPU 108 to the iris driving circuit 96 as the feedback signal (signal "e") The CPU 108 supplies a signal indicative of the aperture diameter optimum for photography to the iris driving circuit 96 as a reference signal (signal "d").

In the iris driving circuit 96, an operational amplifier 96a compares the feedback signal (signal "a") with the reference signal (signal "d"), and an operational amplifier 96b adds a value obtained by multiplying the difference therebetween by a predetermined coefficient to the value of a current which is flowing in the driving coil 91. Accordingly, feedback is provided so that the aperture diameter can always be made closer to an aperture diameter optimum for photography.

After the aperture diameter has been controlled in the above-described manner, it becomes possible to perform photography in two different kinds of photographing modes using different exposure methods.

One exposure method is a full electronic shutter method which utilizes the electronic shutter function of the CCD 31. This full electronic shutter method includes the steps of clearing the charge of the CCD 31 before the start of an exposure, starting to store charge for the exposure, storing the charge in the photoelectric conversion part of the CCD 31 for a time period equivalent to a shutter speed optimum for photography and transferring the stored charge to a transfer line so that the charge can be read out. In accordance with the full electronic shutter method, it is possible to accurately control the shutter speed by electronically executing a shutter operation, but it is possible to perform only still image photography for one field, because of the structure of the CCD 31.

The other exposure method is a hybrid shutter method in which charge storage for an exposure cycle is started by clearing charge by means of an electronic shutter and the exposure cycle is completed by closing iris blades. similarly to the full electronic shutter method, the hybrid shutter method includes the steps of clearing the charge of the CCD 31 before the start of an exposure, starting to store charge for the exposure, storing the charge for a time period equivalent to a shutter speed optimum for photography, and causing current to flow in the driving coil 91 in the direction in which the iris blades 35a and 35b are closed thereby reducing the aperture diameter at a high speed to complete the exposure. In accordance with the hybrid shutter method, because such mechanical blade driving is needed, an extremely high continuous shooting speed is difficult to achieve, but still image photography can be performed on a frame-by-frame basis. The exposure control methods used in the still image photographing mode are as described above.

The moving image photographing mode will be described below. In the case of the moving image photographing mode, the shutter speed is fixed at a field frequency of 1/60 second, and the brightness of a photographed picture is fed back to the iris driving circuit 96 to provide correct exposure. For this reasons the switch 97 supplies a signal (signal "a") indicative of the brightness of the photographed picture detected by the signal processing circuit 98 to the iris driving circuit 96 as the feedback signal (signal "e"). The CPU 108 supplies a signal indicative of the brightness of a picture due to the correct exposure to the iris driving circuit 96 as the reference signal (signal "d").

In the iris driving circuit 96, the operational amplifier 96a compares the feedback signal (signal "e") with the reference signal (signal "d"), and the operational amplifier 96b adds a value obtained by multiplying the difference therebetween by a predetermined coefficient to the value of a current which is flowing in the driving coil 91. Accordingly, the aperture diameter is placed under feedback control so that the brightness of the picture can always be made closer to a correct exposure level. The exposure control method used in the moving image photographing mode are as described above.

Incidentally, description of the flash unit 4 which is built in the present electronic camera is omitted since the flash unit 4 is not particularly unique, as compared to generally known flash units.

The arrangement of an annotation unit B removably attached to the camera body A will be described below with reference to the exploded perspective view of FIG. 14. The annotation unit B performs predetermined functions. For example, the annotation unit B is used for monitoring an image to be photographed by the present electronic camera or reproducing a recorded image, or serves to display or manipulate various kinds of control information, or enables attachment or removal of a recording medium.

In the annotation unit B shown in FIG. 14, a main chassis 201 serves to support internal units, and an EL emission element 202 and a support member 203 are fixed to the main chassis 201. The EL emission element 202 is a back light for an LCD (liquid-crystal display) 205, and the support member 203 determines the position of the LCD 205 on a flat surface of the main chassis 201 and supports the main circuit board unit 5. A cutout 201a into which to accommodate a microphone 204 is formed in one corner of the main chassis 201. The LCD 205 functions as a monitor for displaying an image photographed by the electronic camera, in the form of a reproduced image, a viewfinder for displaying an image which is being photographed by the electronic camera, or a display for displaying various information about the electronic camera.

A malt plane 207 is attached to a front cover 206 by a both-sided adhesive tape. The main chassis 201 is fixed to the front cover 206 by machine screws (not show) with the LCD 205 sandwiched therebetween, whereby the LCD 205 is securely pressed against the support member 203 by the malt plane 207.

A transparent glass 208 is disposed in front of the LCD 205 of the front cover 206 to cover the LCD 205. A known touch panel 209 is luminated on the transparent glass 208 in such a manner as to be able to detect the manipulating position of an attached touch pen 210. A group of slits 206a is formed in the face of the front cover 206 opposite to the microphone 204 so that the microphone 204 can clearly pickup up sound.

An I/F connector (male) 212, an I/F connector (female) 213 a PCHCIA connector 214 for connection to a recording device which conforms to PCMCIA (such as a memory card or a hard disk drive), and an electrical circuit for controlling the annotation unit B are mounted on a main circuit board 211. The I/F connector (male) 212 is connected to the I/F connector (female) 10 (refer to FIG. 1) of the camera body A, thereby providing electrical connection between the camera body A and the annotation unit B. The I/F connector (female) 213 allows the annotation unit B to communicate with an external apparatus, such as a computer, through an I/F cable which is connected to the I/F connector (female) 213.

The I/F connector (female) 213 and the I/F connector (female) 10 of the camera body A are of the same shape and are provided at a substantially identical position as viewed in the directions indicated by both arrows 14B and 14C of FIG. 14 The I/F connector (male) 212 and the I/F connector (female) 213 are connected to each other in such a manner that their terminals having the same terminal numbers are electrically connected to each other. The main circuit board 211 is fixed to the main chassis 201 by machine screws. The PCMCIA connector 214 is provided with an eject button 214a, and the photographer can manipulate the eject button 214a to operate a mechanism (not shown), thereby removing a connected recording device which conforms to PCMCIA.

A rear cover 215 is an exterior cover which forms the annotation unit B integrally with the front cover 206, and a cutout 215a (not shown) and a cutout 215b are respectively formed in the portions of the rear cover 215 which correspond to the I/F connector (male) 212 and the I/F connector (female) 213. The cutout 215b is provided with a connector cover 216 which has a structure similar to the connector cover 12 for the camera body A.

The annotation unit B does not separately operate and is necessarily used in the state of being connected to the camera body A. For this reason, the cutout 215a which corresponds to the I/F connector (male) 212 for connection to the camera body A is not provided with a connector cover.

A connector cover 217 is provided for the PCMCIA connector 214. The connector cover 217 serves to prevent foreign matter, such as dust, from entering from the outside when no recording device is connected to a recording-device connecting port. In addition, the connector cover 217 is designed to cover not only the recording-device connecting port but also the eject button 214a to prevent occurrence of an accident, such as the malfunction of erroneously manipulating the eject button 214a during an access to a connected recording device and destroying the recording device or image data.

A portion of the rear cover 215 is formed as a grip portion 215c. If the photographer attaches the annotation unit B to the camera body A and performs annotation input by means of the touch pen 210 which can be accommodated into the annotation unit B, the photographer will have the touch pen 210 in his/her hand so that the photographer will be unable to use the grip portion 1b of the camera body A and feel it very difficult to hold the annotation unit B. To cope with this problem, the grip portion 215c is formed as a substitution for the grip portion 1b of the camera body A. The touch pen 210 for annotation input can be fitted into the inside of the grip portion 215c as shown in FIG. 14.

A screw member 218 built in the annotation unit B is used for fixing the annotation unit B to the camera body A and is arranged to be manipulatable via a hole 215d formed in the rear cover 215.

Figure 15:
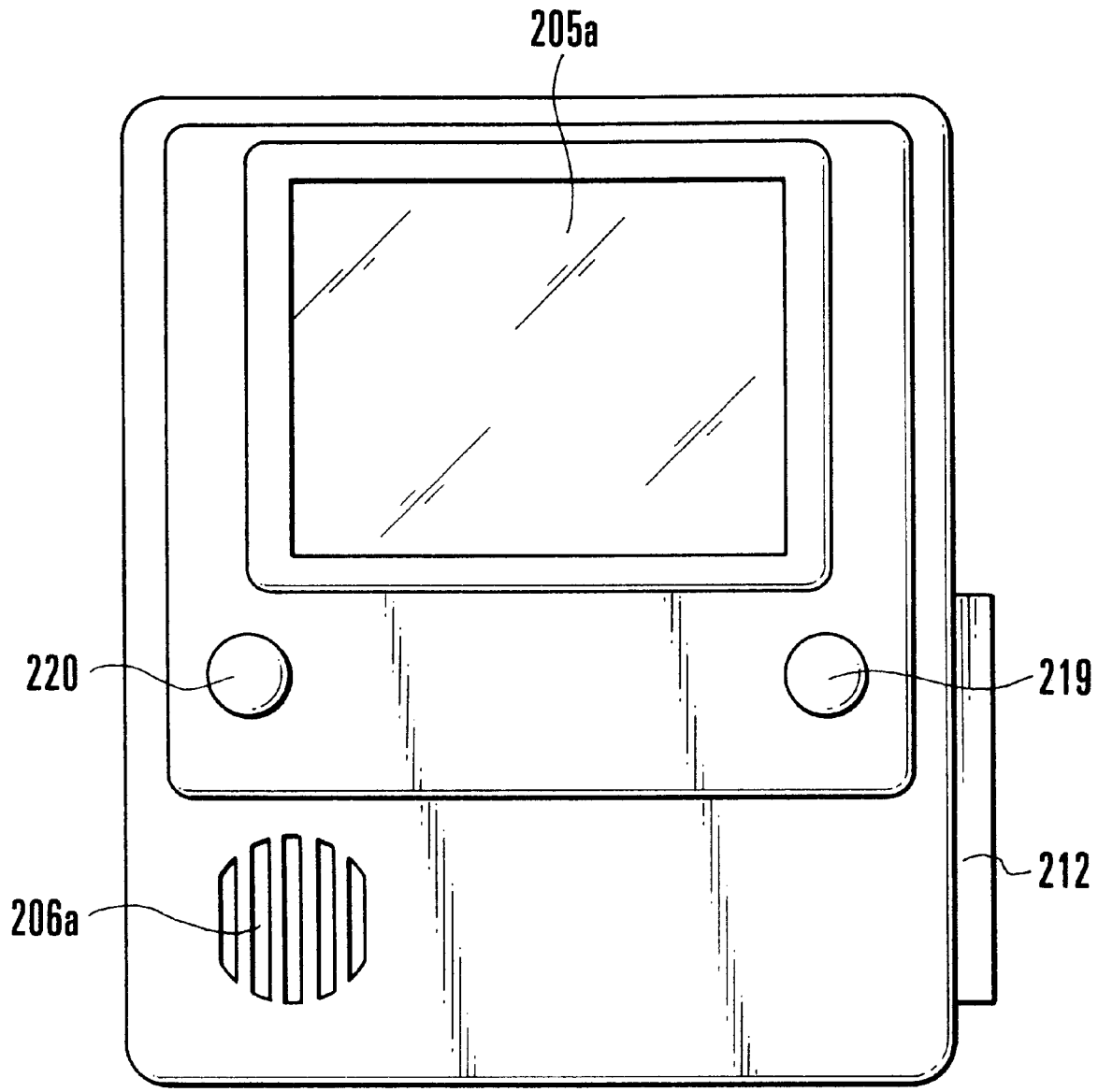
FIG. 15 is a view showing the front cover of the annotation unit.

FIG. 15 is a view of the front cover 206 as viewed in the direction of an arrow 14A of FIG. 14. A display screen 205a of the LCD 205 can be viewed through the touch panel 209. When the power source of the camera body A is turned on with the annotation unit B connected to the camera body A, the function of the annotation unit B is activated at the same time. For the sake of power savings it is possible to stop only the respective operations of the LCD 205 and the EL emission element 202. A switch 219 is provided for this purpose. Each time the switch 219 is manipulated, the LCD 205 and the EL emission element 202 are turned on and off in an alternate manner. If the release button 7 of the camera body A is pressed down to the second stroke position with a sound recording button 220 pressed sound recording is started.

The connection between the camera body A and the annotation unit B will be described below.

Figure 16:
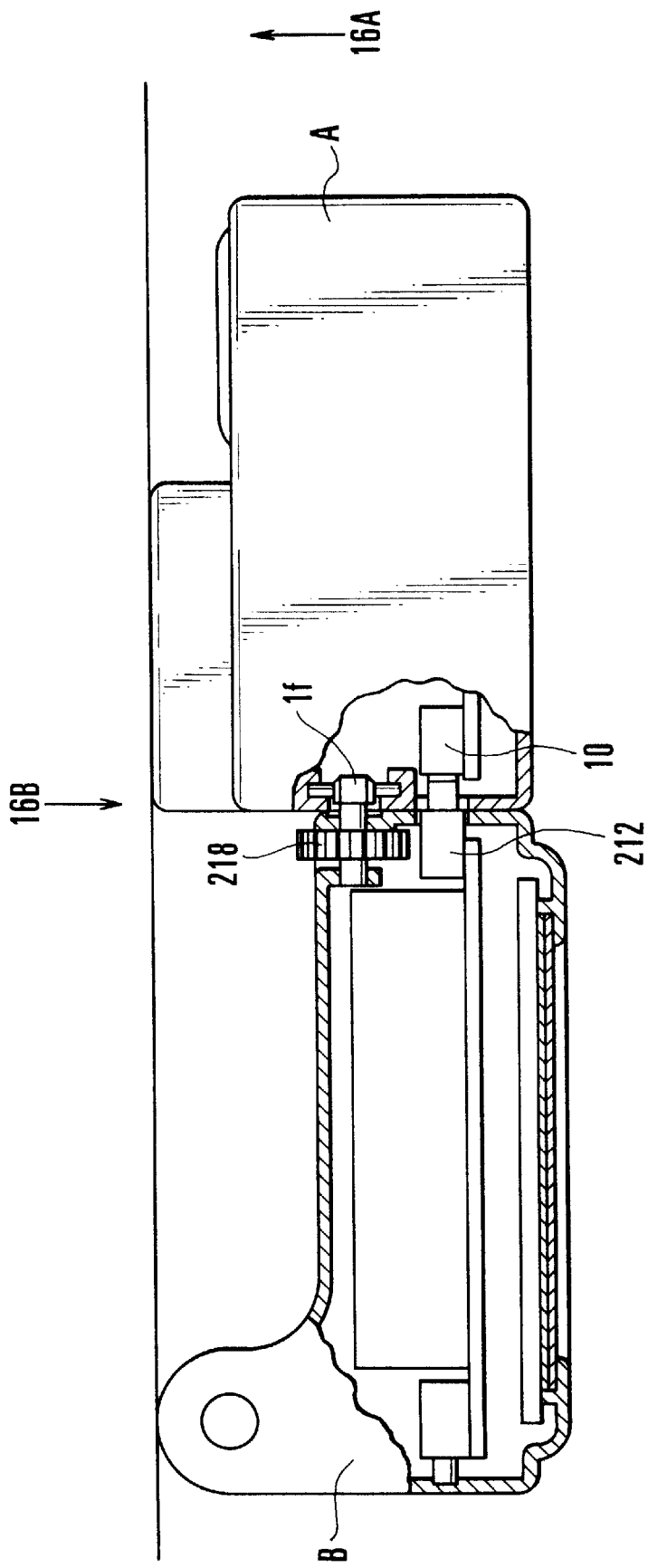
FIG. 16 is a cross-sectional view of a connection part between the camera body and the annotation unit.

As shown in FIG. 16 the I/F connector (female) 10 and the I/F connector (male) 212 are connected to each other to provide electrical connection between the power source of the camera body A and the annotation unit B, and the camera body A and the annotation unit B are mechanically connected to each other by a screw hole 1f and the screw member 218 When the camera body A and the annotation unit B are connected in this manner, the LCD 205 of the annotation unit B can face the photographer to function as a TTL viewfinder free of a parallax during photography.

In general conventional cameras of the type in which electrical display means, such as an electronic viewfinder, is employed as a monitor, are designed without taking account of the positional relation between the monitor and the camera's optical systems As a results the direction in which a photographing lens is turned does not coincide with the direction of a monitor display, and the photographer may have a sense of incompatibility owing to a parallax. To cope with this problem, in the present electronic camera the position of the LCD 205 is selected so as to serve as a TTL viewfinder with no parallax when the camera body A and the annotation unit B are connected to each other.

The optical viewfinder (the viewfinder optical system 50) of the camera body A is arranged in such a manner that the photographer can look into the viewfinder optical system 50 even when the camera body A and the annotation unit B are connected to each other. Accordingly, the photographer can look into the optical viewfinder of the camera body A without using the LCD 205 and the EL emission element 202 of the annotation unit B for the sake of power saving.

As shown, the height of the most forward part (photographing lens part) of the camera body A and that of the most forward part (grip portion) of the annotation unit B are selected to be equal as viewed in the direction of the arrow 16A. Accordingly, if the present electronic camera is placed on a desk or the like for the purpose of annotation with the front side of the camera body A faced down, the touch panel 209 of the annotation unit B is stably placed in parallel with the top of the desk or the like, whereby the photographer can perform annotation very smoothly.

In the present electronic camera it is necessary to open the connector cover 12 of the camera body A before the camera body A and the annotation unit B are connected to each other. However, as described previously with reference to FIGS. 3(a) to 3(c) and 4(a) to 4(c), the connector cover 12 can be accommodated into the camera body A in an open state. Accordingly, it is possible to prevent occurrence the awkward problem that the connector cover 12 hinders the camera body A and the annotation unit B from being connected to each other or that the camera body A and the annotation unit B cannot be connected to each other before the connector cover 12 is removed from the camera body A. The photographer, therefore, can readily connect the camera body A and the annotation unit B to each other. In addition, the annotation unit B is constructed to have such a selected size that does not hide the DC jack 11 of the camera body A when the annotation unit B and the camera body A are connected to each other. Accordingly, it is possible to use an AC adapter E (refer to FIG. 1) even when the annotation unit B and the camera body A are connected to each other.

Figure 17A:
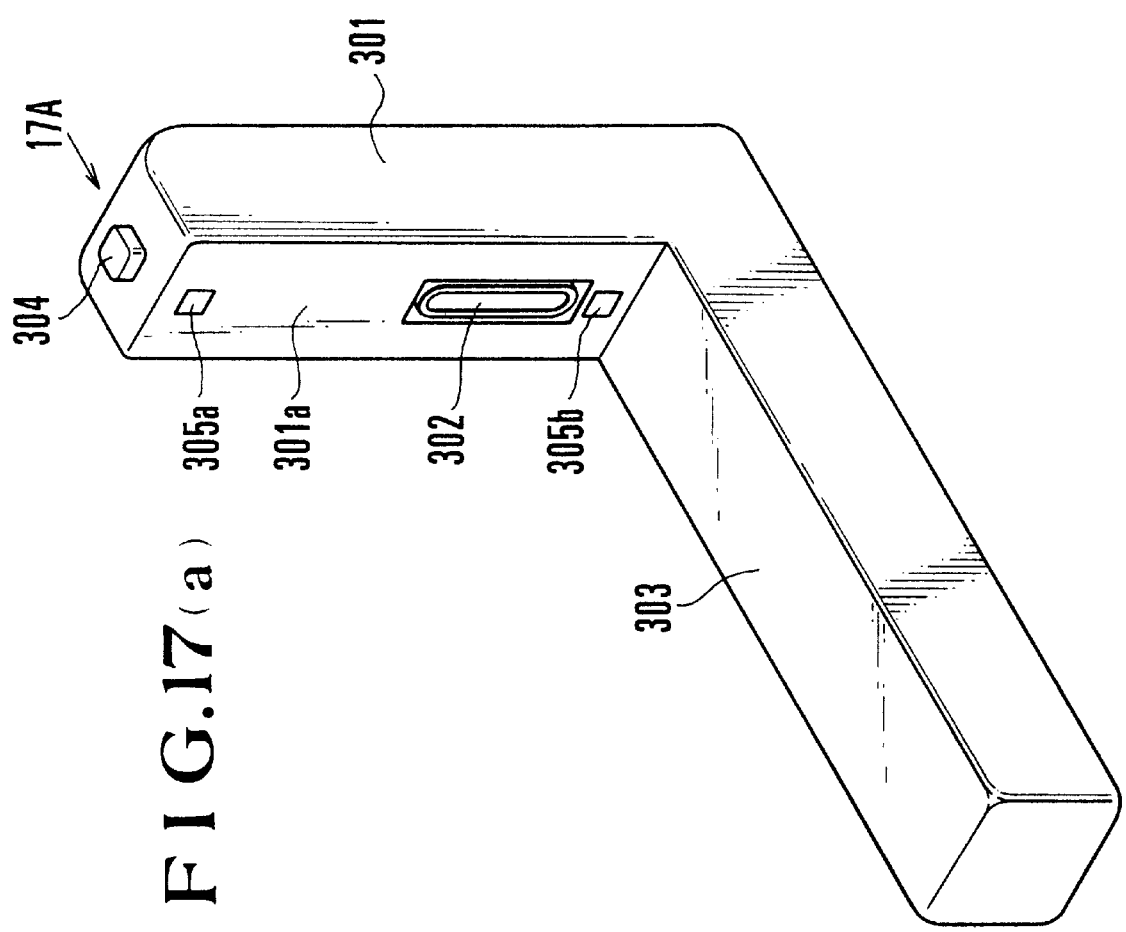
FIGS. 17(a) and 17(b) are views showing the structure of a camera installing unit.

The arrangement of a camera installing unit C will be described below with reference to FIGS. 17(a) and 17(b). As shown in FIG. 17(a) the camera installing unit C has an L-like shape, and a vertical portion 301 is provided with an I/F connector (male) 302 which is connectable to the camera body A and the I/F connector (female) 213 of the annotation unit B.

The height of the I/F connector (male) 302 from a mounting face 303 is selected to be equal to the height of the I/F connector (female) 10 of the camera body A from the bottom of the camera body A. The size of the mounting face 303 is selected to be approximately equal to the total of the bottom sizes of the camera body A and the annotation unit B when they are connected to each other. When an eject button 304 is pressed downward, eject pine 305a and 305b are projected from a face 301a of the vertical portion 301 by means of a mechanism (not shown).

Figure 17B:
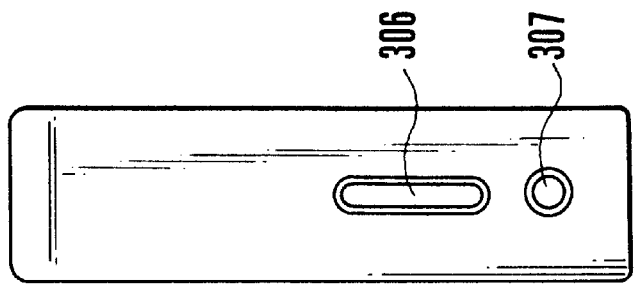

If the camera installing unit C is viewed in the direction of an arrow 17A of FIG. 17(a), the camera installing unit C has the construction shown in FIG. 17(b). As shown in FIG. 17(b), an I/F connector (female) 306 is provided for enabling communication with an external apparatus, such as a computer, through an I/F cable or the like which is connected to the I/F connector (female) 306. A DC jack 307 is provided for receiving electrical power from the AC adapter E. The DC jack 307 has the same shape as the DC jack 11 provided on the camera body A. The terminals of the I/F connector (female) 306 which are required for communicating with an external apparatus, such as a computer, are connected to the terminals of the I/F connector (male) 302 in the inside of the camera installing unit C in such a manner that the terminals having the same terminal numbers are connected to each other. The terminals of the I/F connector (female) 306 other than the terminals required for communicating with an external apparatus, such as a computer, are connected to the terminals of the I/F connector (female) 306.

Figure 18:
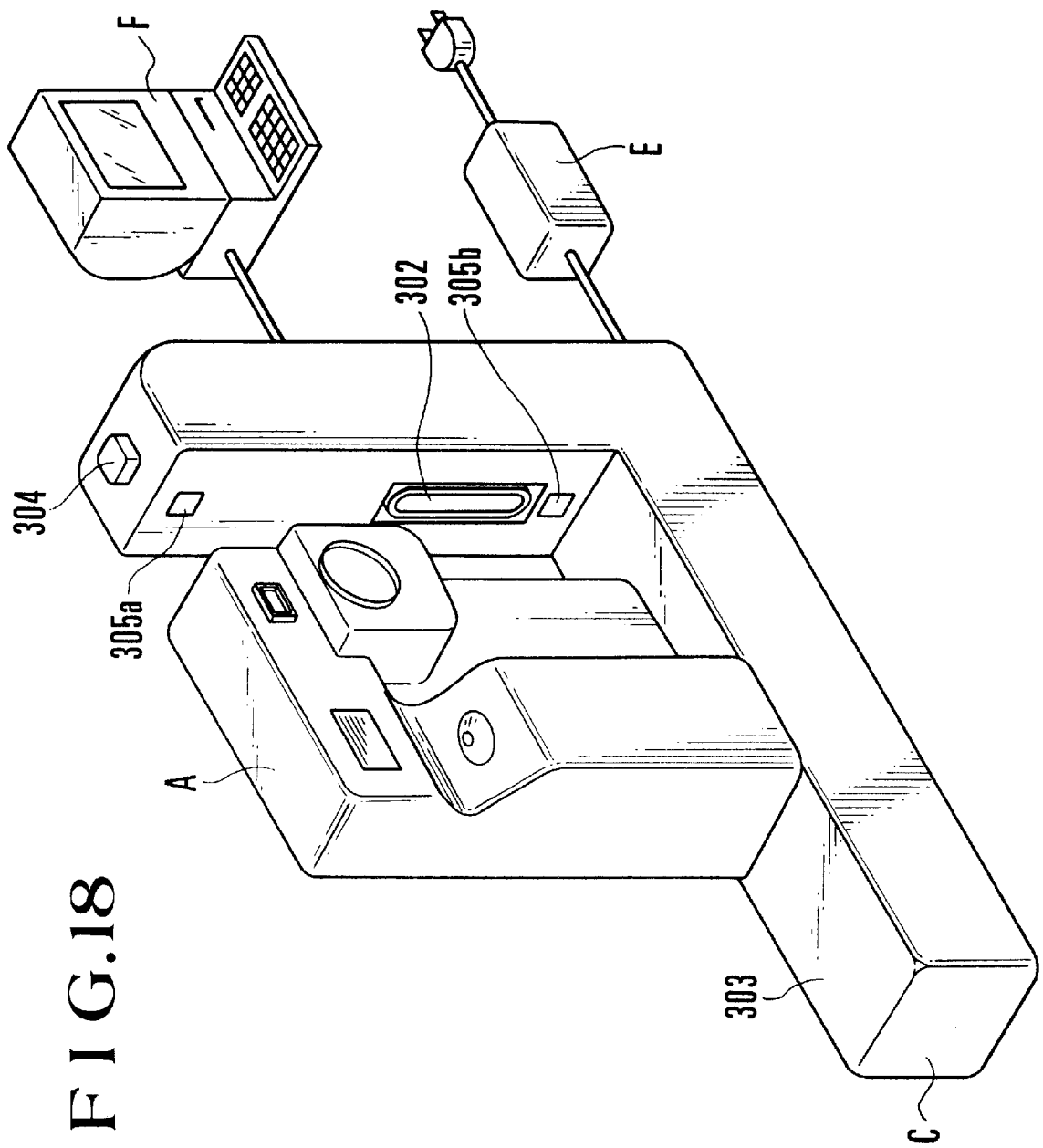
FIG. 18 is a view showing the state of connection of the camera installing unit.
Figure 19:
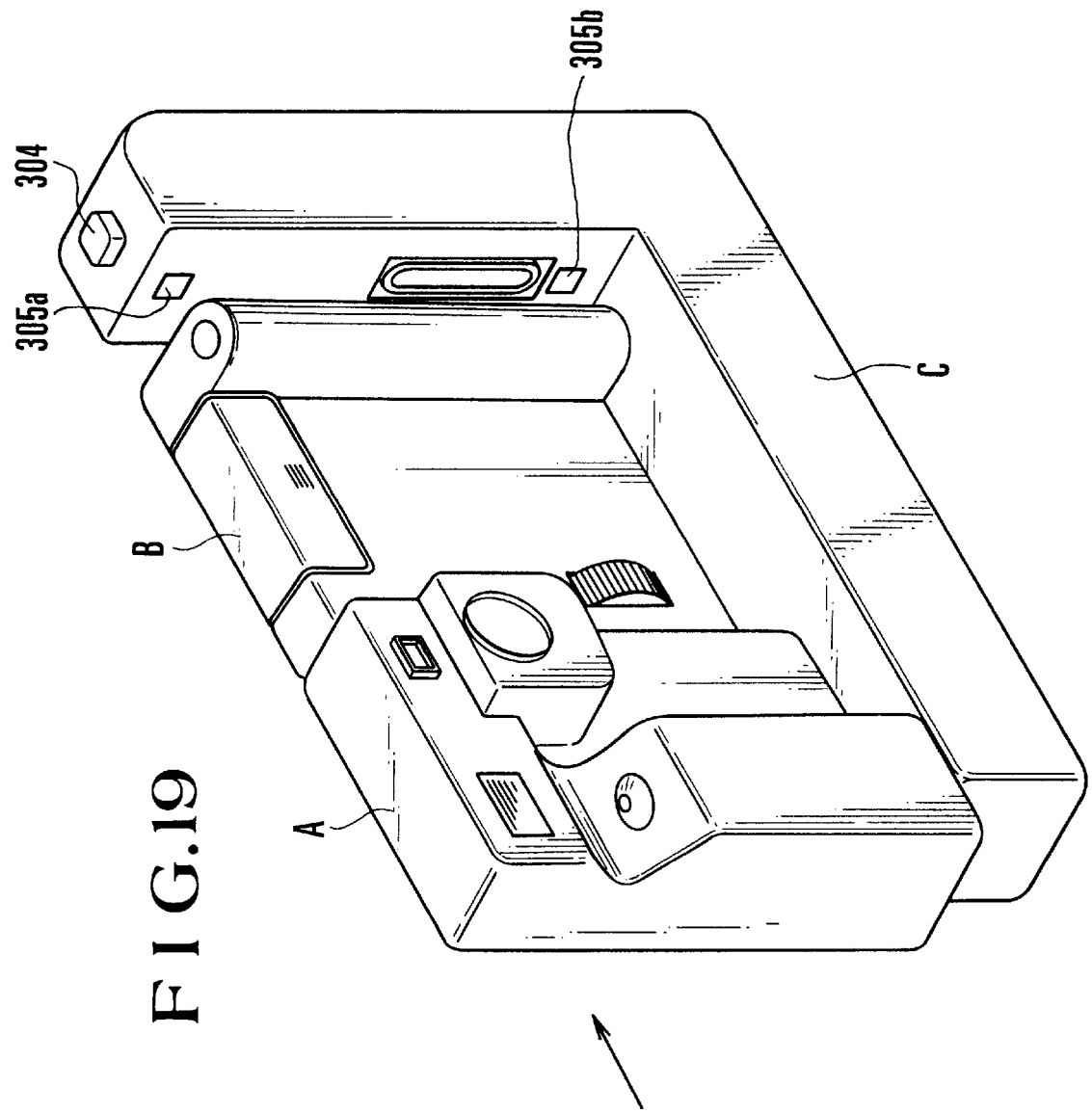
FIG. 19 is a view showing the manner in which the camera body, the annotation unit and the camera installing unit are connected to one another.

The connection among the camera installing unit C, the camera body A and the annotation unit B will be described below with reference to FIGS. 18 and 19

Normally, an I/F cable D which is connected to an external apparatus, such as a computer, is connected to the I/F connector (female) 306 of the camera installing unit C, while a power supply plug extending from the AC adapter E is always connected to the DC jack 307. When the camera body A is caused to slide on the mounting face 303 in the direction of the arrow shown in FIG. 19 with the bottom of the camera body A maintain in contact with the mounting face 303, the I/F connector (female) 10 of the camera body A and the I/F connector (male) 302 of the camera installing unit C are connected to each other since the I/F connector (female) 10 and the I/F connector (male) 302 are disposed at the same height as described previously. When the I/F connector (female) 10 and the I/F connector (male) 302 are connected to each other, the camera body A is connected to the external device, such as a computer, and receives a supply of electrical power from the AC adapter E.

As described previously, the I/F connector (female) 213 of the annotation unit B and the I/F connector (female) 10 of the camera body A are of the same shape and provided at a substantially identical position as viewed in the respective directions of the arrows 14B and 14C of FIG. 14.

Accordingly, the camera body A, the annotation unit B and the camera installing unit C can be connected to each other in completely the same manner. In addition, when the eject button 304 is manipulated with the camera body A, the annotation unit B and the camera installing unit C being connected to each other, the eject pins 305a and 305b are projected to cause the camera body A and the annotation unit B to slide in the direction opposite to the direction of the arrow shown in FIG. 19, thereby releasing the connection between I/F connector (male 302 and the I/F connector (female) 213.

The AC adapter E used in the present embodiment also has the function of recharging the secondary battery 8. If the secondary battery 8 is loaded in the camera body A, the AC adapter E is electrically connected to the camera body A. If the power source of the camera body A is turned off, the secondary battery 8 is automatically recharged.

In the present embodiment, since the I/F connector (female) 10 of the camera body A, the I/F connector (female) 213 of the annotation unit B and the I/F connector (female) 306 are of the same shape, one I/F cable D can be connected to any of them.

The manner of setting the program functions of the camera body A will be described below with reference to FIG. 20. As shown in FIG. 20G the camera body A and a personal computer F are connected to each other via the I/F cable D. In the following description it is assumed that a program for setting the program functions of the camera body A is already activated on the personal computer F.

Figure 20:
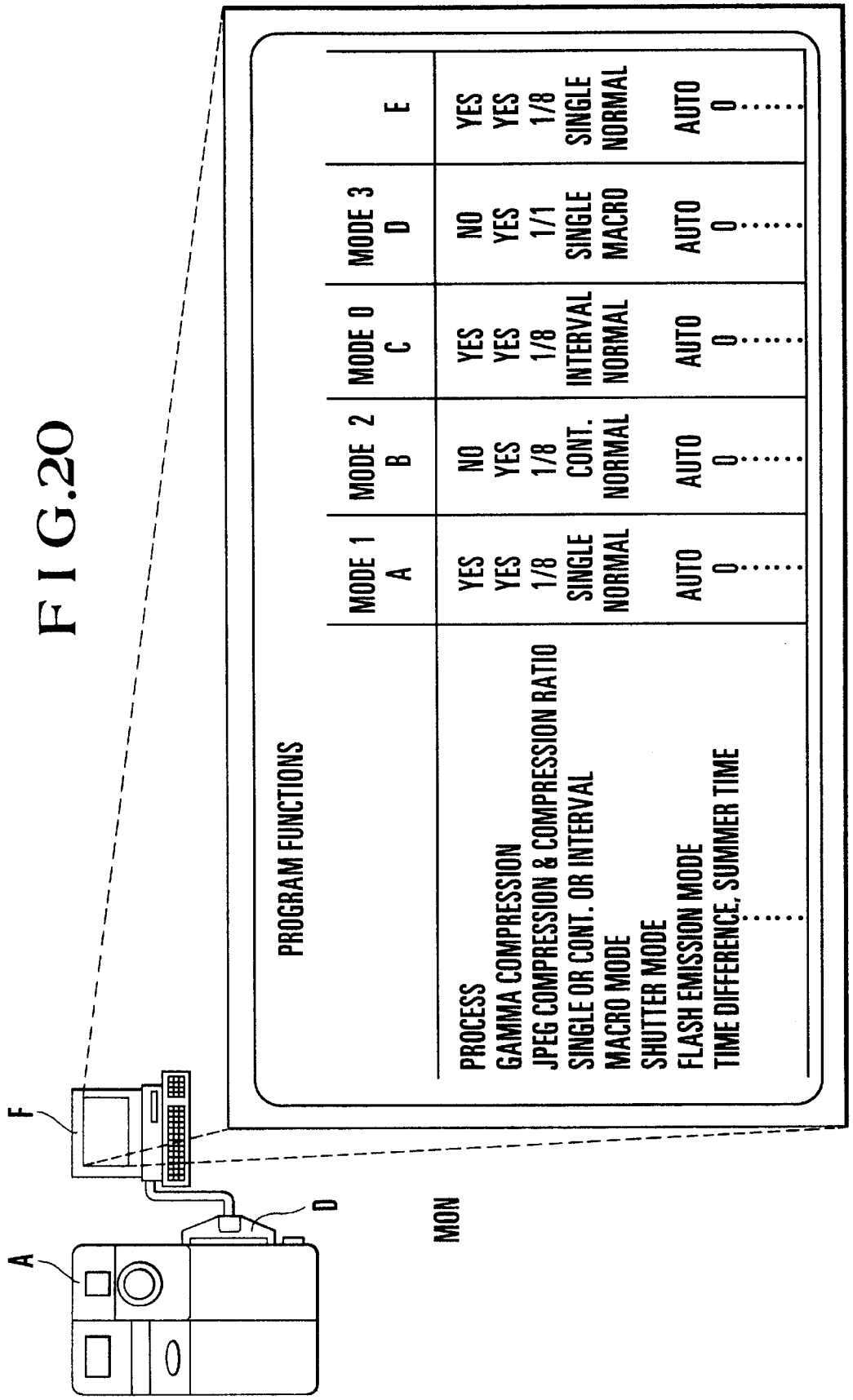
FIG. 20 is a view aiding in describing the program functions of the camera body and a program-function setting operation.

A monitor which is connected to the personal computer F has a monitor screen MON as shown in FIG. 20. On the monitor screen MON, are displayed settable program function items such as "signal processing process?", "gamma compression?", "image date compression (for example, JPEG) and compression ratio?", "single shooting, continuous shooting or interval shooting?", "macro mode?" and various other selectable function items, such as shutter speed, flash emission modes time difference and summer time, as well as setting menu columns.

The photographer inputs a desired setting for each of the settable program function items, such as "yes" or "no", "macro model" or "normal model" and "single", "continuous" or "interval", and registers the combination of the settings as a mode "A". In a similar manner, the photographer may input other combinations of settings as a mode "B", a mode "C", a mode "D", a mode "E" and other photographing modes in accordance with the photographer's unique ways of using the present electronic camera. In addition, the photographer can edit the contents of each of these photographing modes on the personal computer F.

As long as the memory capacity of the personal computer F permits, an infinite number of photographing modes can be edited on the personal computer F. However, in the present embodiment, the camera body A can be set to three photographing modes by way of example. For this reason, the photographer takes account of photographic conditions unique to a particular day on which to perform photography, selects three photographing modes from among those edited on the personal computer F as a mode "1", a mode "2" and a mode "3", and communicates these three photographing modes to the camera body A for the purpose of registration.

In the example shown in FIG. 20, the mode "A", the mode "B" and the mode "D" are selected as the mode "1", the mode "2" and the mode "3", respectively. For example, if the mods "1" is selected through the operating-mode selecting button 20 of the camera body A, the camera body A functions according to the program set to the mods "A".

In the above-described manners the camera body A can be connected to the personal computer F or the like, so that the photographer can set various kinds of functions as well as photographing modes by using a menu picture displayed on the monitor display of the personal computer F. Accordingly, unlike a conventional camera of the type in which its functions and photographing modes can only be set under extremely restricted conditions because photographers can only make use of a small display and a small number of manipulating keys provided on a camera body, the present camera allows photographers to readily set detailed camera functions and a detailed definition of each of the photographing modes.

The arrangement and the operation of the circuit used in the present embodiment will be described below.

Figure 21:
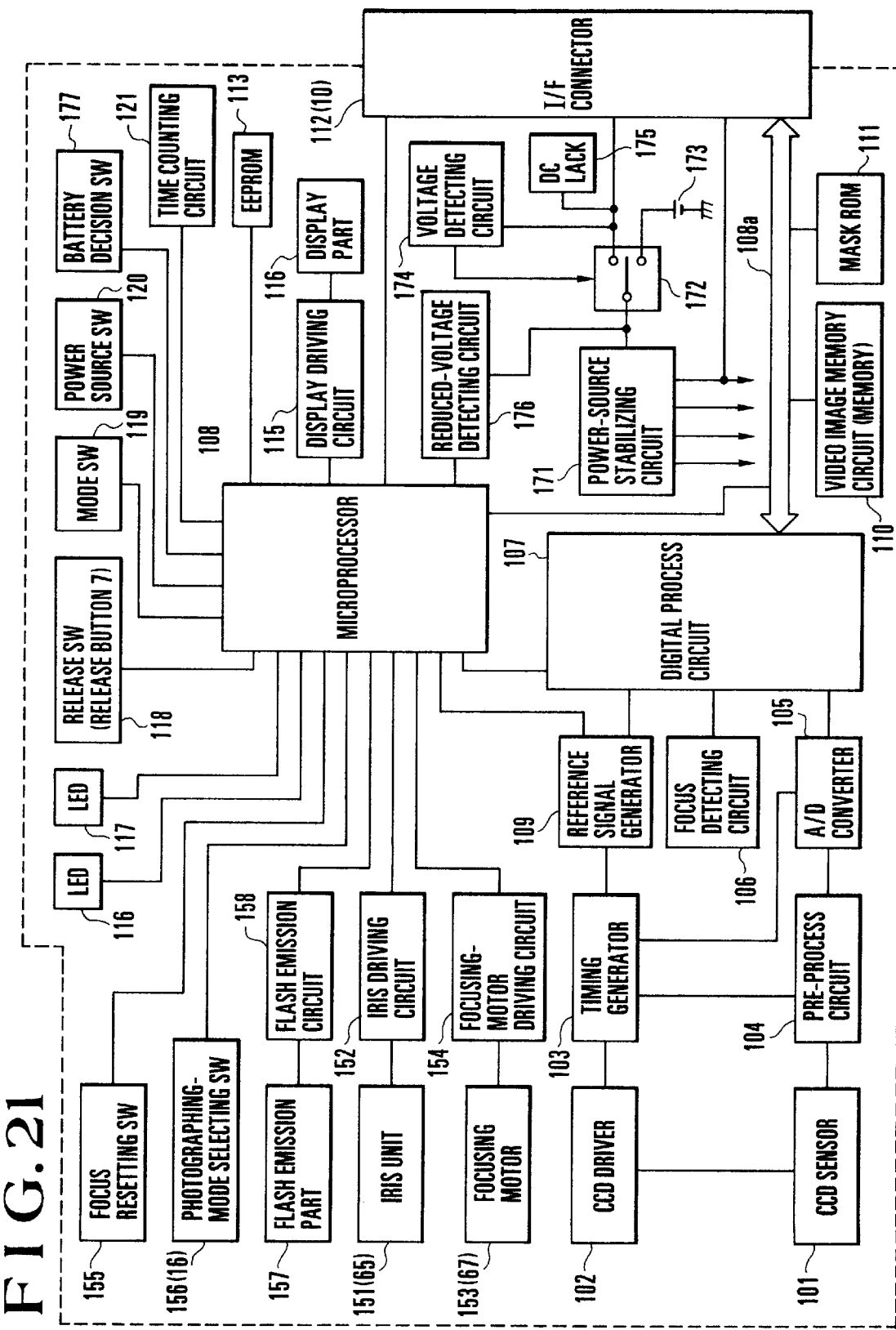
FIG. 21 is a system block diagram showing the circuit arrangement of the camera body.
Figure 22:
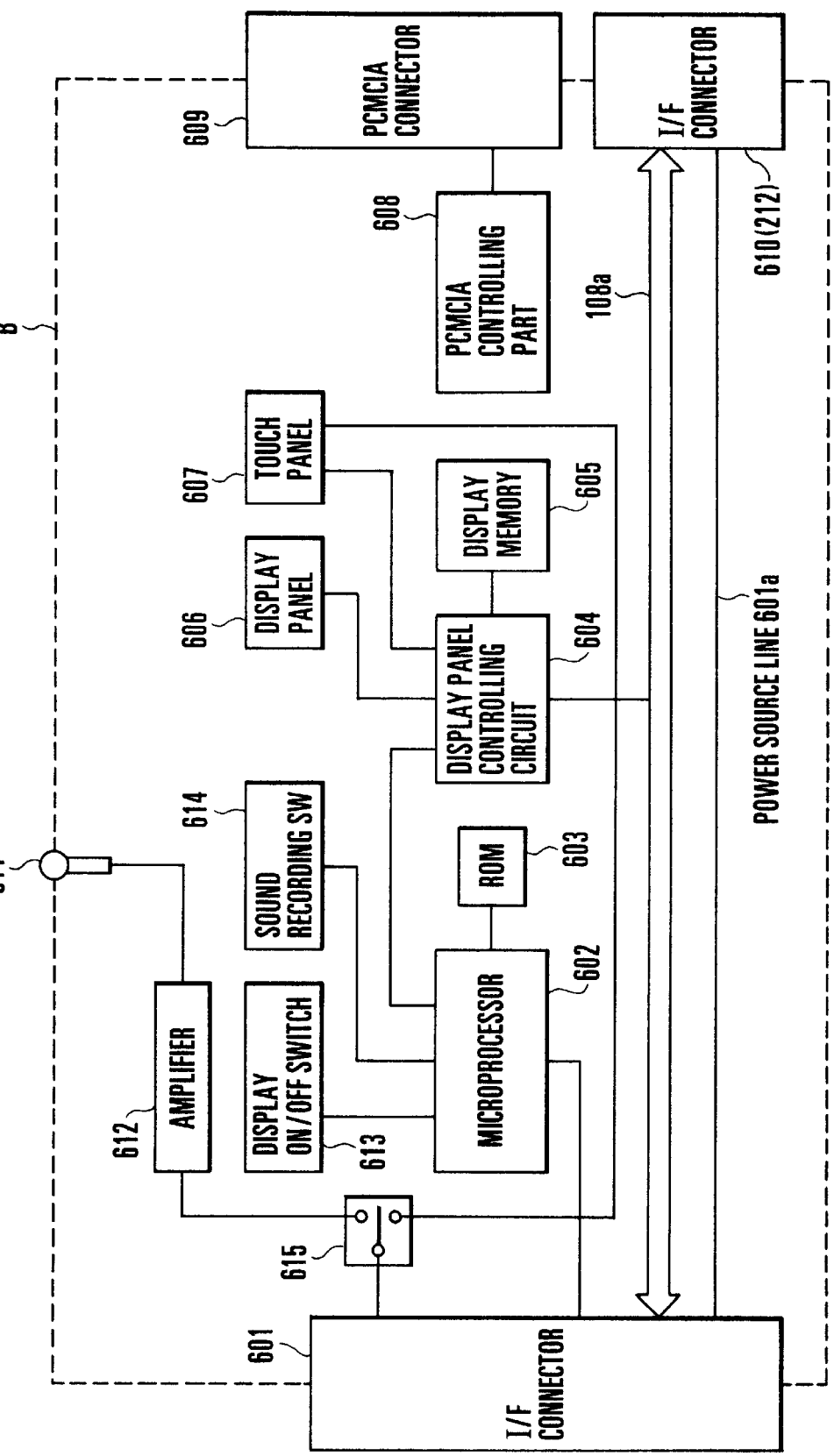
FIG. 22 is a system block diagram showing the circuit arrangement of the annotation unit.
Figure 23:
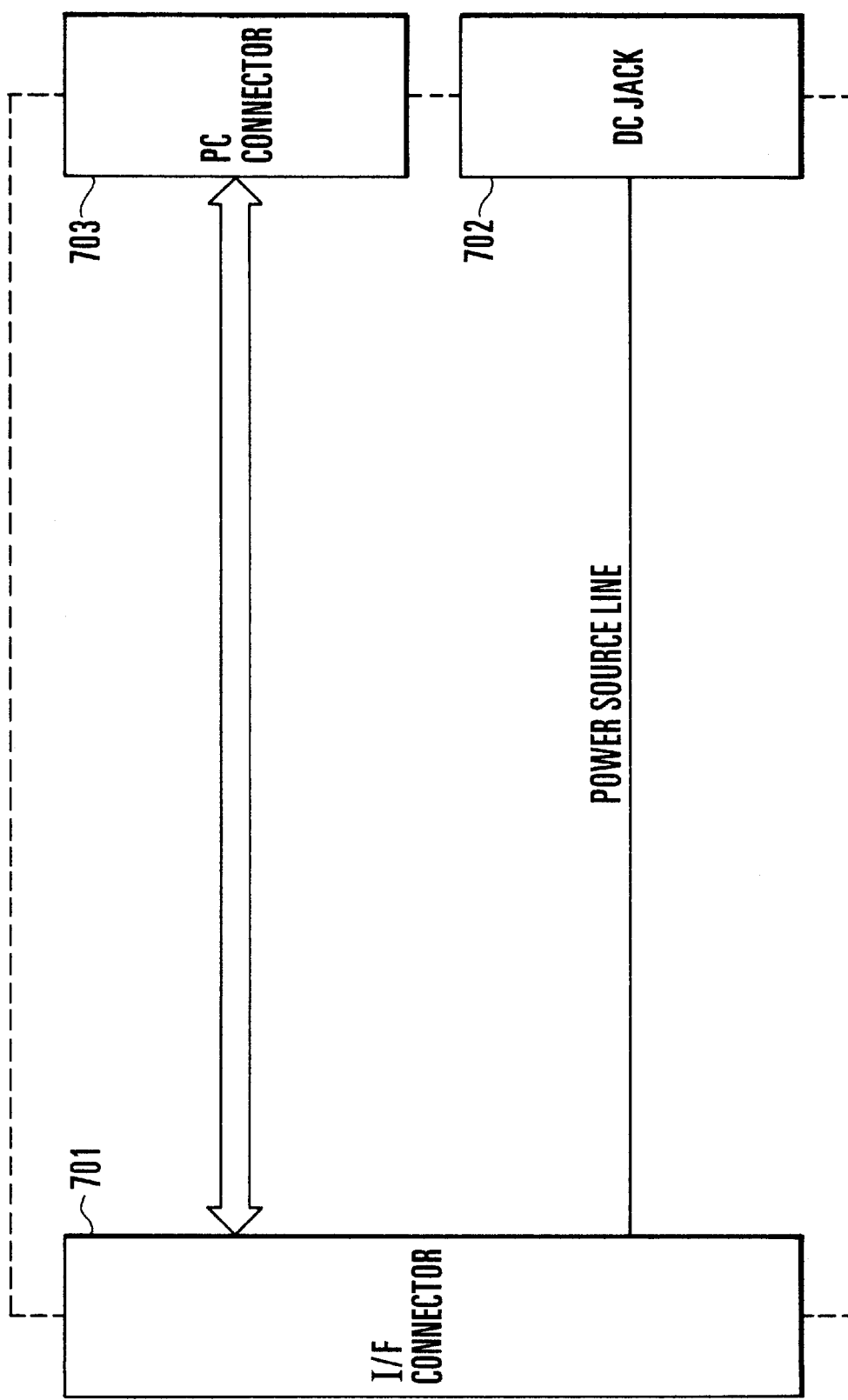
FIG. 23 is a system block diagram showing the circuit arrangement of the camera installing unit.

FIG. 21 is a block diagram showing the electrical system arrangement of the camera body A according to the present embodiment, FIG. 22 is a block diagram showing the electrical system arrangement of the annotation unit B according to the present embodiment and FIG. 23 is a block diagram showing the electrical system arrangement of the camera installing unit C according to the present embodiment.

The electrical system arrangement shown in FIG. 21 includes an image sensor 101, such as a CCD, (which corresponds to the CCD 31 shown in FIGS. 6 and 9), a CCD driver 102 for driving the CCD sensor 101, and a timing generator 103. The CCD sensor 101 is driven by the CCD driver 102 on the basis of a timing signal generated by the timing generator 103.

The electrical system arrangement shown in FIG. 21 also includes a pre-process circuit 104 for applying predetermined signal processing to a picked-up image signal outputted from the CCD sensor 101, an analog-to-digital converter (hereinafter referred to as the A/D converter) 105, and a focus detecting circuit 106 for detecting a state of focus by extracting a focus evaluation signal, such as a high-frequency component which varies according to the state of focus, from the picked-up image signal outputted from the pre-process circuit 104.

The shown electrical system arrangement also includes a digital process circuit 107 (which corresponds to the signal processing circuit 98 of FIG. 13(c)) for applying predetermined camera signal processing to a digital signal into which the picked-up image signal is converted by the A/D converter 105, the microprocessor 108 (the CPU 108 of FIG. 13(c)) for controlling the entire camera system according to the present invention as well as an external apparatus, a reference signal generator 109 for generating a clock for controlling the entire system, and a video image storage circuit 110 for storing a video signal obtained by photography. The video signal digitized by the A/D converter 105 is passed through the digital process circuit 107 to the microprocessor 108, and is stored in the video image storage circuit 110 controlled by the microprocessor 108.

The timing generator 103 and the digital process circuit 107 operate on the basis of the output of the reference signal generator 109, and the respective operating states of the reference signal generator 109 and the digital process circuit 107 are controlled by the microprocessor 108.

The output of the focus detecting circuit 106 is inputted to the microprocessor 108, which computes predetermined factors, such as the direction, the speed and the amount of driving of the focusing lens, according to the state of focus. The program and the data which are required for processing to be performed in the microprocessor 108 are stored in a mask ROM 111 in advance, and the stored information is selectively supplied from the mask ROM 111 to the microprocessor 108 according to a request of the microprocessor 108. A data bus 108a is shared by a video signal data line between the digital process circuit 107 and the video image storage circuit 110 and a data line between the microprocessor 108 and the mask ROM 111. The data bus 108a leads to an I/F connector 122 which corresponds to the I/F connector (female 10 of FIG. 1).

An EEPROM 113 is connected to the microprocessor 108 to hold the required data. A display part 115a is controlled by the microprocessor 108 via a display driving circuit 115 to display the operating mode of the camera, the remaining memory capacity, the remaining amount of battery power, and the like.

Light emitting diodes 116 and 117 are connected to the microprocessor 108 to display the completion of recharging of the flash unit, the completion of focusing a warning of a low luminance, and the like. A release switch 118 (which corresponds to the release button 7 o FIG. 1), a photographing-mode setting switch 119 and a power source switch 120 are also connected to the mi compressor 108. As described previously the release switch 118 is of a two-stroke type which has the first stroke (hereinafter referred to as "SW1") and the second stroke hereinafter referred to as "SW2"). When it is detected that the SW1 has been turned on the preparation of photography, such as a focusing operation and the detection of exposure conditions, is started. When it is detected that the SW2 has been turned on, photography is executed. Detailed operations associated with the release switch 118 will be described later.

The photographing-mode setting switch 119 is provided for setting the operating mode of the camera. The power source switch 120 is provided for turning on or off the power source. A time counting circuit 121, such as a clock or a timer is connected to the microprocessor 108, and is kept in an operating state at all times by means of a power source snot shown) and always supplies the current time instant to the microprocessor 108.

An iris driving circuit 152 is provided for driving and controlling an iris unit 151 (which corresponds to the iris unit 65 of FIG. 9) on the basis of an instruction sent from the microprocessor 108. A focusing-motor driving circuit 154 is provided for driving and controlling a focusing motor 153 (which corresponds to the stepping motor 67 of FIGS. 9 and 10) on the basis of an instruction sent from the microprocessor 108.

A focus resetting switch 255 serves to detect an initial position of the focusing lens in the camera optical system 3. A photographing-mode selecting switch 156 (which corresponds to the photographing-mode selecting switch 16 of FIG. 15) is provided for detecting the presence or absence of an optical low-pass filter (the crystal LPF 36 of FIG. 6) in the optical path. The focus resetting switch 155 and the photographing-mode selecting switch 156 are connected to the microprocessor 108e and the detection results of the focus resetting switch 155 and the photographing-mode selecting switch 156 are supplied to the microprocessor 108.

The shown electrical system arrangement also includes a flash emission part 157 and a flash emission circuit 158 which are arranged to perform flash emission under the control of the microprocessor 108. The shown electrical system arrangement also includes a power-source stabilizing circuit 171, a power-source selecting switch 172, the battery 173, a voltage detecting circuit 174, a DC jack 175, a reduced-voltage detecting circuit 176 and a battery decision switch-177. The power-source stabilizing circuit 171 receives a supply of electrical power via the power-source selecting switch 172 and supplies various kinds of source voltages to various parts of the camera body A. The power-source stabilizing circuit 171 also supplies a portion of the electrical power to the outside via the I/F connector 112.

The state of the output of the power-source stabilizing circuit 171 is controlled by the microprocessor 108, and a DC source voltage outputted from the battery 173 and a DC source voltage inputted through the I/F connector 112 or the DC jack 175 are supplied to the power-source selecting switch 172. The power-source selecting switch 172 is controlled by the voltage detecting circuit 174 in the following manner. if the voltage detecting circuit 174 detects the DC source voltage supplied through the I/F connector 112 or the DC jack 175, the power-source selecting switch 172 supplies to the power-source stabilizing circuit 171 the DC source voltage supplied through the I/F connector 112 or the DC jack 175. If the voltage detecting circuit 174 does not detect the DC source voltage supplied through the I/F connector 112 or the DC jack 175, the power-source selecting switch 172 supplies to the power-source stabilizing circuit 171 the DC source voltage supplied from the battery 173.

The reduced-voltage detecting circuit 176 detects the DC source voltage supplied to the power-source stabilizing circuit 171 and outputs a signal to the microprocessor 108. If the microprocessor 108 detects a decrease in the DC source voltage, the microprocessor 108 performs predetermined control, such as the stopping of each of the circuits, resetting, warning the switching of the DC source voltages, and the like.

The battery decision switch 177 detects whether the battery 173 is a primary battery or a secondary battery, and outputs the detection result to the microprocessor 108. On the basis of the detection result, the microprocessor 108 performs control according to the characteristics of the power source.

The electrical system arrangement of the annotation unit B will be described below with reference to FIG. 22. The electrical system arrangement shown in FIG. 22 includes an I/F connector 601, a microprocessor 602 and a ROM 603. The microprocessor 602 is arranged to perform direct serial communication with the microprocessor 108 of the camera body A via the I/F connector 601, and loads program data from the ROM 603, as required, and executes a predetermined operation.

The electrical system arrangement shown in FIG. 22 also includes a display panel controlling circuit 604, a display memory 605, a display panel 606 (which corresponds to the LCD 205 of FIG. 14), and a touch panel 607 (which corresponds to the touch panel 209 of FIG. 14. The display panel controlling circuit 604 has its operating mode set by the microprocessor 602, and causes the display panel controlling circuit 604 to display the contents of the display memory 605 on the display panel 606. The display panel controlling circuit 604 is also arranged to perform scanning control of the touch panel 607, and the output signal of the touch panel 607 is inputted to the microprocessor 602.

The shown electrical system arrangement also includes a PCMCIA controlling part 608 for performing data input/output processing which conforms to the PCMCIA format used for an IC memory card or the like, and a PCMCIA connector 609 (which corresponds to the PCMCIA connector 214 of FIG. 14). The camera body A is arranged to exchange video data or program data with a memory card or the like connected to the PCMCIA connector 609, via the data bus 108a and the PCHCIA controlling part 608.

The data bus 108a and other associated elements are also connected to an I/F connector 610 (which corresponds to the I/F connector (male) 212 of FIG. 14), Through the I/F connector 610, a video signal supplied from the camera body A and an audio signal indicative of a sound picked up at the annotation unit B can also be transmitted to an external computer or the like connected directly to the annotation unit B. An amplifier 612 is provided for amplifying an audio signal picked up by and outputted from a microphone 611 (which corresponds to the microphone 204 of FIG. 14). The audio signal picked up by and outputted from the microphone 611 is transmitted to the camera body A via the I/F connector 601 (which corresponds to the I/F connector (male) 212 of FIG. 14).

The microprocessor 602 is arranged to select either one of the on and off operations of the display panel 606 in accordance with the on/off state of a display on/off switch 613. The microprocessor 602 is also arranged to execute the operation of picking up sound during the period in which the microprocessor 602 detects the on state of a sound recording switch 614 and the on state of the SW2 of the release switch 118 of the camera body A.

The electrical system arrangement of the camera installing unit C will be described below with reference to FIG. 23.

The electrical system arrangement shown in FIG. 23 includes an I/F connector 701, a DC jack 702 and a PC connector 703. A DC source voltage which is inputted via the DC jack 702 is coupled to some of the terminals of the I/F connector 701, while a data signal, a control signal and the like which are inputted or outputted via the PC connector 703 are coupled to the others of the terminals of the I/F connector 701.

The operation of the electronic camera according to the present embodiment will be described below with reference to the flowcharts shown in FIGS. 24 to 36.

If the power source switch 120 shown in FIG. 21 is turned on (Step S1 of FIG. 24), the microprocessor 108 detects whether the annotation unit B (a B unit in FIG. 21) is connected to the I/F connector 112 step S2). If the annotation unit B is connected to the I/F connector 112, the process proceeds to Step S3; otherwise, the process proceeds to the flowchart shown in FIG. 25.

First of all, an operation of the camera to be executed when it is determined in Step S2 of FIG. 24 that the annotation unit B is not connected to the I/F connector 112 will be described with reference to the flowchart of FIG. 25.

Figure 25:
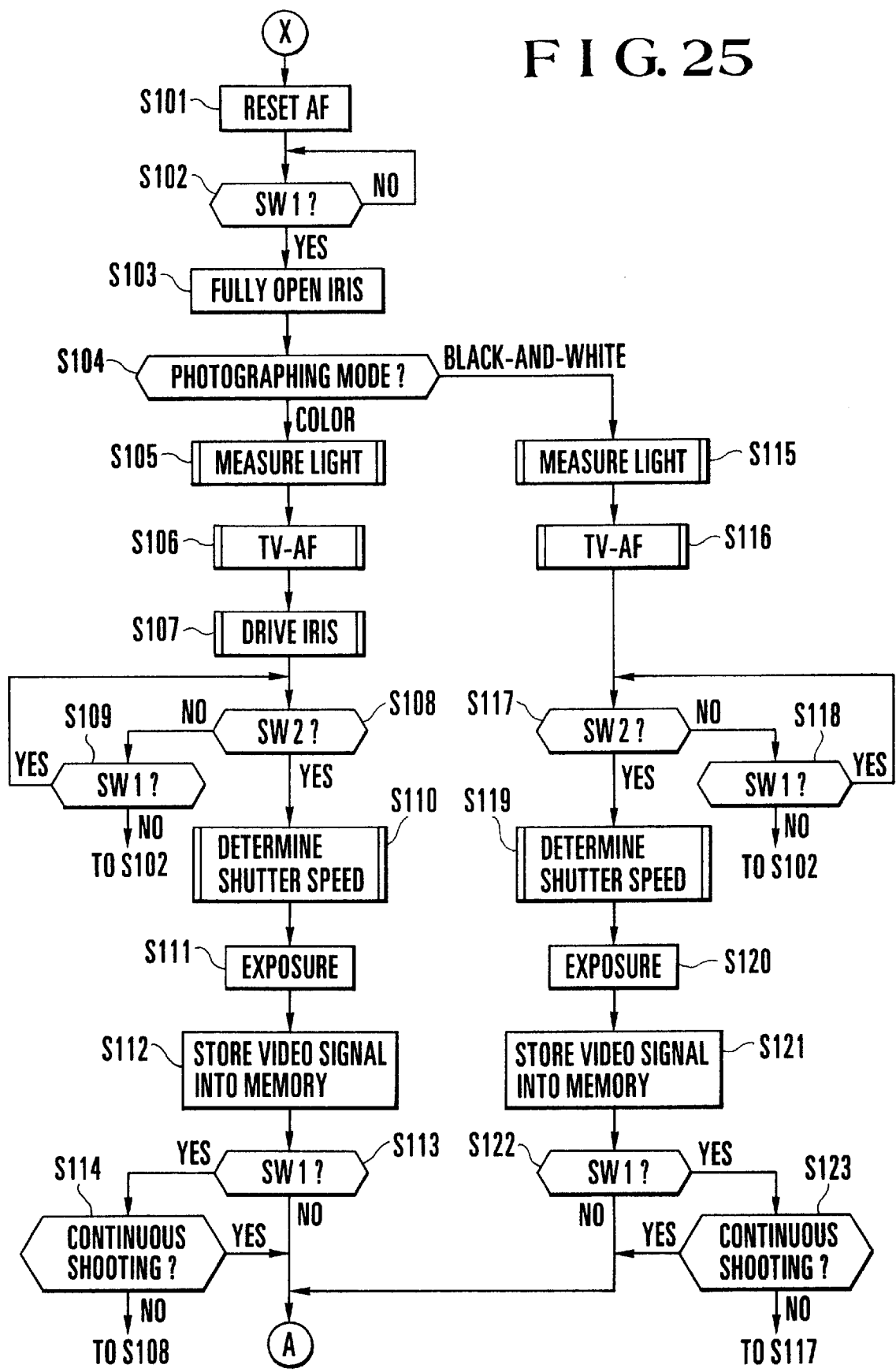
FIG. 25 is a flowchart showing processing which follows the flowchart of FIG. 24.

In Step S101 of FIG. 25, the focusing motor 153 is driven to move the focusing lens to its initial position, thereby affecting an AF resetting operation. The focus resetting switch 155 detects whether the focusing lens has been moved to the initial position to complete the AF resetting operation.

Incidentally, the AF resetting operation is performed in the following manner. For example, if the normal (photographing) mode is selected as a program function as described previously, the focusing lens is moved to the infinity position. If the macro mode is selected, the focusing lens is moved to its closest-distance and. According to the AF resetting operation, since the focusing lens is moved from the infinity position in the case of the normal mode or from the closest-distance and in the case of the macro modes an focusing operation can be rapidly completed as compared to a system arranged to always drive a lens at the same position irrespective of the kind of photographing mode.

If it is determined in Step S102 that the SW1 of the release switch 118 has been turned on at the first strokes the process proceeds to Step S103, in which an IG meter of the iris unit 151 is driven to control the iris of the iris unit 151 and set it to its fully open state. This is because as the aperture diameter is made larger, a more accurate focusing operation can be effected during an AF operation.

In Step S104, either a color mode which follows Step S105 or a black-and-white mode which follows Step S115 is selected on the basis of the state of the photographing-mode selecting switch 156.

In the case of the color mode, the process proceeds to Step S105, in which first light measuring processing is performed. The first light measuring processing is prepared as a subroutine the processing of which is shown in the flowchart of FIG. 32.

Figure 32:
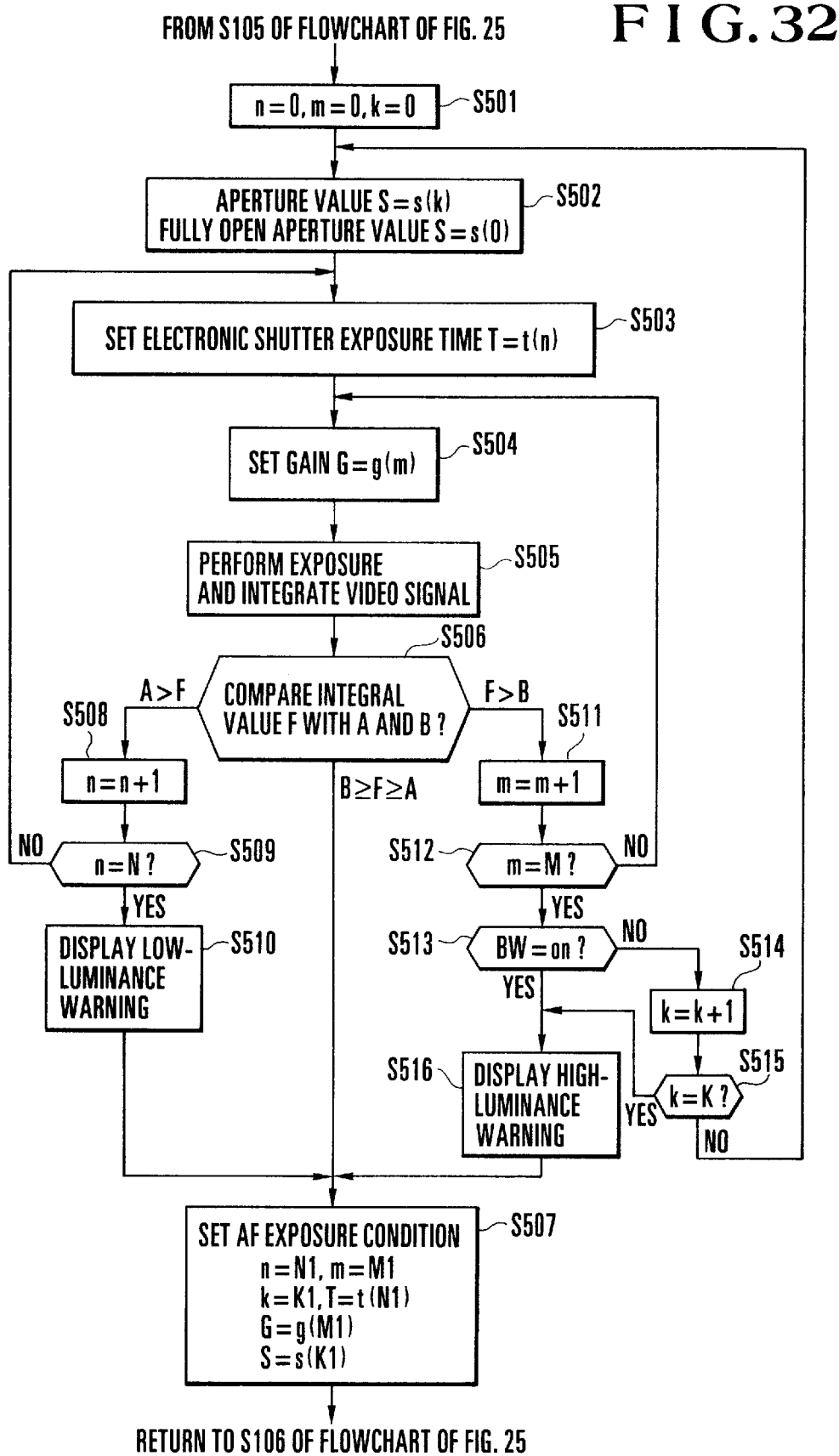
FIG. 32 is a flowchart showing first light measuring processing for the AF operation of Step S105.

In Step S101 of FIG. 32, parameters "n", "m" and "k" are initialized. The parameter "n" represents an exposure time (shutter speed). In the present embodiment, the parameter "n" indicates the exposure time in the form of $T=t(n)$; $n=0, 1, 2, 3, \ldots$, and is set to take on values, e such as $t(0)=\frac{1}{2000}$ sec, $t(1)=\frac{1}{1000}$ sec, $t(2)=\frac{1}{500}$ sec, $\ldots$. The parameter "m" represents gain. In the present embodiment, the parameter "m" indicates the gain of the pre-process circuit 104 with respect to a video signal in the form of $G=g(m)$; $m=0, 1, 2, 3, \ldots$ and is set to take on values, such as $t(0)=\frac{1}{2000}$ sec, $t(1)=\frac{1}{1000}$ sec, $t(2)=\frac{1}{500}$ sec, $\ldots$. The parameter "k" represents an aperture value. In the present embodiment, e the parameter "k" indicates the aperture value in the form of $S=s(k)$; $k=0, 1, 2, 3, \ldots$ and is set to take on values, esuch as $s(0)=2.5$ (fully open aperture value), $s(1)=3.5$, $s(2)=4.5$, $\ldots$ In Steps S502, S503 and S504, the aperture value, the exposure time and the gain are respectively set to $S=s(k)$, $T=t(n)$ and $G=g(m)$. In Step S505, an exposure cycle is performed by the electronic shutter on the basis of these settings,e and an integral value F of a video signal of the obtained subject image is compared with predetermined values A and B in Step S506.

If the integral value F is between A and B, the process proceeds to Step S507 in which the exposure conditions set in Steps S502, S503 and S504 are set as exposure conditions for an autofocus operation. If it is determined in Step S506 that the integral value F is smaller than A, the process proceeds to Step S508 in which the exposure time (shutter speed) parameter "n" is set to n=n+1, i.e., the setting of the exposure time of the electronic shutter is shifted in the direction in which the shutter speed is made slower by one step. In Step S509 it is determined whether the exposure time of the electronic shutter has reached its maximum which corresponds to a lowest shutter speed (n=N). If the maximum exposure time N has not been reached, the process returns to Step S503, in which the exposure time of the electronic shutter is made longer by one step on the basis of the setting of n=n+1 of Step S508. Then, the above-described exposure cycle is again performed in Step 504 and the following steps.

The above-described routine for lowering the shutter speed is repeatedly performed, and if it is determined in Step S509 that the maximum exposure time has been reached, the process proceeds to Step S510, in which a low-luminance warning is displayed on the LED 116. Then, in Step S507, the obtained exposure conditions are set.

If it is determined in Step S506 that the integral value F is greater than B, the process proceeds to Step S511, in which the parameter of the gain is set to m=m+1, ie., the parameter of the gain is varied in the direction in which the gain is made lower by one step. In Step S512, it is determined whether the gain has reached a lowest gain (m=M). If the lowest gain M has not been reached, the process returns to Step S504, in which the gain of the video signal is made lower by one step on the basis of the setting of m=m+1 of Step S511 Then, the above-described exposure cycle is again performed in Step S505 and the following steps.

The above-described routine for lowering the gain is repeatedly performed, and if it is determined in Step S512 that the lowest gain has been reached, in the case of the color mode (Step S513), the process proceeds to Step S514, in which the parameter of the aperture value is set to k=k+1, i.e., the parameter of the aperture value is varied in the direction in which the aperture value is reduced by one step. If it is determined in Step S515 that the aperture value has not yet reached a minimum aperture value X, the process returns to Step S502, in which the aperture value of the IG meter is reduced by one step. Then, the above-described exposure cycle is again performed in Step 503 and the following steps.

The above-described routine for reducing the IG meter is repeatedly performed, and if it is determined in Step S515 that the minimum aperture value (k=K) has been reached, the process proceeds to Step S516, in which a high-luminance warning is displayed on the LED 117. The obtained exposure conditions are set in Step S507.

In the case of the black-and-white mode, since the optical low-pass filter is retracted from the optical path and the fixed iris is inserted to improve image pickup performance, it is not preferable that the IG meter be driven to reduce the iris. For this reason, in the above-described routine for lowering the gain, if it is determined in Step S512 that the lowest gain has been reached, the process proceeds to Step S513, in which it is determined whether the black-and white mode is selected. If it is determined in Step S513 that the black-and-white mode is selected, the process proceeds to Step S516, in which the high-luminance warning is displayed on the LED 117. Then, in Step S517, the obtained exposure conditions are set.

In the above-described manners the exposure conditions required for performing the AF operation are set and the first light measuring processing of Step S105 of the flowchart of FIG. 25 is completed. Then, the process proceeds to Step S106.

Returning to the flowchart of FIG. 25, in the subroutine shown as Step S106, the AF operation is performed. The processing of the subroutine of the AF operation is shown in FIG. 33.

Figure 33:
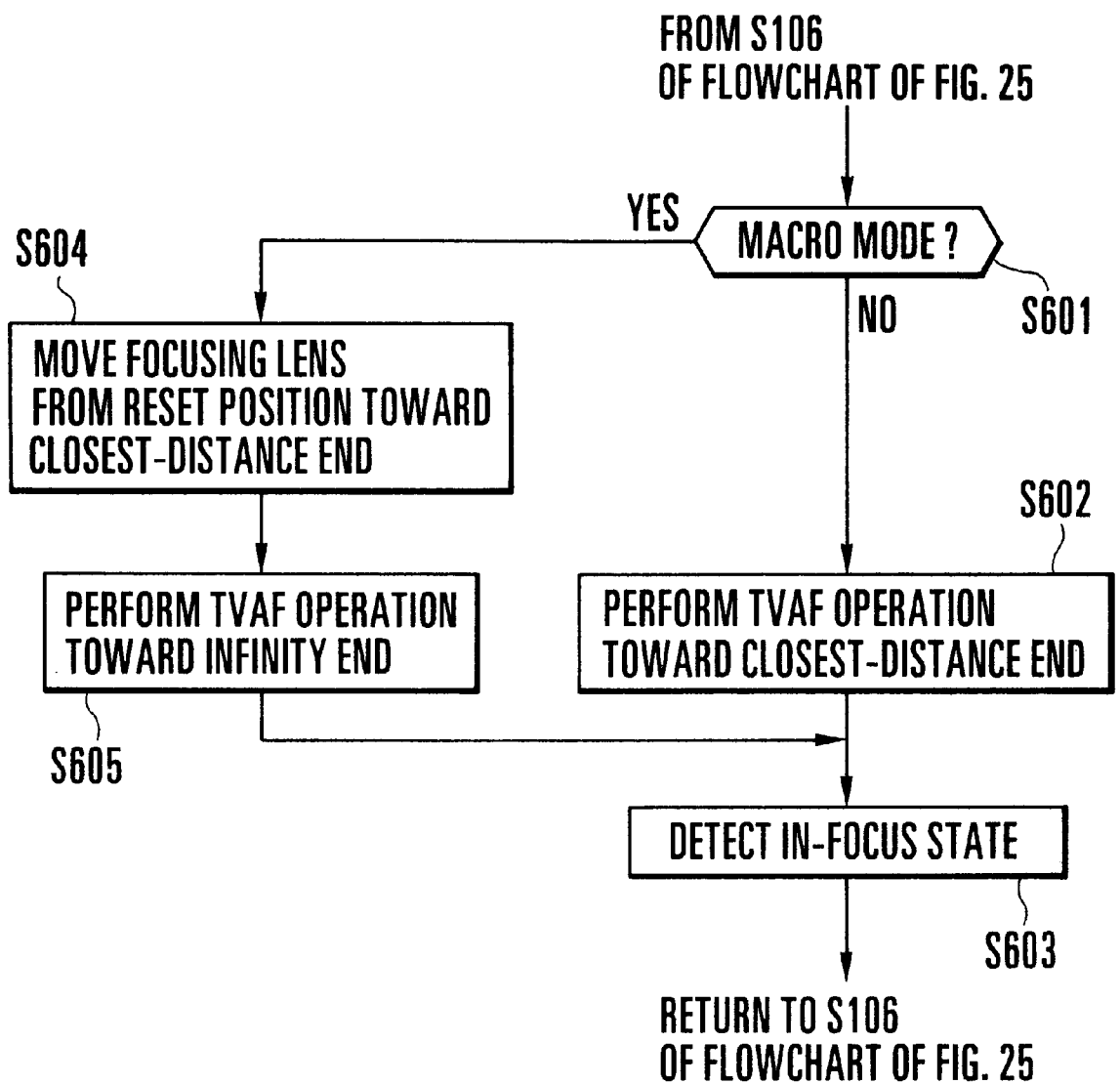
FIG. 33 is a flowchart showing the processing of the AF operation of step S106 of FIG. 25.

Referring to FIG. 33, in Step S601, it is determined whether the macro mode (macro photography mode) is selected. If the macro photography mode is not selected, the process proceeds to Step S602, in which an exposure operation is repeatedly performed while the focusing lens is being moved from a reset position at which the focusing lens reset in Step S101 of FIG. 25 is located, thereby detecting an increase or decrease of a high-frequency component in a video signal. In Step S603, an in-focus position at which the high-frequency component reaches a maximum is detected, and the focusing lens is operated to cause it to stop at the in-focus position. in this case, although reading from the CD is performed on a field-by-field basis, it is possible to increase the speed of detection of AF data not by performing interlaced reading but by adding the contents of consistently the same line together and reading the added contents.

In the case of the macro modes in Step S604, the focusing lens is moved from the reset position to the closest-distance and position, and is, in Step S605, moved from the closest-distance end position toward the infinity end, thereby performing an AF operation similar to the above-described one. In Step S603, the focusing lens is made to stop at an in-focus position. After this AF operation has been performed, the process returns to the iris driving processing of Step S107 of FIG. 25.

Returning to FIG. 25, in the subroutine shown as Step S107, the iris driving processing is performed. FIG. 34 shows the subroutine of the iris driving process.

As shown in FIG. 34, in Step S701, pre-exposure settings for a second light measurement are prepared on the basis of the exposure settings obtained from the first light measuring processing for the AF operation. Specifically, the exposure settings obtained from the first light measuring processing are converted into the pre-exposure settings for the second light measurement on the basis of a conversion tables a computing expression or the like. In Step S702, the IG meter is driven to set the iris in accordance with the pre-exposure settings. After the above-described processing has been performed, the process returns to Step S108 of FIG. 25.

Then as shown in Steps S108 and S109 AF and light measuring operations are performed when the release switch 118 is pressed to the first stroke position, and the process is placed into the photography standby state of waiting until the release switch 118 is pressed to the second stroke position, i.e., the SW2 is turned on. If it is not determined in Step S108 that the release switch 118 is pressed to the second stroke position and it is detected in Step S109 that the release switch 118 is released from being pressed at the first stroke position, i.e., the SW1 is turned off, then the process is placed into the state of waiting for the SW1 to be turned on in Step S102.

If it is determined in Step S108 that the release switch 118 is pressed to the second stroke position and the SW2 is turned on, the shutter speed determining processing of Step S110 is executed. The subroutine shown in FIG. 35 shows the shutter speed determining process.

In Step S801 of FIG. 35, exposure using the electronic shutter is performed to integrate a video signal, and, in Step S802, the pre-exposure settings obtained in Step S701 in the subroutine of FIG. 34 are converted into main exposure settings on the basis of a conversion table, a computing expression or the like. At this time, the gain G and a timing T' at which to completely close the IG meter are set so that the aperture value of the IG meter can be made similar to that of the IG meter for pre-exposures Accordingly, the IG meter need not be operated further, whereby it is possible to achieve a saving of electrical power consumption and a reduction in shutter time lag.

After the main exposure settings have been prepared in the above-described manner, the process returns to Step Sill of FIG. 25, in which main exposure is performed. In Step S112, the video signal read from the CCD sensor 101 is temporarily stored in the video image storage circuit (memory) 110 in the form of pixel data. At the time of the main exposure performed in Step S111, an actual shutter speed is corrected to correct a variation in the sensitivity of the CCD sensor 101, because the sensitivity varies according to which of a full electronic shutter mode (field photography) and a hybrid shutter mode (frame photography) is selected.

Then, in Step S113, it is determined whether the SW1 is off which has been turned on at the first stroke of the release switch 118. If the SW1 is off, the process proceeds to the signal processing flow shown in the flowcharts of FIGS. 28 and 29. If the SW1 is on, it is determined in Step S114 whether continuous shooting for a predetermined number of exposures has been completed. If the continuous shooting has not yet been completed, the process returns to Step S108, in which the process is placed into the state of waiting for the next photographic cycle. If the continuous shooting has been completed, the process proceeds to the signal processing flow shown in FIGS. 28 and 29.

In the flowchart of FIG. 25, if it is determined in Step S104 that the black-and-white (high-resolution) photographing mode is selected, Steps S115 through S123 are executed. Then, the process proceeds to the signal processing flow of FIGS. 28 and 29.

In the case of the black-and-white photographing mode, the small fixed aperture 66b of the fixed iris plate 66 determines the substantial aperture diameter of the image pickup optical system 30. The CCD sensor 101 is driven in a movie photographing mode and the shutter speed of the electronic shutter is varied to find an electronic shutter speed which can provide correct exposure, and the brightness of a subject is determined on the basis of the electronic shutter speed and the aperture value.

In the case of the black-and-white photographing mode, since the iris is fixed (the small fixed aperture 66b is used), the fixed iris plate 66 which has the circular apertures 66a and 66b as described previously is inserted in the optical path unlike the color (standard-resolution) photographing mode. Accordingly, it is not necessary to perform the processing of driving the IG meter and controlling the iris after Step S116, and the aperture value S from among the exposure settings is set to a constant value. Except for this feature, the black-and-white photographing mode is similar to the color photographing mode, and the description of the remaining features is omitted.

Signal processing to be performed after the picked-up image has temporarily been stored in the memory 110 will be described below with reference to the flowcharts shown in FIGS. 28 and 29. In the flowcharts shown in FIGS. 28 and 29, the processing indicated by "M" marked on either side of the block of each step is performed by the microprocessor 108 of FIG. 21, while the processing marked with "D" is performed by the digital process circuit 107 of FIG. 21 ("M" and "D" are used in similar senses in FIGS. 30 and 31 which will be referred to later). Incidentally, the other processing which is not marked with "M" or "D" is performed by the microprocessor 108, and the processing marked with "M" is also performed by the microprocessor 108. Although in the present embodiment the microprocessor 108 performs the processing marked with "M" the processing marked with "M" has been performed by a digital process circuit in a conventional arrangement. The letter "M" is used to clearly indicate such a distinction between the present embodiment and the conventional arrangement.

First, in Step S201, pixel data is read from the memory 110 in units of a small block, and the black level and the gain of each color (yellow Ye, cyan Cy, magenta Mg and green G) are adjusted. The pixel data thus adjusted is stored in a predetermined memory area 110(a) of the memory 110. This processing is repeated to perform operations on all pixels.

Then, in Step S202, the pixel data stored in the memory area 110(a) is read in the vertical direction of the CCD sensor 101 in units of the small block similarly to Step S201. The read pixel data is subjected to a horizontal filter in the digital process circuit 107 of FIG. 21, and the resultant data is stored in a memory area 110(b) of the memory 110. The memory 110 is controlled so that the memory area 110(a) and the memory area 110(b) are prevented from overlapping each other.

Then, in Step S203 it is determined whether the black-and-white photographing mode (BW mode) or the color photographing mode is selected if it is determined that the color photographing mode is selected, the process proceeds to Step S204. In Step S204 reading from and writing to the memory area 110(a) and reading from and writing to the memory area 110(b) are alternately performed. Each of the chrominance signals Ye, Cy, Mg and G read from the memory area 110(a) is matrix-converted into R, G and B color signals. Each of the Re G and B color signals is subjected to low-pass filtering followed by gamma correction. After the gamma correction, the R, G and B color signals are converted into color-difference signals R-Y(Cr) and B-Y (Cb). Then, the signal of each of the color-difference signals R-Y(Cr) and B-Y (Cb) that corresponds to a high-luminance portion of a video signal is suppressed according to a signal which is read from the memory area 110(b) and subjected to horizontal filtering, and the resultant signal is stored into the memory area 110(a). Also, the signal read from the memory area 110(b) is subjected to horizontal aperture corrections and is stored in the memory area 110(b).

In Step S205, reading from the memory area 110(a) and reading from the memory area 110(b) are alternately performed. The s signal read from the memory area 110(b) is subjected to vertical aperture correction followed by gama correction. After the gamma corrections the luminance of the signal is corrected according to the signal read from the memory area 110(a), and the resultant signal is stored in the memory area 110(b). By executing the above-described processing of Steps S203 and S205, the color-difference signals are stored in the memory area 110(a) of the memory 110, while the luminance signal is stored in the memory area 110(b).

If it is determined in step S203 that the black-and-white photographing mode is selected, the process proceeds to step S206, in which the image signal read from the memory area 110(b) is subjected to horizontal aperture correction and the resultant image signal is stored in the memory area 110(b). Then, in Step S207, the image signal stored in the memory area 110(b) is read in the vertical direction similarly to Step S202, and the read signal is subjected to vertical aperture correction followed by gamma correction. After the gamma correction, the resultant signal is stored in the memory area 110(b). By executing the above-described processing, a luminance signal in the black-and-white mode is stored in the memory area 110(b) of the memory 110.

When Step S205 or S207 has been completed, the process proceeds to Step S208, in which it is determined whether the image processing is completed. If there is an unprocessed image, the process returns to Step S201. if the image processing is completed, the above-described series of photographing operations is brought to an end in Step S209.

Conventionally, since the above-described video signal processing is all performed in the digital process circuit 107, it has been impossible to achieve efficient processing. In addition, since alteration or the like of the characteristics of the digital process circuit 107 is impossible, it is necessary to design a dedicated digital process circuit for each system circuit, so that it is impossible to realize a system having versatility. In contrast, in the present embodiment, as described above, the video signal processing is shared by the microprocessor 108 so that the image memory is efficiently utilized. Accordingly, it is possible to perform digital signal processing of a video signal smoothly rapidly and efficiently.

In addition, since part of the digital signal processing of the video signal is performed by the microprocessor 108, it is possible to readily alter and adjust various kinds of processing, such as chrominance signal processing, black-level adjustment, gain adjustment, luminance correction and chrominance correction, merely by altering the program of the microprocessor 108. Accordingly, it is possible to provide a digital video signal processing system having versatility improved to a great extent and hence applicable to other systems.

For example, merely by altering the program of the microprocessor 108, it is possible to cope with different kinds of subjects, such as an ordinary subject, a document and a film (negative or positive) and it is further possible to cope with various kinds of processing, such as color temperature correction according to the kind of illumination. Accordingly, it is possible to perform various kinds of signal processing corresponding to multimedia techniques. In addition, since the burden of the digital process circuit 107 is reduced, it is possible to facilitate design, alteration or the like of the digital process circuit 107.

Figure 24:
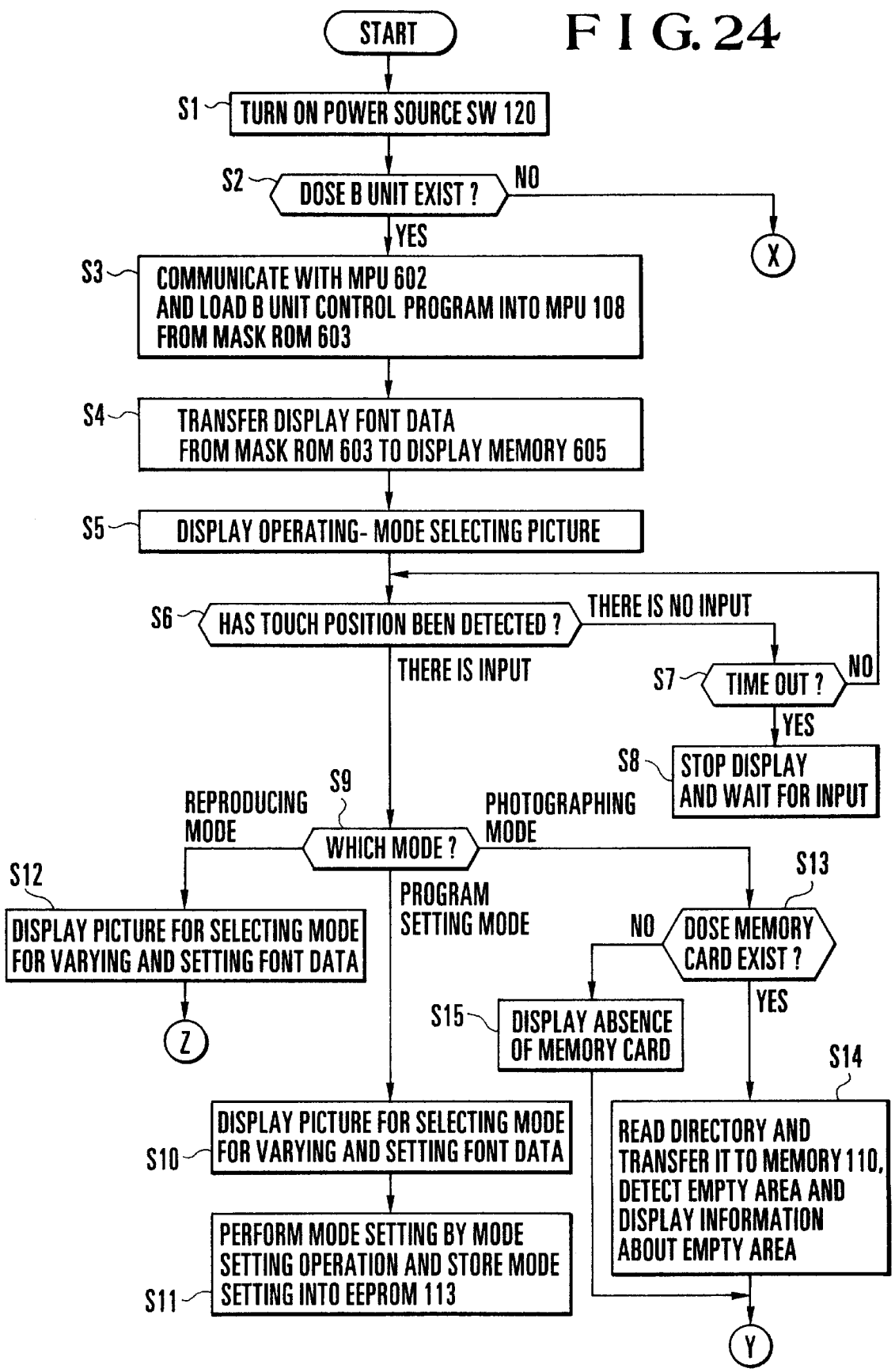
FIG. 24 is a flowchart showing the operation of the camera body.

The above-described processing is executed if it is determined in Step S2 of the flowchart of FIG. 24 that the B unit is not attached. The following is a description of processing to be executed if it is determined in Step S2 that the B unit is attached.

If it is determined in Step S2 that the B unit is attached, the process proceeds to Step S3, in which communication is performed between the microprocessor 602 of the B unit and the microprocessor 108 of the camera body A. The program of the microprocessor 108 that is needed to cause the B unit to function is read from the mask ROM 603 of the B unit and loaded into the microprocessor 108. In this manner, the 3 unit becomes able to operate. With this arrangement, it is not necessary to incorporate a large ROM into the camera body A, and it is possible to readily cope with future improvements.

In Step S4, font data and the like associated with a visual display are transmitted from the mask ROM 603 to the display memory 605. In Step S5, a picture for selecting an operating mode such as a reproducing mode, a photographing mode or a program setting mode is displayed. In Step S6, the process is placed into the state of waiting for an input to the touch panel 607.

If there is no input to the touch panel 607 in Step S6, the process proceeds to Step S7. If it is determined in Step S7 that no input is provided for a predetermined period of time, the process proceeds to Step S8, in which the visual display is stopped and the process is placed into the state of waiting for the next manipulation. By stopping the visual display, it is possible to prevent wasteful power consumption.

If an input to the touch panel 607 is detected in Step S6, the process proceeds to Step S9, in which it is determined which operating mode is selected. If it is determined that the photographing mode is selected, the process proceeds to Step S13, in which a memory card which is a recording medium is inserted in the PCMCIA connector 609. If the memory card is inserted, the process proceeds to Step S14, in which the directory of the memory card is read and transmitted to the memory 110. If the memory card contains an empty area, the microprocessor 108 displays on the display panel 606 information indicating that the memory card is recordable. If the memory card contains no empty area, the microprocessor 108 displays to that affect on the display panel 606. The process proceeds to the flow of FIG. 26.

Figure 26:
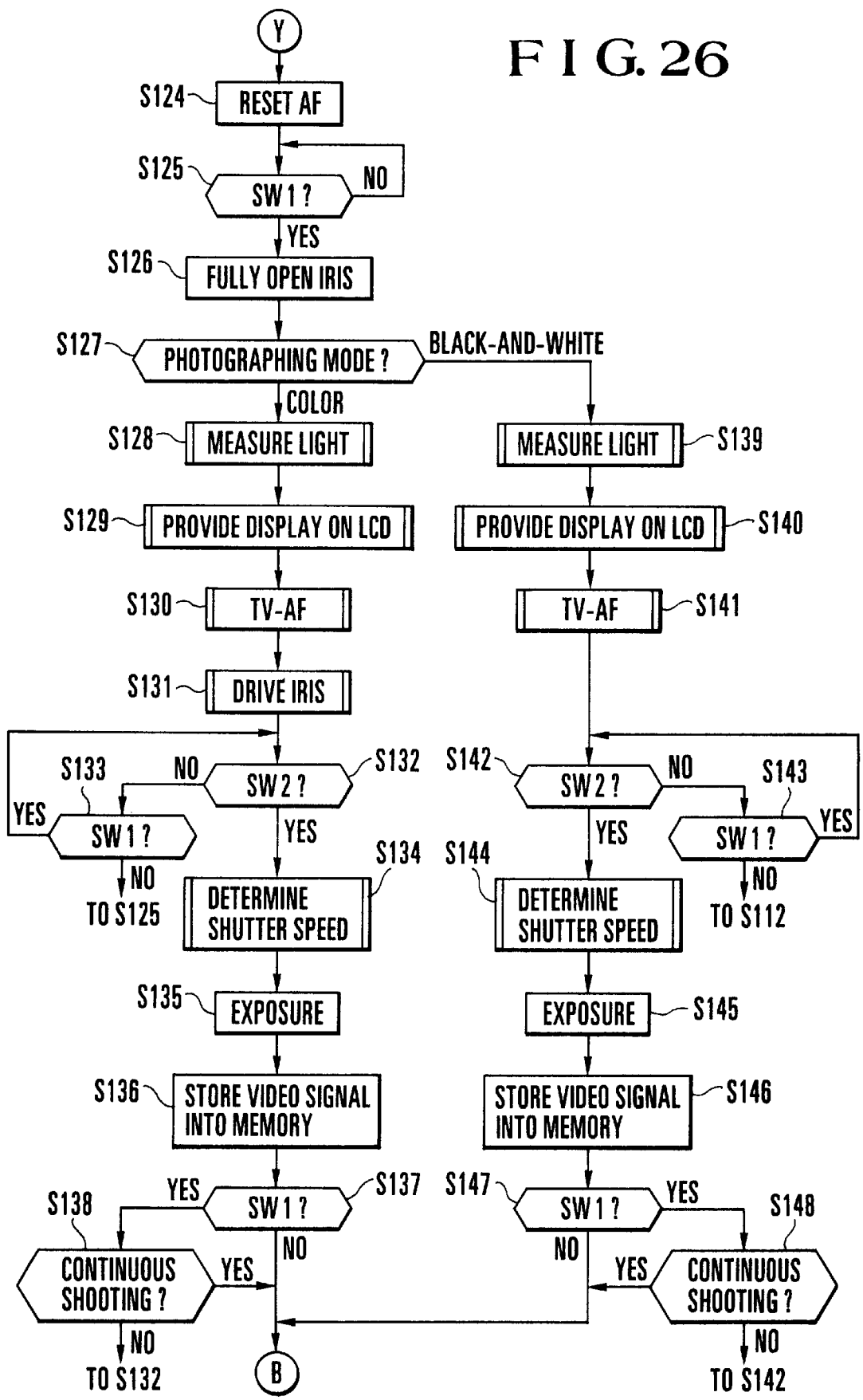
FIG. 26 is a flowchart showing processing which follows the flowchart of FIG. 24.

On the other hand, if no memory card is detected in Step S13, the process proceeds to Step S15, in which information indicating that no memory card is inserted is displayed. Then, the process proceeds to the flow of FIG. 26 incidentally, the flow of FIG. 26 is approximately similar to the flow of FIG. 25 except that the display processing of Steps S129 and S140 and the AF operations of Steps S130 and S141 are respectively performed in parallel with each other and the state of each of the AF operations is displayed on the (LCD) display panel 606 of the B unit in the state of being superimposed on an image. The description of the other processing is omitted.

In Step S129 or S140 of FIG. 26, if the (LCD) display panel 606 is turned on, the movie photographing mode is continued and an electronic shutter speed is so controlled that a correct exposure level can be maintained. The video signal obtained during that time is displayed on the LCD display panel 606.

The flow of the photographing operation which is performed when the B unit is attached to the camera body A is approximately the same as the flow of the photographing operation which is performed when the camera body A alone is used. Therefore only the TV-AF subroutines of Steps S130 and S141 will be described below with reference to FIG. 36.

Figure 36:
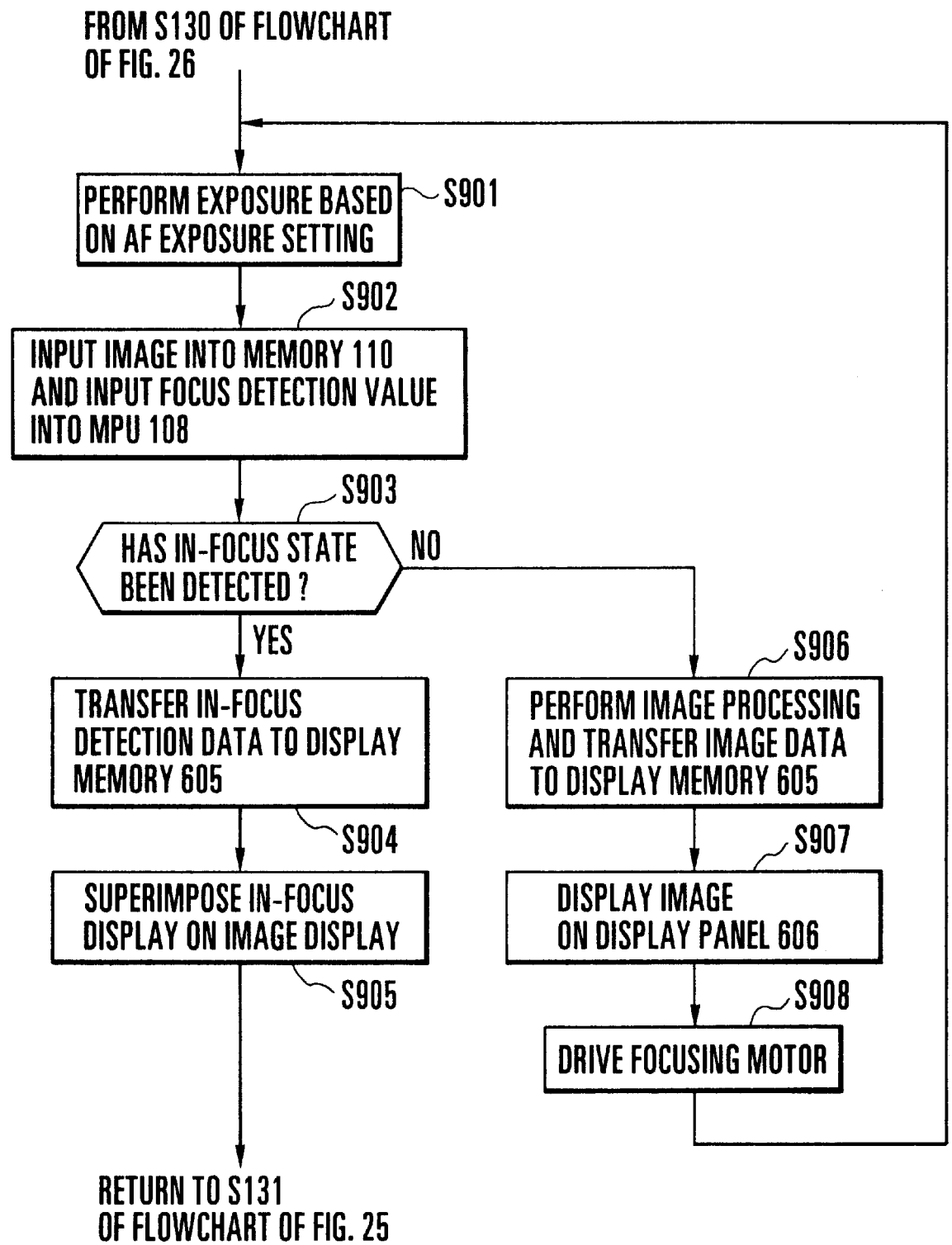
FIG. 36 is a flowchart showing the processing of an AF operation to be performed in each of Steps S130 and S141 of FIG. 25 when a B unit is attached.

In Step S901 of FIG. 36, exposure based on the exposure settings for the AF operation is performed, and the obtained image is inputted to the memory 110 in Step S902 and the output of the focus detecting circuit 106 is inputted to the microprocessor 108.

In Step S903, it is determined whether an in-focus state has been reached. If no in-focus state has been reached, the process proceeds to Step S906, in which the image processing required for providing a visual display is performed and the obtained image data is transmitted to the display memory 605. In Step S907, an image is displayed on the LCD display panel 606, and in Step S908 the focusing motor 153 is driven to move to the next position.

The above-described operation is repeatedly performed, and if it is determined in Step S903 that the in-focus state has been reached, the process proceeds to Step S904, in which in-focus detection data is transmitted to the display memory 605. In Step S906, the in-focus detection data is displayed in the state of being superimposed on the image data.

Although the flowchart of FIG. 36 primarily shows the processing of providing a visual displays the processing of determining at which focal-length end the driving of the focusing lens is to be started is substantially identical to the subroutine shown in FIG. 33. After Steps S124 to S138 or Steps S124 to S148 of FIG. 26 have been performed, the process proceeds to the flow shown in FIGS. 30 and 31. Since the image signal processing portion shown in the flow of FIGS. 30 and 31 is similar to that shown in the flow of FIGS. 28 and 29, the description thereof is omitted.

Figure 28:
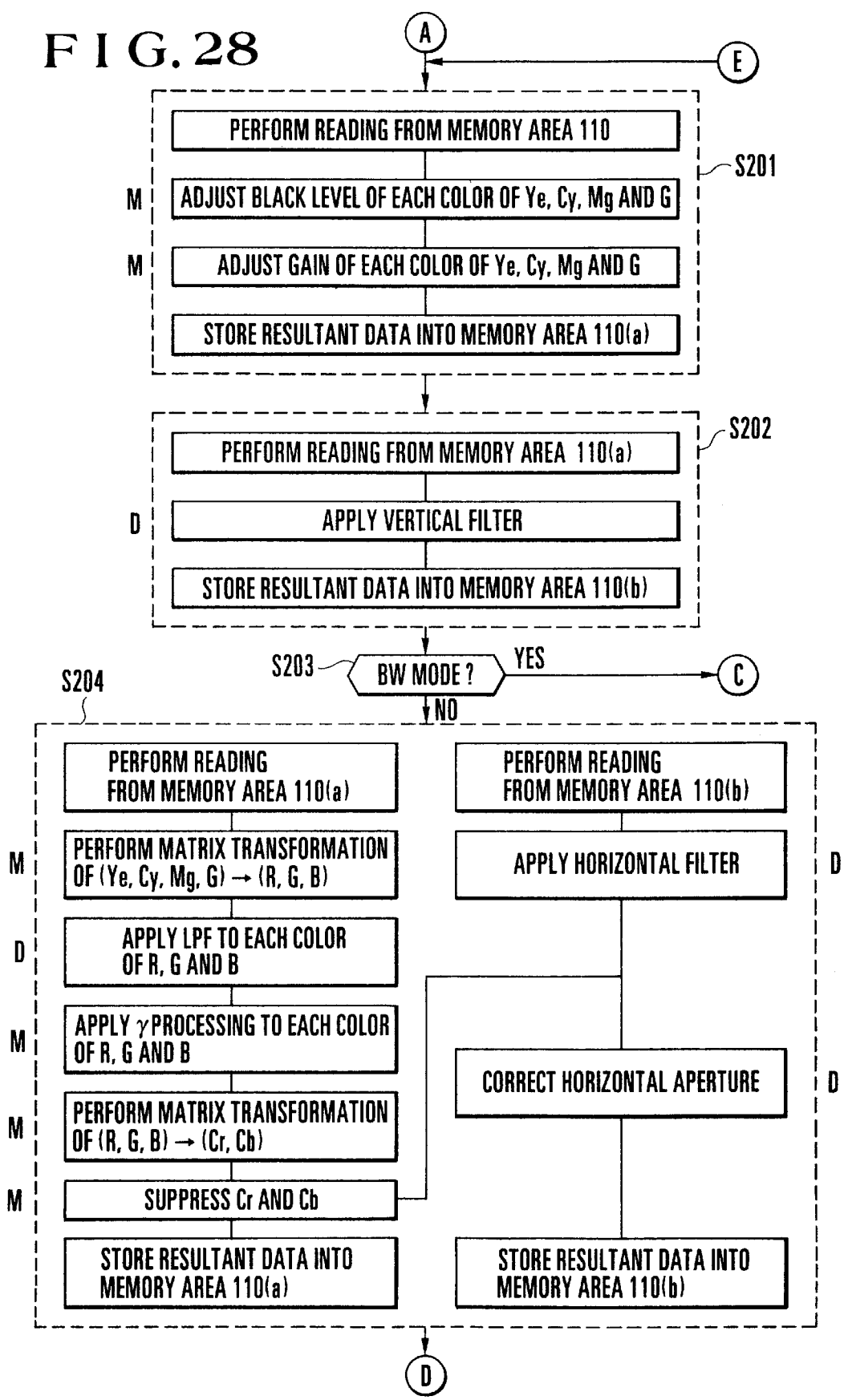
FIG. 28 is a flowchart showing processing which follows the flowchart of FIG. 25.
Figure 29:
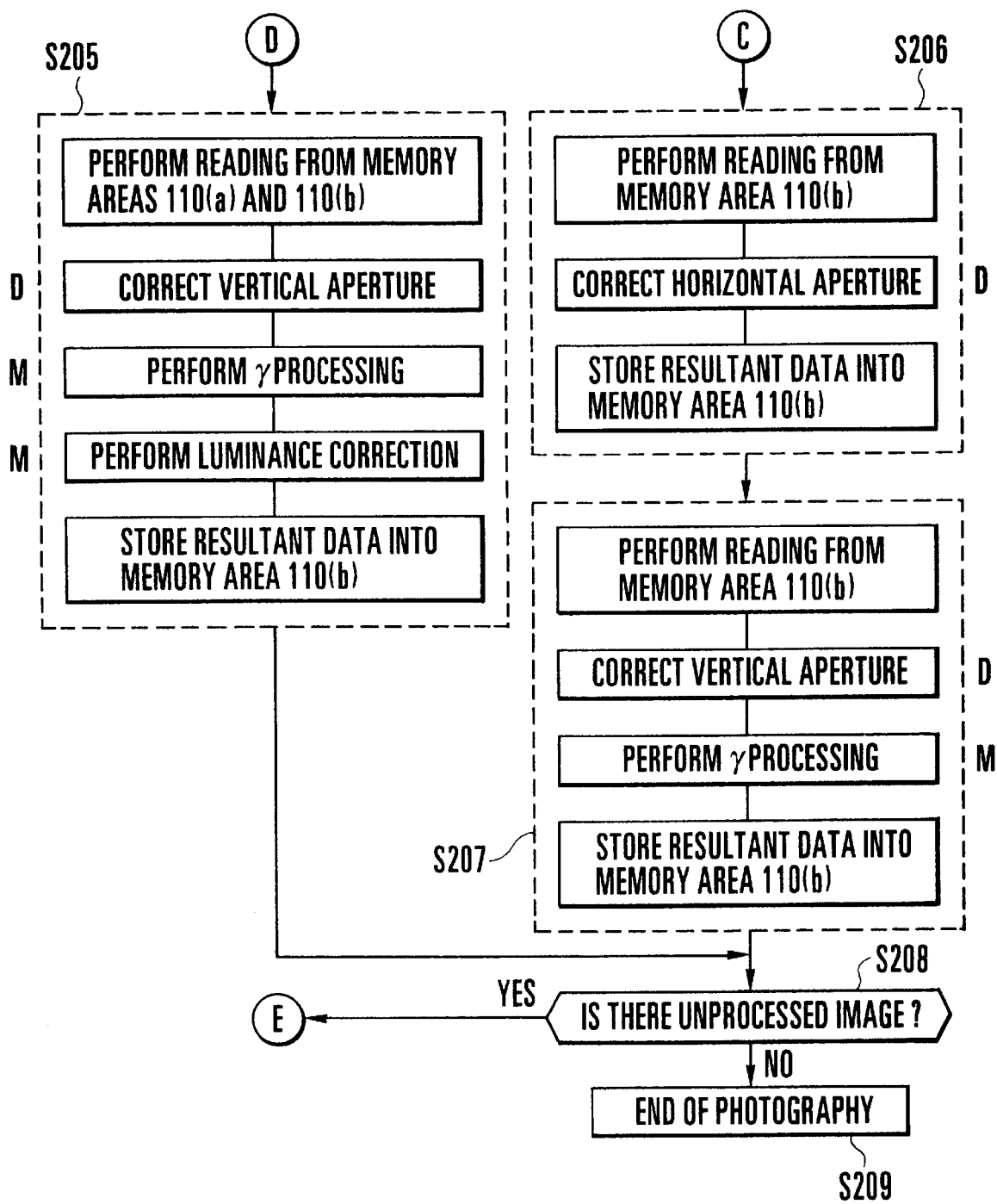
FIG. 29 is a flowchart showing processing which follows the flowchart of FIG. 25.
Figure 30:
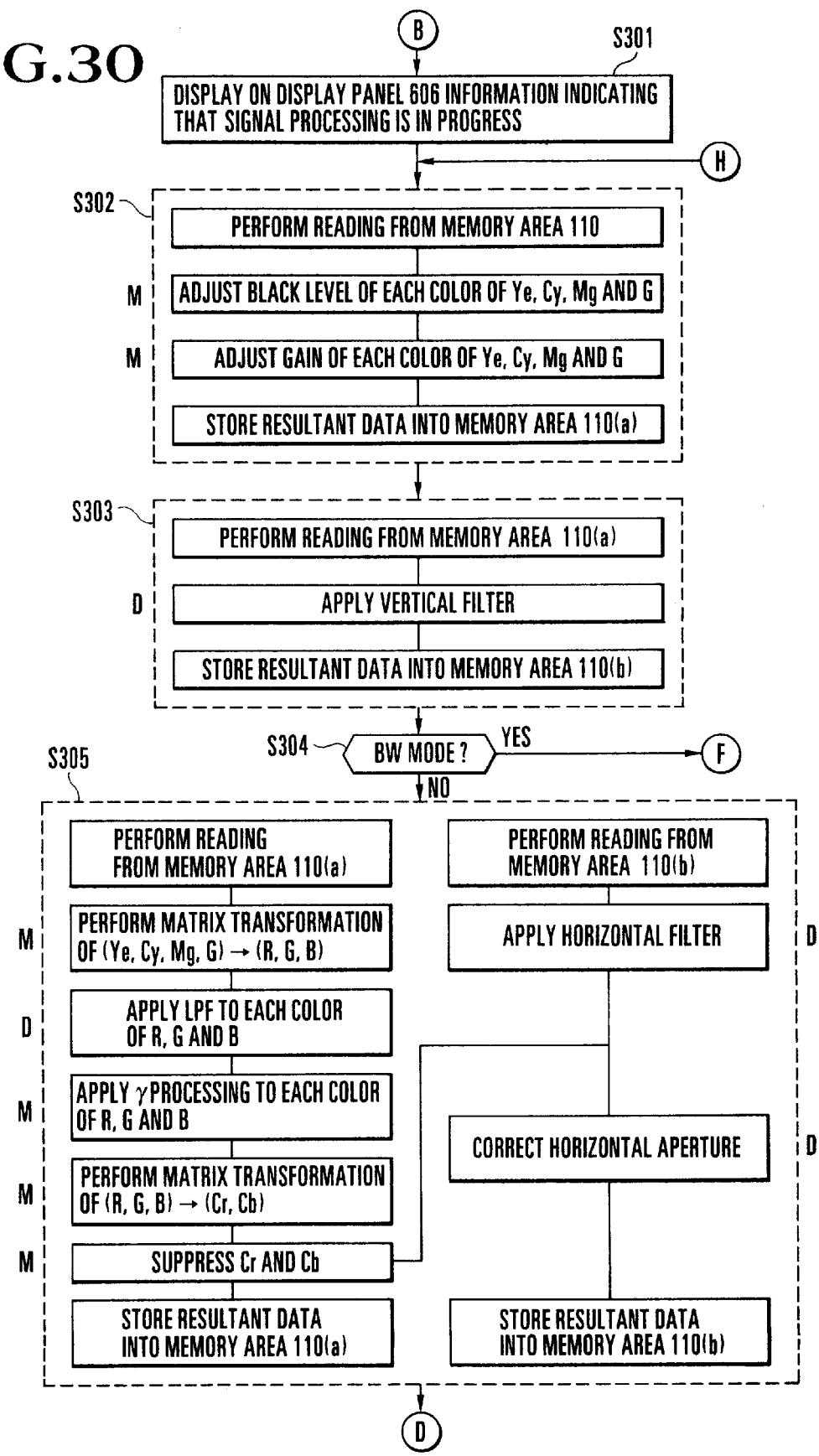
FIG. 30 is a flowchart showing processing which follows the flowchart of FIG. 26.
Figure 31:
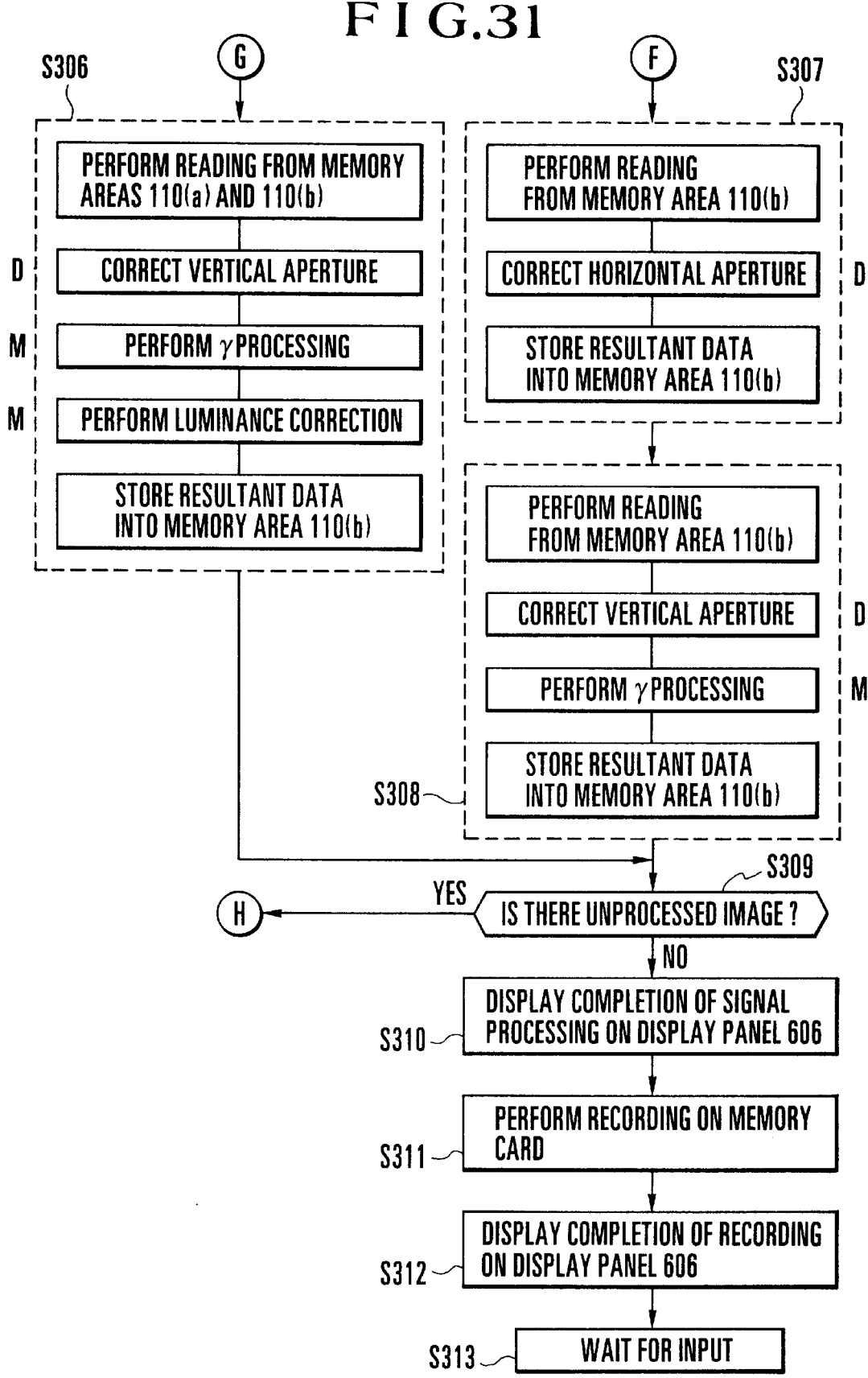
FIG. 31 is a flowchart showing processing which follows the flowchart of FIG. 26.

The processing of Steps S301 to S309 in the flow shown in FIGS. 30 and 31 is completely identical to the processing of Steps S201 to S209 in the flow shown in FIGS. 28 and 29 and the description thereof is omitted.

The flow of FIGS. 30 and 31 differs from the flow of FIGS. 28 and 29 in the following respects Since the B unit is attached to the camera body A, the processing of displaying, on the LCD display panel 606 of the B unit, information indicating that the signal processing of a photographed image is in progress is first performed in Step S301. After the required image processing has been completed in Step S309, information indicating that the signal processing has been completed is displayed on the LCD display panel 606 in Step S310. In Step S311, the processed image is recorded on the memory card. In Step S312, information to that effect is displayed on the LCD display panel 606, and in Step S313 the process is placed into the state of waiting for the next input.

If no memory card is attached or there is no empty area, information indicating that recording is impossible is displayed on the LCD display panel 606 in Steps S14 and S15 of FIG. 24, so that an operator can know that recording is impossible. In this case, the recording processing of Step S311 is not performed and the state in which the image signal is stored in the memory 110 is held.

Referring back to the flowchart of FIG. 24, if it is determined in Step S9 that the program setting mode is selected, the process proceeds to Step S10, in which the currently employed font data is changed to font data for program setting to provide a corresponding visual display. In Step S11, a program for the program setting mode is executed in accordance with a manipulating procedure which is similar to the manipulating procedure described previously with reference to FIG. 20 for setting the program functions on the monitor of the personal computer F.

If it is determined in Step S9 that the reproducing mode is selected the process proceeds to Step S12, in which the currently employed font data is changed to font data for reproduction to provide a corresponding visual display. The process proceeds to the flow of FIG. 27.

Figure 27:
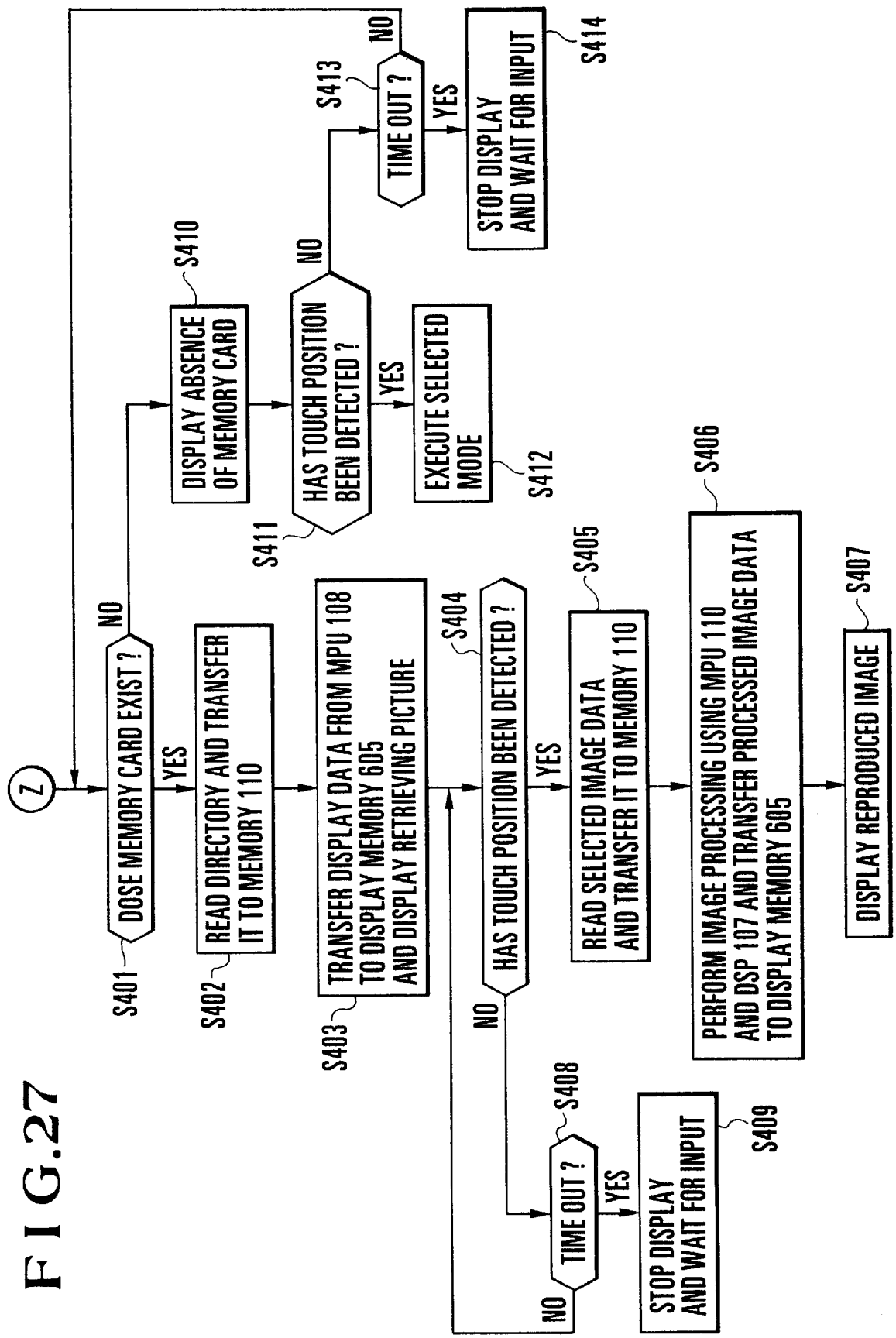
FIG. 27 is a flowchart showing processing which follows the flowchart of FIG. 24.

In Step S401 of the flow of FIG. 27, it is determined whether there is a memory card inserted in the PCMCIA connector 609. If there is no such memory card, the process proceeds to Step S411, in which the process is placed into the state of waiting for an input to the touch panel 607. If an annotation input is applied to the B unit through the touch pen 210 or the like, the process proceeds to a selected mode as shown in Step S412. if no input is provided in Steps 411 and 413 for a predetermined period of time, the process proceeds to Step S414 in which the visual display is stopped and the process is placed into the state of waiting for the next manipulation.

If it is determined in Step S401 that there is a memory card inserted in the PCMCIA connector 609, the process proceeds to Step S402, in which the directory of the memory card is read and transmitted to the memory 110. In Step S403, retrieval information is transmitted from the microprocessor 108 to the display memory 605 and a retrieving picture is displayed. Then, if it is determined in Step S404 that an arbitrary position in the retrieving picture is selected by inputting means, such as the touch pen 210, the process proceeds to Step S405, in which corresponding image data is transmitted from the memory card to the memory 110 of the camera body A. Then, in step S406, the microprocessor 108 and the digital process circuit 107 perform image processing to convert image data into a form corresponding to a visual display, such as JPEG decoding or the image processing of converting the image data into a two-level signal by means of a black-and-white error diffusion method. After that, the obtained image data is transmitted to the display memory 605. In Step S407, the reproduced image thus obtained is displayed on the LCD display panel 606 or the screen of an externally connected monitor.

As is apparent from the above description, if the B unit is connected to the camera body A, predetermined signal processing is applied to a photographed image and the processed photographed image is displayed and is also stored on a memory card and, in addition, the state of each operation and a manipulating panel can be visually displayed. Furthermore, an image stored in the memory card can be reproduced. Even if the B unit is not attached to the camera body A, photography can be performed by using the memory provided in the camera body A.

In addition, the attachment of the B unit makes it possible to connect the camera body A to other peripherals at the same time. Accordingly, it is possible to add multiple functions to the electronic camera and it is also possible to improve the operability thereof. These features are greatly advantageous, particularly in the field of multimedia apparatus.

As hereinabove described in detail, in accordance with the above-described embodiment, there are provided the image pickup apparatus provided with the standard-resolution photographing mode and the high-resolution photographing mode. The high-resolution photographing mode not only enables high-resolution photography, but can also control the iris to adjust the opening shape thereof to an optimum shape, thereby preventing a diffraction phenomenon or the like depending on the shape of the aperture opening. Accordingly it is possible to provide a high-quality image without causing a degradation in image quality.

In addition, in the high-resolution photographing mode, the aperture diameter is fixed, and the aperture diameter is selected to be smaller than the fully aperture diameter used in the standard-resolution photographing mode. It is therefore possible to affect high-resolution camera photography at the movement accuracy of the focusing lens equivalent to that used in the standard-resolution photographing mode. Accordingly, it is possible to achieve a low-cost simple arrangement without the need to use expensive components such as a high-precision motor or a high-precision speed reducing mechanism.

The signal processing system for a photographed image is arranged in such a manner that the digital signal processing circuit and the microprocessor performs video signal processing in the above-described shared manner. Accordingly, it is possible to provide a digital video signal processing system having versatility improved to a great extent and hence applicable to other systems.

In addition, it is possible to readily cope with various kinds of photographing modes, photographic environments and specifications merely by varying the program of the microprocessor, so that it is possible to perform various kinds of signal processing according to different statuses. Further, since the burden of the digital process circuit can be reduced, it is possible to facilitate design, alteration or the like of the digital process circuit. These features are greatly advantageous in providing an image input apparatus applicable to the field of multimedia.

What is claimed is:

1. An image pickup apparatus comprising:
   A) image pickup means;
   B) iris means for varying the amount of light incident on said image pickup means by controlling an anerture means;
   C) photographing-mode setting means for switchably setting a standard-resolution photographing mode for performing photography with a standard resolution and a high-resolution photographing mode for performing photography with a high resolution compared to said standard-resolution photographing mode; and
   D) control means for varying the aperture of said iris means according to whether the standard-resolution photographing mode or the high-resolution photographing mode is set by said photographing-mode setting means.

2. An image pickup apparatus according to claim 1, wherein said iris means has a fixed iris and said control means performs switching between aperture diameters of said fixed iris according to whether the standard-resolution photographing mode or the high-resolution photographing mode is set by said photographing-mode setting means.

3. An image pickup apparatus according to claim 2, wherein the aperture diameter of said fixed iris used during the high-resolution photographing mode is smaller than the aperture diameter of said fixed iris used during the standard-resolution photographing mode.

4. An image pickup apparatus comprising:
  A) photographing-mode setting means for switchably setting a standard-resolution photography mode for performing photography with a standard resolution and a high-resolution photographing mode for performing photography with a high resolution compared to said standard-resolution photographing mode;
  B) a first low-pass filter needed for performing photographing in the standard-resolution photographing mode;
  C) a second low-pass filter needed for performing photographing in the high-resolution photographing made;
  D) filter selecting means for performing a filter selecting operation interlocked with an operation of said photographing-mode setting means, said filter selecting means being arranged to select said first low-pass filter when the standard-resolution photographing mode is set by said photographing-mode setting means and to select said second low-pass filter when the high-resolution photographing mode is set by said photographing-mode setting means; and
  E) iris controlling means for switching between aperture diameters of iris means in interlocking relation to the filter selecting operation of said filter selecting means to perform switching between said first low-pass filter and said second low-pass filter.

5. An image pickup apparatus according to claim 4, wherein said first low-pass filter has a spatial-frequency pass band lower than said second low-pass filter.

6. An image pickup apparatus according to claim 5, wherein the aperture diameter of said fixed iris used during the high-resolution photographing mode is smaller than the aperture diameter of said fixed iris used during the standard-resolution photographing mode.

* * * * *

UNITED STATES PATENT AND TRADEMARK OFFICE
CERTIFICATE OF CORRECTION

PATENT NO. : 5,959,669
DATED : September 28, 1999
INVENTOR(S) : Yoshiyuki Mizoguchi, et al.

It is certified that error appears in the above-identified patent and that said Letters Patent are hereby corrected as shown below:

Col. 1, line 24, delete "moire" and insert -- moire --.
Col. 1, line 26, delete "moire" and insert -- moire --.
Col. 2, line 16, delete "performanes." and insert -- performance. --.
Col. 2, line 27, delete ". in additions" and insert -- . In addition, --.
Col. 2, line 37, delete "correction in" and insert -- correction. In --.
Col. 5, line 53, delete "flash unit 6" and insert -- flash unit 4 --.
Col. 7, line 44, delete "unit 50" and insert -- unit 5. --.
Col. 8, line 18, delete "filter 37" and insert -- cut-filter 37 --.
Col. 8, line 23, after "mode" insert -- . --.
Col. 8, line 46, delete "In additions" and insert -- In addition, --.
Col. 8, line 60, delete "LPFS." and insert --- LPFs. --.
Col. 9, line 4, delete "(resolutions" and insert -- (resolution) --.
Col. 9, line 14, delete "modes" and insert -- mode, --.
Col. 9, line 25, delete "planes" and insert -- plane, --.
Col. 9, line 33, delete "FIG. 6. in" and insert -- FIG. 6. In --.
Col. 9, line 37, delete "Occur" and insert -- occur --.
Col. 10, line 55, delete "System 30." and insert -- system 30." 
Col. 11, line 20, after "maximum" insert -- . --.
Col. 11, line 33, delete "distance incidentally" and insert -- distance. Incidentally --.
Col. 11, line 53, delete "93" and insert -- 9B --.
Col. 12, line 6, delete "arm" and insert -- arms --.
Col. 12, line 8, delete "11(a)" and insert -- 11(a)), --.
Col. 12, line 10, delete "In additions" and insert -- In addition, --.
Col. 13, line 20, after "intervals" insert -- . --.
Col. 13, line 52, delete "13(b)." and insert -- 13(b)). --.

UNITED STATES PATENT AND TRADEMARK OFFICE
CERTIFICATE OF CORRECTION

Page 2 of 3

PATENT NO. : 5,959,669
DATED : September 28, 1999
INVENTOR(S) : Yoshiyuki Mizoguchi, et al.

It is certified that error appears in the above-identified patent and that said Letters Patent are hereby corrected as shown below:

Col. 13, line 53, delete "times" and insert -- time, --.
Col. 14, line 18, delete "signal "a"" and insert -- signal "e" --.
Col. 15, line 1, delete"t he" and insert -- the --.
Col. 15, line 63, delete "PCHCIA" and insert -- PCMCIA --.
Col. 17, line 18, after "member 218" insert -- . --.
Col. 17, line 27, delete "systems As a results" and insert -- system. As a result, --.
Col. 18, line 20, delete "pine" and insert -- pins --.
Col. 19, line 25, delete "FIG. 20G" and insert -- FIG. 20, --.
Col. 19, line 38, delete "modes" and insert -- mode, --.
Col. 19, line 42, delete "model" and insert -- mode --.
Col. 19, line 65, delete "mods" and insert -- mode --.
Col. 19, line 67, delete "mods" and insert -- mode --.
Col. 21, line 49, delete "switch 255" and insert -- switch 155 --.
Col. 21, line 57, delete "microprocessor 108e" and insert -- microprocessor 108, --.
Col. 22, line 13, delete "manner. if" and insert -- manner. If --.
Col. 22, line 67, delete "PCHCIA" and insert -- PCMCIA --.
Col. 23, line 40, delete "step S2)." and insert -- (Step S2). --.
Col. 23, line 59, delete "distance and." and insert -- distance end. --.
Col. 23, line 62, delete "distance and." and insert -- distance end. --.
Col. 24, line 19, after "valves," delete -- e --.
Col. 24, line 26, after "embodiment," delete -- e --.
Col. 24, line 36, after "settings," delete -- e --.
Col. 25, line 5, after "S511" insert -- . --.
Col. 25, line 16, delete "valve X" and insert -- valve K --.
Col. 26, line 1, delete "and position" and insert -- end position --.
Col. 26, line 48, delete "pre-exposures" and insert -- pre-exposure. --.

UNITED STATES PATENT AND TRADEMARK OFFICE
CERTIFICATE OF CORRECTION

PATENT NO. : 5,959,669
DATED : September 28, 1999
INVENTOR(S) : Yoshiyuki Mizoguchi, et al.

It is certified that error appears in the above-identified patent and that said Letters Patent are hereby corrected as shown below:

Col. 26, line 53, delete "Step Sill" and insert -- Step S111 --.
Col. 28, line 4, delete "selected if" and insert -- selected. If --.
Col. 28, line 24, delete "The s signal" and insert -- The signal --.
Col. 28, linie 25, delete "gama" and insert -- gamma --.
Col. 28, line 26, delete "corrections" and insert -- correction, --.
Col. 29, line 31, delete "B unit" and insert -- 3 unit --.
Col. 30, line 58, after "respects" insert -- . --.
Col. 32, line 53, delete "anerture" and insert -- aperture --.

Signed and Sealed this

Seventeenth Day of April, 2001

Attest:

NICHOLAS P. GODICI

*Attesting Officer*   *Acting Director of the United States Patent and Trademark Office*